United States Patent
Hifumi et al.

(10) Patent No.: US 11,505,651 B2
(45) Date of Patent: Nov. 22, 2022

(54) POLYMER, COMPOSITION, MOLDED ARTICLE, CURED PRODUCT AND LAMINATE

(71) Applicant: JSR Corporation, Minato-ku (JP)

(72) Inventors: Ryouyuu Hifumi, Minato-ku (JP);
Toshiaki Kadota, Minato-ku (JP);
Nobuyuki Miyaki, Minato-ku (JP);
Shintarou Fujitomi, Minato-ku (JP);
Yasutaka Yoshida, Minato-ku (JP);
Ryouji Tatara, Minato-ku (JP)

(73) Assignee: JSR Corporation, Minato-ku (JP)

( * ) Notice: Subject to any disclaimer, the term of this patent is extended or adjusted under 35 U.S.C. 154(b) by 650 days.

(21) Appl. No.: 16/165,526

(22) Filed: Oct. 19, 2018

(65) Prior Publication Data
US 2019/0055357 A1  Feb. 21, 2019

Related U.S. Application Data

(63) Continuation of application No. PCT/JP2017/014282, filed on Apr. 5, 2017.

(30) Foreign Application Priority Data

Apr. 20, 2016 (JP) ............................. JP2016-084840
Apr. 27, 2016 (JP) ............................. JP2016-089870
Jul. 28, 2016 (JP) ............................. JP2016-148944

(51) Int. Cl.
| | |
|---|---|
| C08G 73/02 | (2006.01) |
| C08L 79/02 | (2006.01) |
| C08K 5/00 | (2006.01) |
| C08G 65/40 | (2006.01) |
| C08L 71/10 | (2006.01) |
| B32B 27/00 | (2006.01) |
| C08L 79/04 | (2006.01) |
| C08L 63/00 | (2006.01) |
| C08L 71/00 | (2006.01) |
| C09D 163/00 | (2006.01) |
| C09D 171/00 | (2006.01) |
| C09D 179/02 | (2006.01) |

(52) U.S. Cl.
CPC .......... *C08G 73/0273* (2013.01); *B32B 27/00* (2013.01); *C08G 65/40* (2013.01); *C08G 65/4081* (2013.01); *C08G 73/02* (2013.01); *C08K 5/00* (2013.01); *C08L 63/00* (2013.01); *C08L 71/00* (2013.01); *C08L 71/10* (2013.01); *C08L 79/02* (2013.01); *C08L 79/04* (2013.01); *C09D 163/00* (2013.01); *C09D 171/00* (2013.01); *C09D 179/02* (2013.01)

(58) Field of Classification Search
CPC ............ C08G 59/5033; C08G 59/5073; C08G 73/0273; C08G 65/40–42; C08L 63/00; C08L 71/00; C08L 71/10; C08L 79/02; C09D 163/00; C09D 171/00; C09D 171/10; C09D 179/02; C09D 179/04
See application file for complete search history.

(56) References Cited

U.S. PATENT DOCUMENTS

| | | | |
|---|---|---|---|
| 3,644,285 A | 2/1972 | Higgins | |
| 3,657,231 A * | 4/1972 | Booth ...................... | C11D 3/42 544/193.2 |

(Continued)

FOREIGN PATENT DOCUMENTS

| | | |
|---|---|---|
| CN | 102753604 A | 10/2012 |
| CN | 103801501 A | 5/2014 |

(Continued)

OTHER PUBLICATIONS

Partial machine translation of DE-4237768-A1 (1993).*
Dow Chemical, Dow Liquid Epoxy Resins (1999).*
Imin et al., "Preparation of Pyridazine Containing Polybenzidine Type π-Conjugated Copolymer," Chemical World, 2006, Issue 1, pp. 21-23 (Year: 2006).*

(Continued)

*Primary Examiner* — Kregg T Brooks
(74) *Attorney, Agent, or Firm* — Oblon, McClelland, Maier & Neustadt, L.L.P.

(57) ABSTRACT

A novel polymer having high glass transition temperature and an excellent balance between heat resistance, high refractive index and mechanical properties, and a composition and molded article containing the polymer are provided. The polymer according to the invention has a first structural unit represented by at least one of formulae (1-1), (1-2) and (1-3) below and a second structural unit having either a secondary amino structure or a tertiary amino structure at two or more terminals.

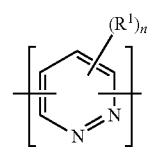

(1-1)

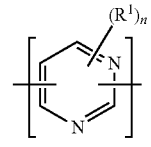

(1-2)

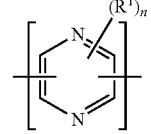

(1-3)

3 Claims, No Drawings

(56) References Cited

U.S. PATENT DOCUMENTS

| | | | | |
|---|---|---|---|---|
| 3,814,757 | A | * | 6/1974 | Donald ................. C08G 69/26 544/336 |
| 4,122,128 | A | * | 10/1978 | Lehmann ............... C09J 163/00 525/112 |
| 4,931,487 | A | * | 6/1990 | Priester, Jr. ........ C08G 18/3814 252/182.15 |
| 5,089,571 | A | * | 2/1992 | Bonk .................... C08G 18/12 525/457 |
| 2002/0161091 | A1 | | 10/2002 | Amou et al. |
| 2004/0101732 | A1 | | 5/2004 | Alvarez-Gallego et al. |
| 2006/0159929 | A1 | | 7/2006 | Tanaka et al. |
| 2009/0266591 | A1 | | 10/2009 | Amou et al. |
| 2011/0108755 | A1 | | 5/2011 | Laskoski et al. |
| 2012/0049308 | A1 | | 3/2012 | Nishimura et al. |
| 2012/0139655 | A1 | | 6/2012 | Lin et al. |
| 2012/0175154 | A1 | | 7/2012 | Matsuda |
| 2012/0289654 | A1 | | 11/2012 | Fleischhaker et al. |
| 2013/0123542 | A1 | | 5/2013 | Kitayama et al. |
| 2013/0306358 | A1 | | 11/2013 | Ohmori et al. |
| 2014/0272722 | A1 | | 9/2014 | Nakafuji et al. |
| 2014/0295159 | A1 | | 10/2014 | Kawasaki et al. |
| 2014/0326487 | A1 | | 11/2014 | Ozeki et al. |
| 2014/0378642 | A1 | | 12/2014 | Keller et al. |
| 2015/0016072 | A1 | | 1/2015 | Iwayama et al. |
| 2015/0133628 | A1 | | 5/2015 | Kitayama et al. |
| 2016/0044784 | A1 | | 2/2016 | Matsuda |
| 2016/0044797 | A1 | | 2/2016 | Matsuda |
| 2017/0009032 | A1 | * | 1/2017 | Katz ...................... C08J 5/2256 |
| 2017/0188453 | A1 | | 6/2017 | Sugimoto et al. |
| 2018/0009195 | A1 | | 1/2018 | Takeuchi et al. |
| 2018/0179335 | A9 | | 6/2018 | Nawate et al. |
| 2020/0324538 | A1 | | 10/2020 | Nishiyama et al. |

FOREIGN PATENT DOCUMENTS

| | | | |
|---|---|---|---|
| CN | 107113968 A | | 8/2017 |
| DE | 1 949 137 | | 4/1970 |
| DE | 42 37 768 A1 | | 5/1993 |
| DE | 4237768 A1 | * | 5/1993 ............ C08G 73/06 |
| JP | 5-65352 | | 3/1993 |
| JP | 5-65352 A | | 3/1993 |
| JP | 2001-301088 A | | 10/2001 |
| JP | 2002-249531 | | 9/2002 |
| JP | 2002-249531 A | | 9/2002 |
| JP | 2002-249531 A5 | | 9/2002 |
| JP | 2004-193501 | | 7/2004 |
| JP | 2006-328141 A | | 12/2006 |
| JP | 2007-262191 A | | 10/2007 |
| JP | 2008-39703 A | | 2/2008 |
| JP | 2008-284716 A | | 11/2008 |
| JP | 2008-284716 A | | 11/2008 |
| JP | 2009-231770 A | | 10/2009 |
| JP | 2011-40727 A | | 2/2011 |
| JP | 2012-092261 | | 5/2012 |
| JP | 2012-092261 A | | 5/2012 |
| JP | 2014-70111 A | | 4/2014 |
| JP | 2014-197611 A | | 10/2014 |
| JP | 5598258 | | 10/2014 |
| JP | 5598258 B2 | | 10/2014 |
| JP | 5630182 | | 11/2014 |
| JP | 5630182 B2 | | 11/2014 |
| JP | 5712921 | | 5/2015 |
| JP | 5712921 B2 | | 5/2015 |
| JP | 2015-176921 A | | 10/2015 |
| JP | 2015-209510 | | 11/2015 |
| JP | 2015-209510 A | | 11/2015 |
| JP | 2015-209511 | | 11/2015 |
| JP | 2015-209511 A | | 11/2015 |
| JP | 2016-32098 A | | 3/2016 |
| JP | 2016-87799 A | | 5/2016 |
| JP | 2017-24265 A | | 2/2017 |
| JP | 2017-137486 | | 8/2017 |
| JP | 2017-144730 A | | 8/2017 |
| KR | 10-2017-0097215 A | | 8/2018 |
| SU | 858316 A | | 11/1985 |
| TW | 201124502 | | 7/2011 |
| TW | 201324057 A1 | | 6/2013 |
| TW | 201604232 A | | 2/2016 |
| WO | 2004/113327 | | 12/2001 |
| WO | WO 201 0/128661 A1 | | 11/2010 |
| WO | WO 2010/128661 A1 | | 11/2010 |
| WO | WO 2011/081038 A1 | | 7/2011 |
| WO | WO 2012/014339 A1 | | 2/2012 |
| WO | WO 2013/080929 A1 | | 6/2013 |
| WO | WO 2014/148155 A1 | | 9/2014 |
| WO | WO 2015/098788 A1 | | 7/2015 |
| WO | WO 2016/114287 A1 | | 7/2016 |
| WO | WO 2016/143447 A1 | | 9/2016 |

OTHER PUBLICATIONS

Extended European Search Report dated Feb. 13, 2020 in European Patent Application No. 1778583.2, 12 pages.

International Search Report dated Jun. 27, 2017 in PCT/JP2017/014282, filed on Apr. 5, 2017 (with English Translation).

Written Opinion dated Jun. 27, 2017 in PCT/JP2017/014282, filed on Apr. 5, 2017.

Fujioka, H. "Properties and Fine Structures of Epoxy Resin for Electronics," 47(5), 1998, p. 2.

Combined Taiwanese Office Action and Search Report dated Oct. 7. 2020 in Patent Application No. 106112616 (with English machine translation), 13 pages.

Notice of Reasons for Refusal dated Oct. 20, 2020 in Japanese Patent Application No. 2017-078161 (with English machine translation), 7 pages.

Notification of Reason for Refusal dated Oct. 30, 2020 in Korean Patent Application No. 10-2018-7029962 (with English machine translation), 14 pages.

Notice of Reasons for Refusal dated Dec. 22, 2020 in Japanese Patent Application No. 2017-078222 (with English machine translation), 4 pages.

Combined Taiwanese Office Action and Search Report dated Apr. 19, 2021 in Patent Application No. 106112616 (with computer-generated English translation), 10 pages.

Combined Taiwanese Office Action and Search Report dated Jan. 13, 2021 in Patent Application No. 106112616 (with computer-generated English translation), 12 pages.

Combined Chinese Office Action and Search Report dated Jan. 22, 2021 in Patent Application No. 201780023932.X (with computer-generated English translation), 34 pages.

Notice of Reasons for Refusal dated Jan. 26, 2021 in Japanese Patent Application No. 2017-078221 (with computer-generated English translation), 6 pages.

Combined Chinese Office Action and Search Report dated Aug. 10, 2021 in Chinese Patent Application No. 201780023932.X (with computer-generated English translation), 19 pages.

Taiwanese Office Action and Search Report dated May 3, 2022, in Patent Application No. 107132425, with Computer-generated English translation.

Combined Taiwanese Office Action and Search Report dated May 18, 2022, in Application No. 107132490, with Computer-generated English translation.

International Search Report dated Nov. 27, 2018 in PCT/JP2018/033480, 1 page.

Office Action dated Dec. 10, 2020, in U.S. Appl. No. 16/647,119.

International Search Report dated Nov. 6, 2018, in PCT/JP2018/033477.

Extended European Search Report dated May 4, 2021 in European Patent Application No. 18856760.6, 7 pages.

Extended European Search Report dated May 26, 2021 in European Patent Application No. 18856178.1, 8 pages.

Chinese Office Action dated Jul. 6, 2021, in Patent Application No. 201880059040.X, with computer-generated English translation.

Japanese Office Action dated Dec. 21, 2021 in Patent Application No. 2018-168775 with computer-generated English translation.

Japanese Office Action dated Mar. 1, 2022 in Japanese Patent Application No. 2018-168773 (with English translation), 9 pages.

(56) References Cited

OTHER PUBLICATIONS

Japanese Office Action dated Mar. 8, 2022 in Japanese Patent Application No. 2018-168774 (with English translation), 8 pages.
Office Action dated Aug. 26, 2020 in U.S. Appl. No. 16/647,350.
Office Action dated Feb. 4, 2021, in U.S. Appl. No. 16/647,350.
Supplementary European Search Report dated May 26, 2021, in European Patent Application No. 18856178.1 filed Sep. 10, 2018, 8 pages.
Office Action dated Jul. 30, 2021 in U.S. Appl. No. 16/647,350.
Combined Taiwanese Office Action and Search Report dated May 3, 2022 in Taiwanese Patent Application No. 107132425 (with unedited computer generated English translation), 13 pages.
Combined Taiwanese Office Action and Search Report dated May 18, 2022 in Taiwanese Patent Application No. 107132490 (with unedited computer generated English translation), 11 pages.
International Search Report and Written Opinion dated Jun. 27, 2017 in PCT/JP2017/014282, filed on Apr. 5, 2017 (with English Translation), 14 pages.
Saxena, A. et al. "Toughening of an Epoxy Resin with Hydroxy-Terminated Poly (arylene ether nitrile) with Pendent Tertiary Butyl Groups", Journal of Applied Polymer Science, vol. 106, 2007, pp. 14.
Extended European Search Report dated Nov. 15, 2019 in Patent Application No. 17785803.2, 11 pages.
Extended European Search Report dated Feb. 13, 2020 in European Patent Application No. 17785803.2, 12 pages.
Mercer, F. W., et al., "Synthesis and Characterization of New Aromatic Poly(Ether Ketone)s", Journal of Applied Polymer Science, vol. 56, No. 11, XP000542975, Jun. 13, 1995, pp. 1397-1412.
Singaporean Search Report and Written Opinion dated Feb. 11, 2020 in Singaporean Patent Application No. 11201809285 Y, 11 pages.
Combined Chinese Office Action and Search Report dated Jun. 24, 2020 in Chinese Patent Application No. 201780023932.X (with unedited computer generated English translation and English translation of Category of Cited Documents), 16 pages.
Singaporean Written Opinion dated Jul. 31, 2020 in Singaporean Patent Application No. 11201809285Y, 7 pages.
Combined Taiwanese Office Action and Search Report dated Oct. 7, 2020 in Patent Application No. 106112616 (with unedited computer generated English translation), 13 pages.
Notice of Reasons for Refusal dated Oct. 20, 2020 in Japanese Patent Application No. 2017-078161 (with unedited computer generated English translation), 7 pages.
Extended European Search Report dated Oct. 26, 2020 in European Patent Application No. 20193294.4, 9 pages.
Extended European Search Report dated Oct. 30, 2020 in European Patent Application No. 20193296.9, 9 pages.
Notification of Reason for Refusal dated Oct. 30, 2020 in Korean Patent Application No. 10-2018-7029962 (with unedited computer generated English translation), 14 pages.
Notice of Reasons for Refusal dated Dec. 22, 2020 in Japanese Patent Application No. 2017-078222 (with unedited computer generated English translation), 4 pages.
Combined Taiwanese Office Action and Search Report dated Jan. 13, 2021 in Patent Application No. 106112616 (with unedited computer generated English translation), 12 pages.
Combined Chinese Office Action and Search Report dated Jan. 22, 2021 in Patent Application No. 201780023932.X (with unedited computer-generated English translation), 34 pages.
Notice of Reasons for Refusal dated Jan. 26, 2021 in Japanese Patent Application No. 2017-078221 (with unedited computer generated English translation), 6 pages.
Combined Taiwanese Office Action and Search Report dated Apr. 19, 2021 in Patent Application No. 106112616 (with unedited computer generated English translation), 10 pages.
Combined Chinese Office Action and Search Report dated Aug. 10, 2021 in Chinese Patent Application No. 201780023932.X (with unedited computer generated English translation), 19 pages.
Imin, et al., "Preparation of Pyridazine Containing Polybenzidine Type tt-Conjugated Copolymer," Chemical World, 2006, Issue 1, pp. 21-23 (Year; 2006) (with English abstract).
Dow Chemical, Dow Liquid Epoxy Resins (1999), 44 pages.
Japanese Office Action dated Jul. 12, 2022, in Japanese Patent Application No. 2018-168775 (with computer-generated English-language Translation).
Office Action dated Aug. 26, 2022, in Chinese Patent Application No. 201880058828.9 (with English-language Translation).
Korean Office Action dated Oct. 12, 2022, in Korean Patent Application No. 10-2020-7007170 (with attached computer-generated English translation).

\* cited by examiner

POLYMER, COMPOSITION, MOLDED ARTICLE, CURED PRODUCT AND LAMINATE

CROSS REFERENCE TO RELATED APPLICATION

This application is a national stage entry under 35 U.S.C. 371 of PCT/JP2017/014282, filed on Apr. 5, 2017, the entire text of which is incorporated herein by reference.

TECHNICAL FIELD

The present invention relates to a novel polymer, a composition, a molded article, a cured product and a laminate. More specifically, one embodiment of the invention relates to a novel polymer that has high glass transition temperature and has an excellent balance between heat resistance, high refractive index and mechanical properties, and a composition and molded article containing the polymer. One embodiment of the invention relates to a novel polymer that has excellent solubility in various organic solvents, excellent heat resistance and excellent mechanical properties, and a composition and molded article containing the polymer. One embodiment of the invention relates to a novel composition that has excellent post-curing toughness and heat resistance, a cured product thereof and a laminate.

BACKGROUND ART

Inorganic materials such as glass and ceramics have been conventionally and frequently used for optical components such as lenses. Due to the increasing need for a reduction of weight and cost in recent years, inorganic materials have been increasingly replaced by resins in many applications. Optical polymers are at the center of the optical technology field including high-function lenses, antireflection coatings, flat displays, optical discs, optical fibers and the like and play a role in recording, displaying and transmitting information. Due to advancement of technology, optical polymers are required to have heat resistance, high refractive index and mechanical properties.

Known resin materials include, for example, compositions that can form a thin film having high refractive index and excellent transparency and contain a triazine ring-containing polymer (see PTL 1 to 3), compositions that can form a thin film having excellent transparency and contain a triazine ring-containing polymer (see PTL 4 and 5), polymers that have an excellent balance between heat resistance, high refractive index and moldability and contain a specific structural unit in which a pyrimidine skeleton and a benzene ring skeleton are linked through an oxygen atom or a sulfur atom (see PTL 6 and 7).

Meanwhile, epoxy compounds have been conventionally known as typical curable compounds that have excellent post-curing heat resistance and chemical resistance and are widely used in various fields. However, cured products obtained from material systems containing epoxy compounds have an issue of insufficient toughness and also are required to have further improved heat resistance. In order to solve the issue, various methods have been studied. However, when toughness is improved, heat resistance decreases and when heat resistance is improved, toughness decreases. Therefore, it is the current situation in which toughness and heat resistance are not achieved simultaneously. Other curable compounds such as vinyl compounds including divinylbenzene and cyanate ester compounds also face the same issue as epoxy compounds.

In recent years with increasingly harsh operation environments of electronic materials and structural materials, material systems including curable compounds are desired to provide cured products having higher toughness and more excellent heat resistance. In order to address the request, polymer alloys containing epoxy compounds have been studied. Specifically, material systems containing, for example, polyethersulfone (PES) or polyphenylene ether (PPE) and an epoxy compound have been reported (for example, see PTL 8 to 10 and NPL 1 and 2).

CITATION LIST

Patent Literature

PTL 1: Japanese Patent No. 5712921
PTL 2: Japanese Patent No. 5598258
PTL 3: WO 2015/098788
PTL 4: WO 2010/128661
PTL 5: JP-A-2012-092261
PTL 6: JP-A-2015-209510
PTL 7: JP-A-2015-209511
PTL 8: Japanese Patent No. 5630182
PTL 9: JP-A-5-65352
PTL 10: JP-A-2002-249531

Non-Patent Literature

NPL 1: *J. Appl. Poly. Sci.* 106, 1318-1331 (2007)
NPL 2: *Kobunshi [Polymers]*, 47(5), 328-329 (1998)

SUMMARY OF INVENTION

Technical Problem

However, there is still a room for improvement of conventional resin materials, and it is a current situation in which further improvements in heat resistance and further improvements in the balance between heat resistance, high refractive index and mechanical properties are required. Further, in view of moldability, improvements in the solubility in various organic solvents are required.

Meanwhile, conventional compositions do not sufficiently achieve both toughness and heat resistance, and thus further improvements in toughness and further improvements in toughness and heat resistance are required. Further improvements in chemical resistance of cured products in solvents used in various production processes are also desired.

The invention was devised in the light of the above-described situation, and an objective of the invention is to provide a novel polymer, composition and molded article having high glass transition temperature and an excellent balance between heat resistance, high refractive index and mechanical properties. Another objective of the invention is to provide a novel polymer that has excellent solubility in various organic solvents, excellent heat resistance and excellent mechanical properties, as well as a composition and a molded article containing the polymer. Still another objective of the invention is to provide a novel composition having excellent post-curing toughness and heat resistance and a cured product and laminate thereof. Further objective of the invention is to provide a novel resin composition having an excellent balance between post-curing toughness, heat resistance and chemical resistance and a cured product and laminate thereof.

Solution to Problem

The invention was made in order to achieve at least some of the objectives above, and may be materialized by embodiments or application examples indicated below.

Application Example 1

According to one embodiment of the invention, there is provided a polymer comprising:

a first structural unit represented by at least one of formulae (1-1), (1-2) and (1-3) below; and a second structural unit having either a secondary amino structure or a tertiary amino structure at two or more terminals

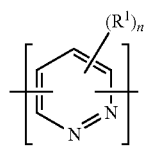

(1-1)

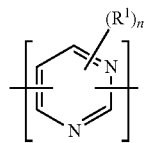

(1-2)

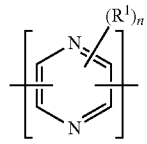

(1-3)

in formulae (1-1) to (1-3), $R^1$ is each independently a halogen atom, a monovalent hydrocarbon group having 1 to 20 carbon atoms, a monovalent halogenated hydrocarbon group having 1 to 20 carbon atoms, a nitro group, a cyano group, any of primary to tertiary amino groups or a salt of any of primary to tertiary amino groups; n is each independently an integer of 0 to 2; and when n is 2, two or more $R^1$ may be the same or different and may be joined together in any combination to form a part of a cyclic structure.

Application Example 2

In Application example 1 above, the second structural unit may be a structural unit represented by formula (2-A) below

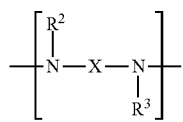

(2-A)

in formula (2-A), $R^2$ and $R^3$ are respectively and independently a hydrogen atom or a monovalent hydrocarbon group having 1 to 20 carbon atoms; and X is a bivalent organic group.

Application Example 3

In Application example 2 above, X in formula (2-A) above may be a group represented by formulae (2-1) to (2-8) below, a bivalent hydrocarbon group having 1 to 20 carbon atoms, a bivalent halogenated hydrocarbon group having 1 to 20 carbon atoms or a 3- to 10-membered bivalent heterocyclic group

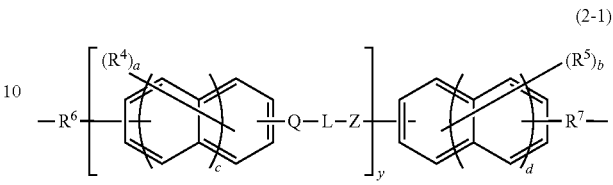

(2-1)

in formula (2-1), $R^4$ and $R^5$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; c and d are respectively and independently an integer of 0 to 2; a and b are respectively and independently an integer of 0 to 8; when a is 2 or more, two or more $R^4$ may be the same or different and may be joined together in any combination to form a part of a cyclic structure; when b is 2 or more, two or more $R^5$ may be the same or different and may be joined together in any combination to form a part of a cyclic structure; Q and Z are respectively and independently a single bond, —O—, —S— or —N($R^{17}$)—; $R^{17}$ is a hydrogen atom, a monovalent hydrocarbon group having 1 to 20 carbon atoms or a monovalent halogenated hydrocarbon group having 1 to 20 carbon atoms; L is a single bond or a bivalent organic group; y is an integer of 0 to 5; when y is 2 or more, two or more Q, L and Z may be respectively the same or different; when y is 2 or more and a is 1 or more, two or more $R^4$ may be the same or different; $R^6$ and $R^7$ are respectively and independently a single bond, a methylene group or an alkylene group having 2 to 4 carbon atoms;

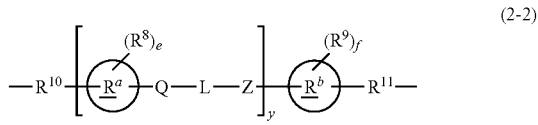

(2-2)

in formula (2-2), $R^a$ and $R^b$ are respectively and independently a 5- to 30-membered bivalent alicyclic hydrocarbon skeleton; $R^8$ and $R^9$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; e and f are respectively and independently an integer of 0 to 20; when e is 2 or more, two or more $R^8$ may be the same or different and may be joined together in any combination to form a part of a cyclic structure; when f is 2 or more, two or more $R^9$ may be the same or different and may be joined together in any combination to form a part of a cyclic structure; Q and Z are respectively and independently a single bond, —O—, —S— or —N($R^{18}$)—; $R^{18}$ is a hydrogen atom, a monovalent hydrocarbon group having 1 to 20 carbon atoms or a monovalent halogenated hydrocarbon group having 1 to 20 carbon atoms; L is a single bond or a bivalent organic group; y is an integer of 0 to 5; when y is 2 or more, two or more Q, L and Z may be respectively the same or different; when y is 2 or more and e is 1 or more, two or more $R^8$ may be the same or different; $R^{10}$ and $R^{11}$ are respectively and independently a single bond, a methylene group or an alkylene group having 2 to 4 carbon atoms;

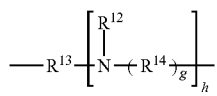

(2-3)

in formula (2-3), $R^{12}$ is a hydrogen atom, a monovalent hydrocarbon group having 1 to 20 carbon atoms or a monovalent halogenated hydrocarbon group having 1 to 20 carbon atoms; $R^{13}$ and $R^{14}$ are respectively and independently a bivalent linear or alicyclic hydrocarbon group having 1 to 20 carbon atoms or a bivalent linear or alicyclic halogenated hydrocarbon group having 1 to 20 carbon atoms; g is 0 or 1; h is an integer of 1 to 10; and when h is 2 or more, two or more $R^{12}$ and $R^{14}$ may be respectively the same or different;

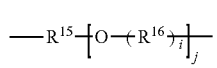

(2-4)

in formula (2-4), $R^{15}$ and $R^{16}$ are respectively and independently a bivalent linear or alicyclic hydrocarbon group having 1 to 20 carbon atoms or a bivalent linear or alicyclic halogenated hydrocarbon group having 1 to 20 carbon atoms; i is 0 or 1; j is an integer of 1 to 10; and when j is 2 or more, two or more $R^{16}$ may be the same or different;

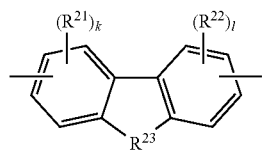

(2-5)

in formula (2-5), $R^{21}$ and $R^{22}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; k and l are respectively and independently an integer of 0 to 3; when k is 2 or 3, two or more $R^{21}$ may be the same or different; when l is 2 or 3, two or more $R^{22}$ may be the same or different; $R^{23}$ is a single bond, —O—, —S—, —C(O)—, —S(O)— or —S(O)$_2$—;

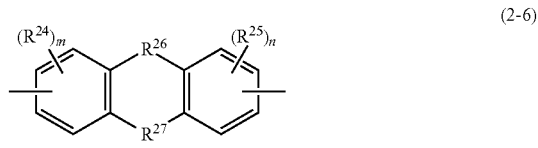

(2-6)

in formula (2-6), $R^{24}$ and $R^{25}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; m and n are respectively and independently an integer of 0 to 3; when m is 2 or 3, two or more $R^{24}$ may be the same or different; when n is 2 or more, two or more $R^{25}$ may be the same or different; $R^{26}$ and $R^{27}$ are respectively and independently a single bond, —O—, —S—, —C(O)—, —S(O)— or —S(O)$_2$—;

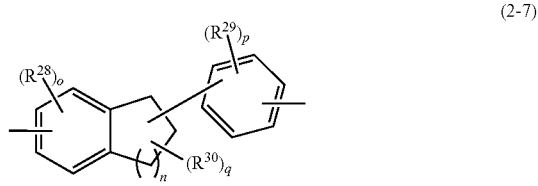

(2-7)

in formula (2-7), $R^{28}$ and $R^{29}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; o is an integer of 0 to 3; p is an integer of 0 to 4; when o is 2 or more, two or more $R^{28}$ may be the same or different; when p is 2 or more, two or more $R^{29}$ may be the same or different; n is an integer of 0 to 6; $R^{30}$ is a monovalent hydrocarbon group having 1 to 20 carbon atoms or a monovalent halogenated hydrocarbon group having 1 to 20 carbon atoms; q is an integer of 0 to 15; when q is 2 or more, two or more $R^{30}$ may be the same or different; and

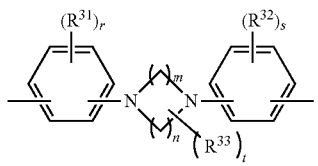

(2-8)

in formula (2-8), $R^{31}$ and $R^{32}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; r and s are respectively and independently an integer of 0 to 4; when r is 2 or more, two or more $R^{31}$ may be the same or different; when s is 2 or more, two or more $R^{32}$ may be the same or different; m is an integer of 1 to 5; n is an integer of 0 to 5; $R^{33}$ is a monovalent hydrocarbon group having 1 to 20 carbon atoms or a monovalent halogenated hydrocarbon group having 1 to 20 carbon atoms; t is an integer of 0 to 20; when t is 2 or more, two or more $R^{33}$ may be the same or different.

Application Example 4

In Application example 3 above, X in formula (2-A) above may be a group represented by formulae (2-1) to (2-4), a bivalent hydrocarbon group having 1 to 20 carbon atoms, a bivalent halogenated hydrocarbon group having 1 to 20 carbon atoms or a 3- to 10-membered bivalent heterocyclic group.

Application Example 5

In any one of Application example 1 to Application example 4 above, a weight average molecular weight based on polystyrene may be 500 to 600,000 inclusive.

Application Example 6

According to one embodiment of the invention, there is provided a polymer comprising:
a first structural unit represented by at least one of formulae (1-1), (1-2) and (1-3) below; and
a third structural unit represented by at least one of formulae (3-1) and (3-2) below

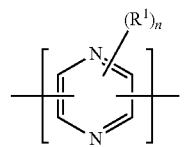

(1-1)

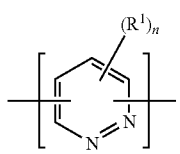

(1-2)

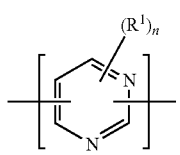

(1-3)

in formulae (1-1) to (1-3), $R^1$ is each independently a halogen atom, a monovalent hydrocarbon group having 1 to 20 carbon atoms, a monovalent halogenated hydrocarbon group having 1 to 20 carbon atoms, a nitro group, a cyano group, any of primary to tertiary amino groups or a salt of any of primary to tertiary amino groups; n is each independently an integer of 0 to 2; when n is 2, two or more $R^1$ may be the same or different and may be joined together in any combination to form a part of a cyclic structure;

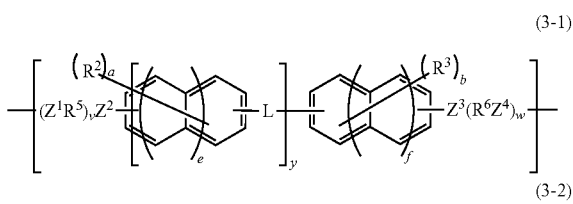

(3-1)

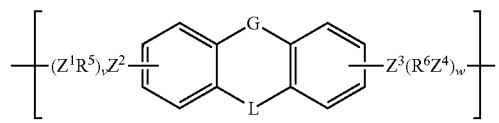

(3-2)

in formulae (3-1) and (3-2), $R^2$ and $R^3$ are respectively and independently a halogen atom, a monovalent hydrocarbon group having 1 to 20 carbon atoms, a monovalent halogenated hydrocarbon group having 1 to 20 carbon atoms, a nitro group or a cyano group; e and f are respectively and independently an integer of 0 to 2; a and b are respectively and independently an integer of 0 to 8; when a is 2 or more, two or more $R^2$ may be the same or different and may be joined together in any combination to form a part of a cyclic structure; when b is 2 or more, two or more $R^3$ may be the same or different and may be joined together in any combination to form a part of a cyclic structure; $Z^1$ to $Z^4$ are respectively and independently —O— or —S—; $R^5$ and $R^6$ are respectively and independently a methylene group or an alkylene group having 2 to 4 carbon atoms; v is an integer of 0 to 2; when v is 2, two $R^5$ may be the same or different and two $Z^1$ may be the same or different; w is an integer of 0 to 2; when w is 2, two $R^6$ may be the same or different and two $Z^4$ may be the same or different; G is —O—, —S—, —C=O—, —SO— or —SO$_2$—; L is a bivalent group represented by formula (L-1) or (L-2) below; y is an integer of 1 to 3; when y is 2 or more, two or more L may be the same or different; when y is 2 or more and a is 1 or more, two or more $R^2$ may be the same or different;

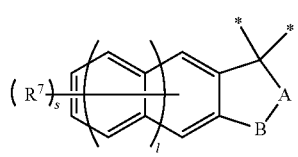

(L-1)

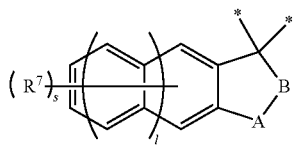
(L-2)

in formulae (L-1) and (L-2), A is each independently —C(O)—, —SO— or —SO$_2$—; B is each independently —O—, —S— or —N(R$^8$)—; R$^8$ is a hydrogen atom, a halogen atom, a monovalent hydrocarbon group having 1 to 20 carbon atoms or a monovalent halogenated hydrocarbon group having 1 to 20 carbon atoms; R$^7$ is each independently a halogen atom, a monovalent hydrocarbon group having 1 to 20 carbon atoms, a monovalent halogenated hydrocarbon group having 1 to 20 carbon atoms, a nitro group or a cyano group, l is each independently an integer of 0 to 2; s is each independently an integer of 0 to 8; when s is 2 or more, two or more R$^7$ may be the same or different and may be joined together in any combination to form a part of a cyclic structure; and "*" indicates a bond.

Application Example 7

In Application example 6 above, the third structural unit may be represented by formula (3-1).

Application Example 8

According to one embodiment of the invention, there is provided a composition comprising:
a polymer having a structural unit represented by at least one of formulae (1-1), (1-2) and (1-3) below; and
a curable compound

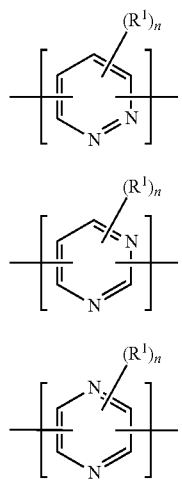

in formulae (1-1) to (1-3), R$^1$ is each independently a halogen atom, a monovalent hydrocarbon group having 1 to 20 carbon atoms, a monovalent halogenated hydrocarbon group having 1 to 20 carbon atoms, a nitro group, a cyano group, any of primary to tertiary amino groups or a salt of any of primary to tertiary amino groups; n is each independently an integer of 0 to 2; and when n is 2, two or more R$^1$ may be the same or different and may be joined together in any combination to form a part of a cyclic structure.

Application Example 9

In Application example 8 above, the curable compound may be at least one of an epoxy compound, a cyanate ester compound, a vinyl compound, a silicone compound, an oxazine compound, a maleimide compound and an allyl compound.

Application Example 10

In Application example 8 or Application example 9 above, the composition may further contain a curing auxiliary agent.

Application Example 11

According to one embodiment of the invention, there is provided a composition comprising the polymer of any one of Application example 1 to Application example 7 above and an organic solvent.

Application Example 12

According to one embodiment of the invention, there is provided a molded article comprising the polymer of any one of Application example 1 to Application example 7 above.

Application Example 13

According to one embodiment of the invention, there is provided a cured product obtained by curing the composition of any one of Application example 8 to Application example 10 above.

Application Example 14

According to one embodiment of the invention, there is provided a laminate comprising:
a substrate; and
a cured product layer formed on the substrate by using the composition of any one of Application example 8 to Application example 10 above.

The "hydrocarbon group" as used herein includes linear hydrocarbon groups and cyclic hydrocarbon groups unless otherwise stated. The "hydrocarbon group" may be a saturated hydrocarbon or an unsaturated hydrocarbon group. The "linear hydrocarbon group" refers to a hydrocarbon group that is formed only with a linear structure without containing a cyclic structure, and includes both straight chain hydrocarbon groups and branched hydrocarbon groups. The "cyclic hydrocarbon group" refers to a hydrocarbon group having a cyclic structure and includes both alicyclic hydrocarbon groups and aromatic hydrocarbon groups. The "alicyclic hydrocarbon group" refers to a hydrocarbon group that has only an alicyclic structure as a cyclic structure without an aromatic ring structure, and includes both monocyclic alicyclic hydrocarbon groups and polycyclic alicyclic hydrocarbon groups. However, the group is not required to be formed only with an alicyclic structure and may partially contain a linear structure. The "aromatic hydrocarbon group" refers to a hydrocarbon group that has an aromatic ring structure as a cyclic structure, and includes both monocyclic aromatic hydrocarbon groups and polycyclic aromatic hydrocarbon groups. However, the group is not required to be formed only with an aromatic ring structure and may partially contain a linear structure or an alicyclic structure. The "-membered" means the number of atoms that form a cyclic structure and when the ring is a polycycle, the terms means the number of atoms that form the polycycle.

Advantageous Effects of Invention

According to one embodiment of the invention, a novel polymer having high glass transition temperature and an excellent balance between heat resistance, high refractive index and mechanical properties such as tensile strength, and a composition and resin molded article containing the polymer may be provided. In particular, a novel polymer having high glass transition temperature, excellent heat resistance, high refractive index and excellent mechanical properties (CTE, elastic modulus and tensile strength), and a composition and molded article containing the polymer may be provided.

According to one embodiment of the invention, a novel polymer having an excellent balance between the solubility to various organic solvents, heat resistance and mechanical properties such as tensile strength, and a composition and molded article containing the polymer may be provided. In particular, a novel polymer having excellent solubility in various organic solvents, high glass transition temperature and 1% mass reduction temperature (Td1), excellent heat resistance and excellent mechanical properties (CTE, tensile elongation and tensile strength), and a composition and molded article containing the polymer may be provided.

According to the composition of one embodiment of the invention, the composition contains the specific polymer having excellent compatibility with a curable compound, and thus has excellent post-curing toughness and heat resistance. Further, according to the composition, a cured product having both high toughness and high heat resistance and a laminate containing the cured product may be provided. Moreover, according to the composition of one embodiment of the invention, a cured product having an excellent balance between toughness, heat resistance and chemical resistance and a laminate containing the cured product may be obtained. In particular, a cured product having both excellent toughness and excellent heat resistance and excellent chemical resistance and a laminate containing the cured product layer may be obtained.

DESCRIPTION OF EMBODIMENTS

The polymer, composition, molded article, cured product and laminate according to various embodiments of the invention are described in detail below.
<Polymer>
The polymer (hereinafter also referred to as "polymer [A]") according to the invention is not particularly limited, as far as the polymer has the first structural unit, as to other structures and the sequence of structural units. However, in view of high glass transition temperature and an excellent balance between heat resistance, high refractive index and mechanical properties such as tensile strength, the polymer is preferably a polymer having the first structural unit and the second structural unit, and in view of an excellent balance between solubility to various organic solvents, heat resistance and mechanical properties such as tensile strength, the polymer is preferably a polymer having the first structural unit and the third structural unit. The polymer [A] may have two or more of each structural unit. The polymer [A] may have a structural unit other than the first, second and third structural units. When the polymer [A] has the first structural unit and the second structural unit, the polymer may have repeating units (a) to (c) containing the first and second structural units as described hereinafter, and may further have another repeating unit. When the polymer [A] has the first structural unit and the third structural unit, the polymer may have repeating units (d) to (i) containing the first and third structural units as described hereinafter, and may further have another repeating unit.

[First Structural Unit]

The first structural unit in the polymer [A] is represented by at least one of formulae (1-1), (1-2) and (1-3) below:

(1-1)

(1-2)

(1-3)

in formulae (1-1) to (1-3), $R^1$ is each independently a halogen atom, a monovalent hydrocarbon group having 1 to 20 carbon atoms, a monovalent halogenated hydrocarbon group having 1 to 20 carbon atoms, a nitro group, a cyano group, any of primary to tertiary amino groups or a salt of any of primary to tertiary amino groups; n is each independently an integer of 0 to 2; and when n is 2, two or more $R^1$ may be the same or different and may be joined together in any combination to form a part of a cyclic structure.

Examples of the halogen atom represented by $R^1$ include a fluorine atom, a chlorine atom, a bromine atom, an iodine atom and the like.

Examples of the monovalent hydrocarbon group having 1 to 20 carbon atoms represented by $R^1$ include monovalent linear hydrocarbon groups, monovalent alicyclic hydrocarbon groups, monovalent aromatic hydrocarbon groups and the like.

Examples of the monovalent linear hydrocarbon group include alkyl groups such as a methyl group, an ethyl group, a n-propyl group, an i-propyl group, a n-butyl group, an i-butyl group, a sec-butyl group, a t-butyl group and a n-pentyl group; alkenyl groups such as an ethenyl group, a propenyl group, a butenyl group and a pentenyl group; alkynyl groups such as an ethynyl group, a propynyl group, a butynyl group and a pentynyl group; and the like.

Examples of the monovalent alicyclic hydrocarbon group include monocyclic cycloalkyl groups such as a cyclopropyl group, a cyclobutyl group, a cyclopentyl group and a cyclohexyl group; polycyclic cycloalkyl groups such as a norbornyl group and an adamantyl group; monocyclic cycloalkenyl groups such as a cyclopropenyl group, a cyclobutenyl group, a cyclopentenyl group and a cyclohexenyl group; polycyclic cycloalkenyl groups such as a norbornenyl group; and the like.

Examples of the monovalent aromatic hydrocarbon group include aryl groups such as a phenyl group, a tolyl group, a xylyl group, a naphthyl group and an anthryl group; aralkyl groups such as a benzyl group, a phenethyl group, a phenylpropyl group and a naphthylmethyl group; and the like.

Examples of the monovalent halogenated hydrocarbon group having 1 to 20 carbon atoms represented by $R^1$ include the groups in which some or all of hydrogen atoms in the groups exemplified as the monovalent hydrocarbon group having 1 to 20 carbon atoms represented by $R^1$ are substituted with a halogen atom such as a fluorine atom, a chlorine atom, a bromine atom and an iodine atom.

The substituent in the secondary amino group and tertiary amino group represented by $R^1$ is not particularly limited, and examples thereof include the groups exemplified as the monovalent hydrocarbon group having 1 to 20 carbon atoms represented by $R^1$. The cation that forms the cationic moiety in the salt of any of primary to tertiary amino groups represented by $R^1$ is not particularly limited, and may be any well-known cation such as $Na^+$.

In view of improving the polymerization reactivity of monomers that provide the first structural unit and improving the solubility in various organic solvents, $R^1$ is preferably a halogen atom, a monovalent hydrocarbon group having 1 to 6 carbon atoms, a monovalent halogenated hydrocarbon group having 1 to 6 carbon atoms, a nitro group, a cyano group, any of primary to tertiary amino groups or a salt of any of primary to tertiary amino groups, and more preferably a fluorine atom, a chlorine atom, a methyl group, a nitro group, a cyano group, a t-butyl group, a phenyl group or an amino group. In the same point of view, n is preferably 0 or 1 and more preferably 0.

The position of a bond relative to another bond in the first structural unit is not particularly limited. However, in view of improving the polymerization reactivity of monomers that provide the first structural unit, the position is preferably the meta-position.

In view of improving the polymerization reactivity of monomers that provide the first structural unit and improving the solubility in various organic solvents, the first structural unit is preferably a structural unit represented by formula (1-2) above having a pyrimidine skeleton.

Examples of the monomers that provide the first structural unit in the polymer [A] include 4,6-dichloropyrimidine, 4,6-dibromopyrimidine, 2,4-dichloropyrimidine, 2,5-dichloropyrimidine, 2,5-dibromopyrimidine, 5-bromo-2-chloropyrimidine, 5-bromo-2-fluoropyrimidine, 5-bromo-2-iodopyrimidine, 2-chloro-5-fluoropyrimidine, 2-chloro-5-iodopyrimidine, 2,4-dichloro-5-fluoropyrimidine, 2,4-dichloro-5-iodopyrimidine, 5-chloro-2,4,6-trifluoropyrimidine, 2,4,6-trichloropyrimidine, 4,5,6-trichloropyrimidine, 2,4,5-trichloropyrimidine, 2,4,5,6-tetrachloropyrimidine, 2-phenyl-4,6-dichloropyrimidine, 2-methylthio-4,6-dichloropyrimidine, 2-methylsulfonyl-4,6-dichloropyrimidine, 5-methyl-4,6-dichloropyrimidine, 2-amino-4,6-dichloropyrimidine, 5-amino-4,6-dichloropyrimidine, 2,5-diamino-4,6-dichloropyrimidine, 4-amino-2,6-dichloropyrimidine, 5-methoxy-4,6-dichloropyrimidine, 5-methoxy-2,4-dichloropyrimidine, 5-fluoro-2,4-dichloropyrimidine, 5-bromo-2,4-dichloropyrimidine, 5-iodo-2,4-dichloropyrimidine, 2-methyl-4,6-dichloropyrimidine, 5-methyl-4,6-dichloropyrimidine, 6-methyl-2,4-dichloropyrimidine, 5-methyl-2,4-dichloropyrimidine, 5-nitro-2,4-dichloropyrimidine, 4-amino-2-chloro-5-fluoropyrimidine, 2-methyl-5-amino-4,6-dichloropyrimidine, 5-bromo-4-chloro-2-methylthiopyrimidine;

3,6-dichloropyridazine, 3,5-dichloropyridazine, 4-methyl-3,6-dichloropyridazine;

2,3-dichloropyrazine, 2,6-dichloropyrazine, 2,5-dibromopyrazine, 2,6-dibromopyrazine, 2-amino-3,5-dibromopyrazine, 5,6-dicyano-2,3-dichloropyrazine and the like. The monomers may be used respectively alone or may be used in a combination of two or more.

The lower limit of the content of the first structural unit in the polymer [A] is, relative to the sum of all structural units in the polymer [A] which is regarded as 100% by mole, preferably 5% by mole, more preferably 10% by mole, still more preferably 20% by mole and particularly preferably 33% by mole. The upper limit of the content is preferably 95% by mole, more preferably 67% by mole, still more preferably 60% by mole and particularly preferably 50% by mole. By configuring the content to be in the above range, the heat resistance, high refractive index, mechanical properties and solubility in various organic solvents may be further improved.

[Second Structural Unit]

The polymer [A] may have, in addition to the first structural unit, a structural unit (hereinafter also referred to as "second structural unit") represented by formula (2) below:

(2)

in formula (2), $A^1$ and $A^2$ are respectively and independently —O—, —S— or —N($R^2$)—; $R^2$ is a hydrogen atom or a monovalent hydrocarbon group having 1 to 20 carbon atoms; and X is a bivalent organic group.

Examples of the monovalent hydrocarbon group having 1 to 20 carbon atoms represented by $R^2$ include the groups exemplified as the monovalent hydrocarbon group having 1 to 20 carbon atoms represented by $R^1$ in formulae (1-1) to (1-3) above. In view of improving the polymerization reactivity of monomers that provide the second structural unit, $R^2$ is preferably a hydrogen atom or a monovalent hydrocarbon group having 1 to 10 carbon atoms. When $A^1$ and $A^2$ are both —N($R^2$)—, two $R^2$ may be the same or different.

When $A^1$ and $A^2$ are both —N($R^2$)— in formula (2) above, the second structural unit is a structural unit having either a secondary amino structure or a tertiary amino structure at two or more terminals. In this case, the number of terminals that is either a secondary amino structure or a tertiary amino structure is not particularly limited as far as it is 2 or more, and preferably 2 to 15, more preferably 2 to 10 and still more preferably 2 to 5. The number of the terminals in the above range is preferable in view of improving the polymerization reactivity of monomers that provide the second structural unit.

When $A^1$ and $A^2$ are both —O— in formula (2) above, the lower limit of the content of the structural unit represented by formula (2) above is, relative to the sum of all structural units in the polymer [A] which is regarded as 100% by mole, preferably 1% by mole, more preferably 5% by mole and still more preferably 10% by mole. The upper limit of the content is preferably 40% by mole and more preferably 30% by mole. When the content is in the above range, the molecular weight may be easily adjusted within the range that does not deteriorate the above effects and the solubility in various organic solvents may be further improved.

Examples of the bivalent organic group represented by X in formula (2) above include the group represented by formula (2-1) below:

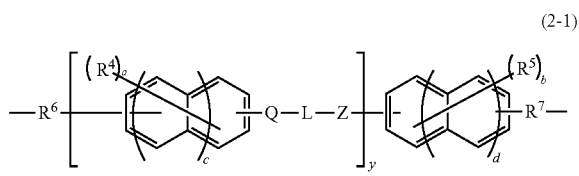

(2-1)

in formula (2-1), $R^4$ and $R^5$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; c and d are respectively and independently an integer of 0 to 2; a and b are respectively and independently an integer of 0 to 8; when a is 2 or more, two or more $R^4$ may be the same or different and may be joined together in any combination to form a part of a cyclic structure; when b is 2 or more, two or more $R^5$ may be the same or different and may be joined together in any combination to form a part of a cyclic structure; Q and Z are respectively and independently a single bond, —O—, —S— or —N($R^7$)—; $R^{17}$ is a hydrogen atom, a monovalent hydrocarbon group having 1 to 20 carbon atoms or a monovalent halogenated hydrocarbon group having 1 to 20 carbon atoms; L is a single bond or a bivalent organic group; y is an integer of 0 to 5; when y is 2 or more, two or more Q, L and Z may be respectively the same or different; when y is 2 or more and a is 1 or more, two or more $R^4$ may be the same or different; $R^6$ and $R^7$ are respectively and independently a single bond, a methylene group or an alkylene group having 2 to 4 carbon atoms.

Examples of the halogen atom represented by $R^4$ and $R^5$ include the halogen atoms exemplified as the halogen atom represented by $R^1$ in formulae (1-1) to (1-3) above.

Examples of the monovalent hydrocarbon group having 1 to 20 carbon atoms represented by $R^4$ and $R^5$ include the groups exemplified as the monovalent hydrocarbon group having 1 to 20 carbon atoms represented by $R^1$ in formulae (1-1) to (1-3) above.

Examples of the monovalent halogenated hydrocarbon group having 1 to 20 carbon atoms represented by $R^4$ and $R^5$ include the groups in which some or all of hydrogen atoms in the groups exemplified as the monovalent hydrocarbon group having 1 to 20 carbon atoms represented by $R^1$ in formulae (1-1) to (1-3) above are substituted with a halogen atom such as a fluorine atom, a chlorine atom, a bromine atom and an iodine atom.

Examples of the alkoxy group having 1 to 20 carbon atoms represented by $R^4$ and $R^5$ include a methoxy group, an ethoxy group, a n-propoxy group, an i-propoxy group, a n-butoxy group, a 2-methylpropoxy group, a 1-methylpropoxy group, a t-butoxy group, a n-pentyloxy group and the like.

Examples of the alkylthio group having 1 to 20 carbon atoms represented by $R^4$ and $R^5$ include a methylthio group, an ethylthio group, a n-propylthio group, an i-propylthio group, a n-butylthio group, a 2-methylpropylthio group, a 1-methylpropylthio group, a t-butylthio group, a n-pentylthio group and the like.

The substituent in the secondary amino group and tertiary amino group represented by $R^4$ and $R^5$ is not particularly limited, and examples thereof include the groups exemplified as the monovalent hydrocarbon group having 1 to 20 carbon atoms represented by $R^1$ in formulae (1-1) to (1-3) above. The secondary amino group and tertiary amino group represented by $R^4$ and $R^5$ may form the terminal described above that is formed either with a secondary amino structure or a tertiary amino structure.

The cation that forms the cationic moiety in the salt of carboxy group, the salt of sulfo group, the salt of phosphonic acid group, the salt of phosphate group, the salt of hydroxy group and the salt of any of primary to tertiary amino groups represented by $R^4$ and $R^5$ is not particularly limited, and may be any well-known cation such as $Na^+$.

In view of improving the polymerization reactivity of monomers that provide the second structural unit, $R^4$ and $R^5$ are respectively preferably a halogen atom, a monovalent hydrocarbon group having 1 to 3 carbon atoms, a monovalent halogenated hydrocarbon group having 1 to 3 carbon atoms an alkoxy group having 1 to 3 carbon atoms, an alkylthio group having 1 to 3 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups, and more preferably a fluorine atom, a chlorine atom, a methyl group, an ethyl group, a fluoromethyl group, a methoxy group, a methylthio group, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups. In the same point of view, a and b are respectively preferably 0 to 8, more preferably 0 to 4 and particularly preferably 0 to 2. Further, in the same point of view, c and d are respectively preferably 0 to 2 and more preferably 0 or 1.

$R^{17}$ in —N($R^7$)— represented by Q and Z is a hydrogen atom, a monovalent hydrocarbon group having 1 to 20 carbon atoms or a monovalent halogenated hydrocarbon group having 1 to 20 carbon atoms. Examples of the monovalent hydrocarbon group having 1 to 20 carbon atoms represented by $R^{17}$ include the groups exemplified as the monovalent hydrocarbon group having 1 to 20 carbon atoms represented by $R^1$ in formulae (1-1) to (1-3) above. Examples of the monovalent halogenated hydrocarbon group having 1 to 20 carbon atoms represented by $R^{17}$ include the groups in which some or all of hydrogen atoms in the groups exemplified as the monovalent hydrocarbon group having 1 to 20 carbon atoms represented by $R^1$ in formulae (1-1) to (1-3) above are substituted with a halogen atom such as a fluorine atom, a chlorine atom, a bromine atom and an iodine atom. $R^{17}$ is preferably a hydrogen atom, a monovalent hydrocarbon group having 1 to 3 carbon atoms or a monovalent halogenated hydrocarbon group having 1 to 3 carbon atoms.

Examples of the bivalent organic group represented by L include —O—, —S—, —C(O)—, —S(O)—, —S(O)$_2$—, —C(O)—NH—, —C(O)—O—, a methylene group, an alkylene group having 2 to 20 carbon atoms, a halogenated methylene group, a halogenated alkylene group having 2 to 20 carbon atoms, a bivalent cardo structure and the like.

Examples of the alkylene group having 2 to 20 carbon atoms represented by L include an ethylene group, a n-propylene group, an isopropylene group, a n-butylene group, a sec-butylene group, a t-butylene group, a neopentylene group, a 4-methyl-pentane-2-diyl group, a nonane-1,9-diyl group and the like.

Examples of the halogenated methylene group represented by L include the groups in which some or all of hydrogen atoms in a methylene group are substituted with a halogen atom such as a fluorine atom, a chlorine atom, a bromine atom and an iodine atom.

Examples of the halogenated alkylene group having 2 to 20 carbon atoms represented by L include the groups in which some or all of hydrogen atoms in the groups exemplified as the alkylene group having 2 to 20 carbon atoms represented by L are substituted with a halogen atom such as a fluorine atom, a chlorine atom, a bromine atom and an iodine atom.

Examples of the bivalent cardo structure represented by L include bivalent groups derived from fluorene (i.e., groups obtained by eliminating 2 hydrogen atoms from fluorene), bivalent groups derived from phenolphthalein (i.e., groups obtained by eliminating 2 hydrogen atoms from phenolphthalein), the group represented by formula (L1) below and the like. In the bivalent groups derived from fluorene and bivalent groups derived from phenolphthalein, some or all of the hydrogen atoms may be substituted with a monovalent linear hydrocarbon group having 1 to 20 carbon atoms, and some or all of hydrogen atoms including those in the substituent(s) may be substituted with a fluorine atom:

(L1)

in formula (L1), $R^c$ is a 5- to 30-membered bivalent alicyclic hydrocarbon group.

Examples of the 5- to 30-membered bivalent alicyclic hydrocarbon group represented by $R^c$ include 5- to 15-membered monocyclic alicyclic hydrocarbon groups, 5- to 15-membered monocyclic fluorinated alicyclic hydrocarbon groups, 7- to 30-membered polycyclic alicyclic hydrocarbon groups, 7- to 30-membered polycyclic fluorinated alicyclic hydrocarbon groups and the like.

Examples of the 5- to 15-membered monocyclic alicyclic hydrocarbon group include a cyclopentane-1,1-diyl group, a cyclohexane-1,1-diyl group, a 3,3,5-trimethylcyclohexane-1,1-diyl group, a cyclopentene-3,3-diyl group, a cyclohexene-3,3-diyl group, a cyclooctane-1,1-diyl group, a cyclodecane-1,1-diyl group, a cyclododecane-1,1-diyl group, the groups in which some or all hydrogen atoms in the foregoing groups are substituted with a monovalent linear hydrocarbon group having 1 to 20 carbon atoms.

Examples of the 5- to 15-membered monocyclic fluorinated alicyclic hydrocarbon group include the groups in which some or all hydrogen atoms in the groups exemplified as the 5- to 15-membered monocyclic alicyclic hydrocarbon group are substituted with a fluorine atom.

Examples of the 7- to 30-membered polycyclic alicyclic hydrocarbon group include the groups obtained by eliminating 2 hydrogen atoms binding to one carbon atom in polycyclic alicyclic hydrocarbons such as norbornane, norbornene, adamantane, tricyclo[5.2.1.0$^{2,6}$]decane, tricyclo[5.2.1.0$^{2,6}$]heptane, pinane, camphane, decalin, nortricyclan, perhydroanthracene, perhydroazulene, cyclopentanohydrophenanthrene and bicyclo[2.2.2]-2-octene, the groups in which some or all hydrogen atoms in the foregoing groups are substituted with a monovalent linear hydrocarbon group having 1 to 20 carbon atoms.

Examples of the 7- to 30-membered polycyclic fluorinated alicyclic hydrocarbon group include the groups in which some or all hydrogen atoms in the groups exemplified as the 7- to 30-membered polycyclic alicyclic hydrocarbon groups are substituted with a fluorine atom.

In view of the structure stability of the polymer [A], L is preferably a single bond, —O—, —S—, —C(O)—, —S(O)—, —S(O)$_2$—, —C(O)—NH—, —C(O)—O—, a methylene group, an alkylene group having 2 to 5 carbon atoms, a halogenated methylene group, a halogenated alkylene group having 2 to 10 carbon atoms or a bivalent cardo structure. In the same point of view, y is preferably 0 to 4 and more preferably 0 to 3.

Examples of the alkylene group having 2 to 4 carbon atoms represented by $R^6$ and $R^7$ include an ethylene group, a n-propylene group, an isopropylene group, a n-butylene group, a sec-butylene group, a t-butylene and the like. In view of improving the polymerization reactivity of monomers that provide the second structural unit, $R^6$ and $R^7$ are respectively preferably a single bond, a methylene group or an ethylene group.

Further, examples of the bivalent organic group represented by X in formula (2) above include the group represented by formula (2-2) below:

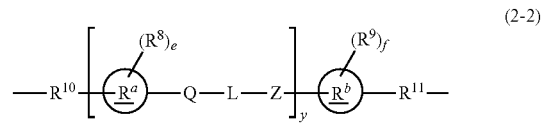

(2-2)

in formula (2-2), $R^a$ and $R^b$ are respectively and independently a 5- to 30-membered bivalent alicyclic hydrocarbon skeleton; $R^8$ and $R^9$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; e and f are respectively and independently an integer of 0 to 20; when e is 2 or more, two or more $R^8$ may be the same or different and may be joined together in any combination to form a part of a cyclic structure; when f is 2 or more, two or more $R^9$ may be the same or different and may be joined together in any combination to form a part of a cyclic structure; Q and Z are respectively and independently a single bond, —O—, —S— or —N($R^{18}$)—; $R^{18}$ is a hydrogen atom, a monovalent hydrocarbon group having 1 to 20 carbon atoms or a monovalent halogenated hydrocarbon group having 1 to 20 carbon atoms; L is a single bond or a bivalent organic group; y is an integer of 0 to 5; when y is 2 or more, two or more Q, L and Z may be respectively the same or different; when y is 2 or more and e is 1 or more, two or more $R^8$ may be the same or different; $R^{10}$ and $R^{11}$ are respectively and independently a single bond, a methylene group or an alkylene group having 2 to 4 carbon atoms.

Examples of the 5- to 30-membered bivalent alicyclic hydrocarbon skeleton represented by $R^a$ and $R^b$ include 5- to 15-membered monocyclic alicyclic hydrocarbon skeletons, 7- to 30-membered polycyclic alicyclic hydrocarbon skeletons and the like. The position of a bond relative to another bond in the 5- to 30-membered bivalent alicyclic hydrocarbon skeleton represented by $R^a$ and $R^b$, respectively, is not particularly limited.

Examples of the 5- to 15-membered monocyclic alicyclic hydrocarbon skeleton include a cyclopentane-diyl group, a cyclohexane-diyl group, a cyclopentene-diyl group, a cyclohexene-diyl group, a cyclooctane-diyl group, a cyclodecane-diyl group, a cyclododecane-diyl group and the like.

Examples of the 7- to 30-membered polycyclic alicyclic hydrocarbon skeleton include the groups obtained by eliminating 2 hydrogen atoms in polycyclic alicyclic hydrocarbons such as norbornane, norbornene, adamantane, tricyclo[5.2.1.0$^{2,6}$]decane, tricyclo[5.2.1.0$^{2,6}$]heptane, pinane, camphane, decalin, nortricyclan, perhydroanthracene, perhydroazulene, cyclopentanohydrophenanthrene and bicyclo[2.2.2]-2-octene.

In view of maintaining high heat resistance, high refractive index and high mechanical properties, the 5- to 30-membered bivalent alicyclic hydrocarbon skeleton represented by $R^a$ and $R^b$, respectively, is preferably a cyclopentane-diyl group, a cyclohexane-diyl group, a group obtained by eliminating 2 hydrogen atoms in norbornene or a group in which some or all hydrogen atoms in the foregoing groups are substituted with $R^8$ or $R^9$.

For $R^8$ or $R^9$, respectively, in formula (2-2), all descriptions for $R^4$ in formula (2-1) may be applied as they are. In view of improving the polymerization reactivity of monomers that provide the second structural unit, e and f are respectively preferably 0 to 10 and more preferably 0 to 5.

For Q, Z, $R^{18}$, L and y in formula (2-2), all descriptions for Q, Z, $R^{17}$, L and y, respectively, in formula (2-1) may be applied as they are.

For $R^{10}$ and $R^{11}$ in formula (2-2), all descriptions for $R^6$ and $R^7$, respectively, in formula (2-1) may be applied as they are.

Further, examples of the bivalent organic group represented by X in formula (2) above include the group represented by formula (2-3) below:

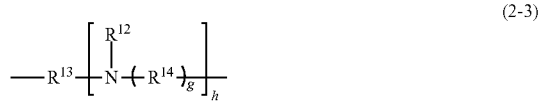

(2-3)

in formula (2-3), $R^{12}$ is a hydrogen atom, a monovalent hydrocarbon group having 1 to 20 carbon atoms or a monovalent halogenated hydrocarbon group having 1 to 20 carbon atoms; $R^{13}$ and $R^{14}$ are respectively and independently a bivalent linear or alicyclic hydrocarbon group having 1 to 20 carbon atoms or a bivalent linear or alicyclic halogenated hydrocarbon group having 1 to 20 carbon atoms; g is 0 or 1; h is an integer of 1 to 10; and when h is 2 or more, two or more $R^{12}$ and $R^{14}$ may be respectively the same or different.

Examples of the monovalent hydrocarbon group having 1 to 20 carbon atoms represented by $R^{12}$ include the groups exemplified as the monovalent hydrocarbon group having 1 to 20 carbon atoms represented by $R^1$ in formulae (1-1) to (1-3) above.

Examples of the monovalent halogenated hydrocarbon group having 1 to 20 carbon atoms represented by $R^{12}$ include the groups in which some or all hydrogen atoms of the groups exemplified as the monovalent hydrocarbon group having 1 to 20 carbon atoms represented by $R^1$ in formulae (1-1) to (1-3) are substituted with a halogen atom such as a fluorine atom, a chlorine atom, a bromine atom and an iodine atom.

In view of improving the polymerization reactivity of monomers that provide the second structural unit, $R^{12}$ is preferably a hydrogen atom, a monovalent hydrocarbon group having 1 to 3 carbon atoms or a monovalent halogenated hydrocarbon group having 1 to 3 carbon atoms.

Examples of the bivalent linear hydrocarbon group having 1 to 20 carbon atoms represented by $R^{13}$ and $R^{14}$ include straight chain or branched alkylene groups such as a methylene group, an ethylene group, a 1,2-propylene group, a 1,3-propylene group, a tetramethylene group, a pentamethylene group, a hexamethylene group, a 1-methyl-1,3-propylene group, a 2-methyl-1,3-propylene group, a 2-methyl-1,2-propylene group, a 1-methyl-1,4-butylene group and a 2-methyl-1,4-butylene group.

Examples of the bivalent alicyclic hydrocarbon group (the number of carbon atoms; 3 to 20) represented by $R^{13}$ and $R^{14}$ include monocyclic hydrocarbon groups including a cyclopropylene group, cyclobutylene groups such as a 1,3-cyclobutylene group, cyclopentylene groups such as a 1,3-cyclopentylene group and cyclohexylene groups such as a 1,4-cyclohexylene group; polycyclic hydrocarbon groups including norbornylene groups such as a 1,4-norbornylene group and a 2,5-norbornylene group and adamantylene groups such as a 1,5-adamantylene group and a 2,6-adamantylene group.

Examples of the bivalent linear or alicyclic halogenated hydrocarbon group having 1 to 20 carbon atoms represented by $R^{13}$ and $R^{14}$ include the groups in which some or all hydrogen atoms in the groups exemplified as the bivalent linear or alicyclic hydrocarbon group having 1 to 20 carbon atoms represented by $R^{13}$ and $R^{14}$ are substituted with a halogen atom such as a fluorine atom, a chlorine atom, a bromine atom and an iodine atom.

In view of improving the polymerization reactivity of monomers that provide the second structural unit, $R^{13}$ and $R^{14}$ are respectively preferably a bivalent linear hydrocarbon group having 1 to 3 carbon atoms, a bivalent alicyclic hydrocarbon group having 4 to 10 carbon atoms, a bivalent linear halogenated hydrocarbon group having 1 to 3 carbon atoms or a bivalent alicyclic halogenated hydrocarbon group having 4 to 10 carbon atoms. In the same point of view, h is preferably 0 to 5 and more preferably 0 to 3.

Further, examples of the bivalent organic group represented by X in formula (2) above include the group represented by formula (2-4) below:

(2-4)

in formula (2-4), $R^{15}$ and $R^{16}$ are respectively and independently a bivalent linear or alicyclic hydrocarbon group having 1 to 20 carbon atoms or a bivalent linear or alicyclic halogenated hydrocarbon group having 1 to 20 carbon atoms; i is 0 or 1; j is an integer of 1 to 10; and when j is 2 or more, two or more $R^{16}$ may be the same or different.

For $R^{15}$ and $R^{16}$ in formula (2-4), all descriptions for $R^{13}$ and $R^{14}$ in formula (2-3) may be applied as they are. In view of improving the polymerization reactivity of monomers that provide the second structural unit, j is preferably 0 to 5 and more preferably 0 to 3.

Further, examples of the bivalent organic group represented by X in formula (2) above include the group represented by formula (2-5) below:

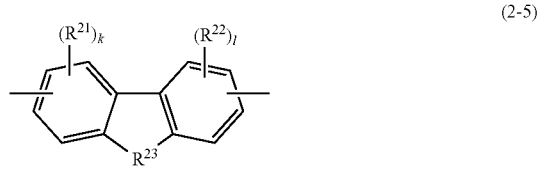

(2-5)

in formula (2-5), $R^{21}$ and $R^{22}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; k and l are respectively and independently an integer of 0 to 3; when k is 2 or 3, two or more $R^{21}$ may be the same or different; when l is 2 or 3, two or more $R^{22}$ may be the same or different; $R^{23}$ is a single bond, —O—, —S—, —C(O)—, —S(O)— or —S(O)$_2$—.

For $R^{21}$ and $R^{22}$ in formula (2-5), all descriptions for $R^4$ and $R^5$, respectively, in formula (2-1) may be applied as they are. In view of improving the polymerization reactivity of monomers that provide the second structural unit, k and l in formula (2-5) are respectively preferably 0 to 2 and more preferably 0 to 1.

Further, examples of bivalent organic group represented by X in formula (2) above include the group represented by formula (2-6) below:

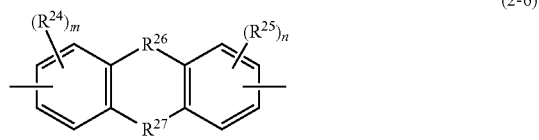

(2-6)

in formula (2-6), $R^{24}$ and $R^{25}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; m and n are respectively and independently an integer of 0 to 3; when m is 2 or 3, two or more $R^{24}$ may be the same or different; when n is 2 or more, two or more $R^{25}$ may be the same or different; $R^{26}$ and $R^{27}$ are respectively and independently a single bond, —O—, —S—, —C(O)—, —S(O)— or —S(O)$_2$—.

For $R^{24}$ and $R^{25}$ in formula (2-6), all descriptions for $R^4$ and $R^5$, respectively, in formula (2-1) may be applied as they are. In view of improving the polymerization reactivity of monomers that provide the second structural unit, m and n in formula (2-6) are respectively preferably 0 to 2 and more preferably 0 to 1.

Further, examples of the bivalent organic group represented by X in formula (2) above include the group represented by formula (2-7) below:

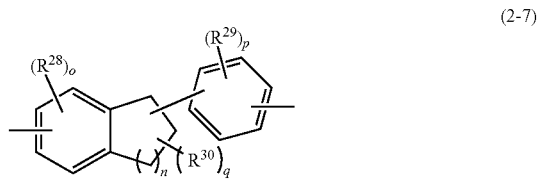

(2-7)

in formula (2-7), $R^{28}$ and $R^{29}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; o is an integer of 0 to 3; p is an integer of 0 to 4; when o is 2 or more, two or more $R^{28}$ may be the same or different; when p is 2 or more, two or more $R^{29}$ may be the same or different; n is an integer of 0 to 6; $R^{30}$ is a monovalent hydrocarbon group having 1 to 20 carbon atoms or a monovalent halogenated hydrocarbon group having 1 to 20 carbon atoms; q is an integer of 0 to 15; when q is 2 or more, two or more $R^{30}$ may be the same or different.

For $R^{28}$ and $R^{29}$ in formula (2-7), all descriptions for $R^4$ and $R^5$, respectively, in formula (2-1) may be applied as they are. In view of improving the polymerization reactivity of monomers that provide the second structural unit, o and p in formula (2-7) are respectively preferably 0 to 2 and more preferably 0 to 1.

Examples of the monovalent hydrocarbon group having 1 to 20 carbon atoms represented by $R^{30}$ in formula (2-7) include the groups exemplified as the monovalent hydrocarbon group having 1 to 20 carbon atoms represented by $R^1$ in formulae (1-1) to (1-3) above.

Examples of the monovalent halogenated hydrocarbon group having 1 to 20 carbon atoms represented by $R^{30}$ include the groups in which some or all hydrogen atoms in the groups exemplified as the monovalent hydrocarbon group having 1 to 20 carbon atoms represented by $R^1$ in formulae (1-1) to (1-3) above are substituted with a halogen atom such as a fluorine atom, a chlorine atom, a bromine atom and an iodine atom.

In view of improving the polymerization reactivity of monomers that provide the second structural unit, $R^{30}$ is preferably a hydrogen atom, a monovalent hydrocarbon group having 1 to 3 carbon atoms or a monovalent halogenated hydrocarbon group having 1 to 3 carbon atoms. In the same point of view, n is preferably 0 to 4 and more preferably 0 to 2. In the same point of view, q is preferably 0 to 11 and more preferably 0 to 7.

Further, examples of the bivalent organic group represented by X in formula (2) above include the group represented by formula (2-8) below:

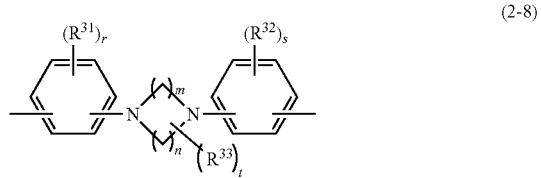

(2-8)

in formula (2-8), $R^{31}$ and $R^{32}$ are respectively and independently a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups; r and s are respectively and independently an integer of 0 to 4; when r is 2 or more, two or more $R^{31}$ may be the same or different; when s is 2 or more, two or more $R^{32}$ may be the same or different; m is an integer of 1 to 5; n is an integer of 0 to 5; $R^{33}$ is a monovalent hydrocarbon group having 1 to 20 carbon atoms or a monovalent halogenated hydrocarbon group having 1 to 20 carbon atoms; t is an integer of 0 to 20; when t is 2 or more, two or more $R^{33}$ may be the same or different.

For $R^{31}$ and $R^{32}$ in formula (2-8), all descriptions for $R^4$ and $R^5$, respectively, in formula (2-1) may be applied as they are. In view of improving the polymerization reactivity of monomers that provide the second structural unit, r and s respectively preferably 0 to 2 and more preferably 0 to 1. In the same point of view, m is preferably 1 to 3 and more preferably 1 to 2. In the same point of view, n is preferably 0 to 3 and more preferably 0 to 2.

Examples of the monovalent hydrocarbon group having 1 to 20 carbon atoms represented by $R^{33}$ in formula (2-8) include the groups exemplified as the monovalent hydrocarbon group having 1 to 20 carbon atoms represented by $R^1$ in formulae (1-1) to (1-3) above.

Examples of the monovalent halogenated hydrocarbon group having 1 to 20 carbon atoms represented by $R^{33}$ include the groups in which some or all hydrogen atoms in the groups exemplified as the monovalent hydrocarbon group having 1 to 20 carbon atoms represented by $R^1$ in formulae (1-1) to (1-3) above are substituted with a halogen atom such as a fluorine atom, a chlorine atom, a bromine atom and an iodine atom.

In view of improving the polymerization reactivity of monomers that provide the second structural unit, $R^{33}$ is preferably a hydrogen atom, a monovalent hydrocarbon group having 1 to 3 carbon atoms or a monovalent halogenated hydrocarbon group having 1 to 3 carbon atoms. In the same point of view, t is preferably 0 to 12 and more preferably 0 to 8.

Further, examples of the bivalent organic group represented by X in formula (2) above include a bivalent hydrocarbon group having 1 to 20 carbon atoms. Examples of the bivalent hydrocarbon group having 1 to 20 carbon atoms include bivalent linear hydrocarbon groups, bivalent alicyclic hydrocarbon groups having 3 to 20 carbon atoms, bivalent aromatic hydrocarbon groups having 6 to 20 carbon atoms and the like. Examples of the bivalent linear hydrocarbon group include the groups exemplified as the bivalent linear hydrocarbon groups having 1 to 20 carbon atoms represented by $R^{13}$ and $R^{14}$ in formula (2-3) above. Examples of the bivalent alicyclic hydrocarbon group include the groups exemplified as the bivalent alicyclic hydrocarbon group having 3 to 20 carbon atoms represented by $R^{13}$ and $R^{14}$ in formula (2-3) above. Examples of the bivalent aromatic hydrocarbon group include arylene groups such as a phenylene group, a tolylene group, a naphthylene group and anthrylene group.

When the bivalent organic group represented by X is a bivalent hydrocarbon group having 1 to 20 carbon atoms, in view of improving the polymerization reactivity of monomers that provide the second structural unit, a bivalent linear hydrocarbon group having 1 to 16 carbon atoms, a bivalent alicyclic hydrocarbon group having 3 to 10 carbon atoms or a bivalent aromatic hydrocarbon group having 6 to 20 carbon atoms is preferred.

Further, examples of the bivalent organic group represented by X in formula (2) above include a bivalent halogenated hydrocarbon group having 1 to 20 carbon atoms. Examples of the bivalent halogenated hydrocarbon group having 1 to 20 carbon atoms include the groups in which some or all hydrogen atoms in the groups exemplified as the bivalent hydrocarbon group having 1 to 20 carbon atoms represented by X are substituted with a halogen atom such as a fluorine atom, a chlorine atom, a bromine atom and an iodine atom.

When the bivalent organic group represented by X is a bivalent halogenated hydrocarbon group having 1 to 20 carbon atoms, in view of improving the polymerization reactivity of monomers that provide the second structural unit, a linear halogenated hydrocarbon group having 1 to 16 carbon atoms, an alicyclic halogenated hydrocarbon group having 3 to 10 carbon atoms or a halogenated aromatic hydrocarbon group having 6 to 20 carbon atoms is preferred.

Further, examples of bivalent organic group represented by X in formula (2) above include the 3- to 10-membered bivalent heterocyclic group. Examples of the 3- to 10-membered bivalent heterocyclic group include the groups obtained by eliminating two hydrogen atoms in nitrogen-containing heterocyclic compounds such as pyrazine, pyrimidine, pyridazine, triazine, pyrrole, 2H-pyrrole, imidazole, pyrazole, isothiazole, isoxazole, pyridine, indolizine, isoindole, 3H-indole, indole, 1H-indazole, purine, 4H-quinolidine, quinoline, isoquinoline, phthalazine, naphthyridine, quinoxaline, quinazoline, cinnoline, pteridine, carbazole, carboline, phenanthridine, acridine, perimidine, phenanthroline, phenazine, phenothiazine, furazan, phenoxazine, pyrrolidine, pyrroline, imidazoline, imidazolidine, pyrazolidine, pyrazoline, piperidine, piperazine, indoline, isoindoline, quinuclidine, oxazole, benzoxazole, 1,3,5-triazine, purine, tetrazole, tetrazine, triazole, phenarsazine, benzimidazole, benzotriazole, thiazole, benzothiazole, thiadiazole and benzothiadiazole.

Hydrogen atoms in the foregoing heterocyclic groups may be substituted with a halogen atom, a monovalent hydrocarbon group having 1 to 20 carbon atoms, a monovalent halogenated hydrocarbon group having 1 to 20 carbon atoms, an alkoxy group having 1 to 20 carbon atoms, an alkylthio group having 1 to 20 carbon atoms, a nitro group, a cyano group, a carboxy group, a sulfonic acid group, a phosphonic acid group, a phosphoric acid group, a hydroxy group, any of primary to tertiary amino groups, a salt of carboxy group, a salt of sulfo group, a salt of phosphonic acid group, a salt of phosphate group, a salt of hydroxy group or a salt of any of primary to tertiary amino groups. For the substituents, descriptions for $R^4$ and $R^5$ in formula (2-1) above may be applied.

When the bivalent organic group represented by X is a 3- to 10-membered bivalent heterocyclic group, in view of improving the polymerization reactivity of monomers that provide the second structural unit, a 3- to 10-membered bivalent nitrogen-containing heterocyclic group is preferred.

The second structural unit in the polymer [A] is preferably a structural unit represented by formula (2). In particular, in view of further improving the heat resistance, high refractive index and mechanical properties, X in formula (2) is preferably a group represented by formulae (2-1) to (2-4), a bivalent hydrocarbon group having 1 to 20 carbon atoms, a bivalent halogenated hydrocarbon group having 1 to 20 carbon atoms or a 3- to 10-membered bivalent heterocyclic group described above, and X in formula (2) is more preferably a group represented by formula (2-1), a group represented by formula (2-2) or a 3- to 10-membered bivalent heterocyclic group.

Examples of the monomers that provide the second structural unit in the polymer [A] include compounds represented by formulae (M-1) to (M-66) indicated below. The monomers may be used respectively alone or may be used in a combination of two or more. In formulae (M-1) to (M-66) below, A is —OH, —SH, —NH$_2$ or —N(R$^{35}$)H. R$^{35}$ is a monovalent hydrocarbon group having 1 to 20 carbon atoms. Examples of the monovalent hydrocarbon group having 1 to 20 carbon atoms include the groups exemplified as the monovalent hydrocarbon groups having 1 to 20 carbon atoms represented by R$^1$ in formulae (1-1) to (1-3) above. Two or more A in the respective compounds may be the same or different.

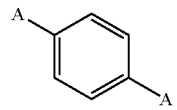

(M-1)

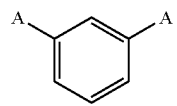

(M-2)

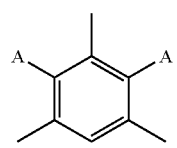

(M-3)

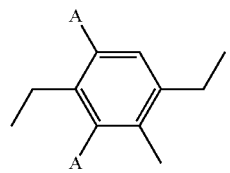

(M-4)

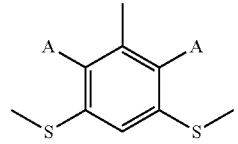

(M-5)

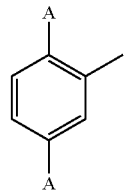

(M-6)

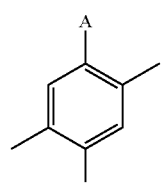

(M-7)

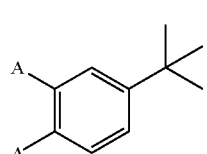

(M-8)

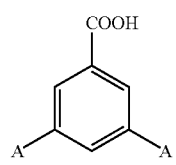

(M-9)

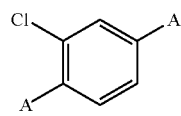

(M-10)

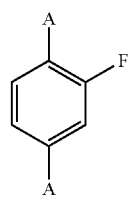

(M-11)

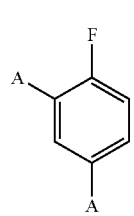

(M-12)

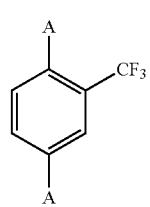

(M-13)

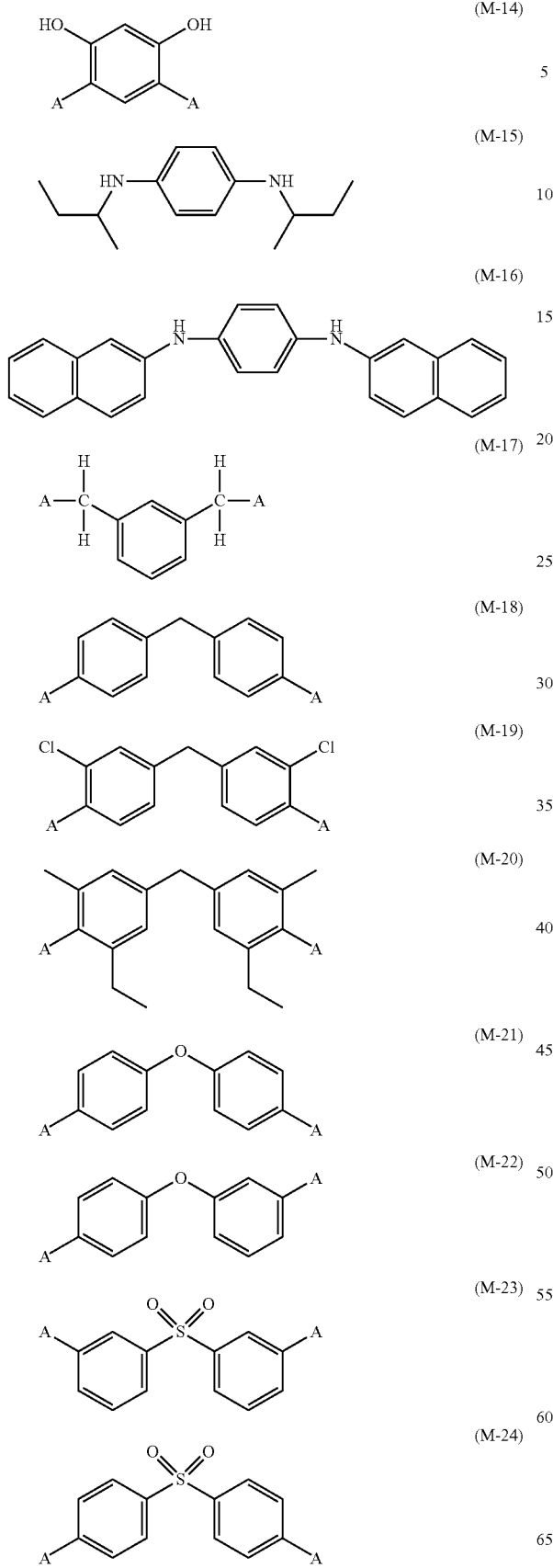
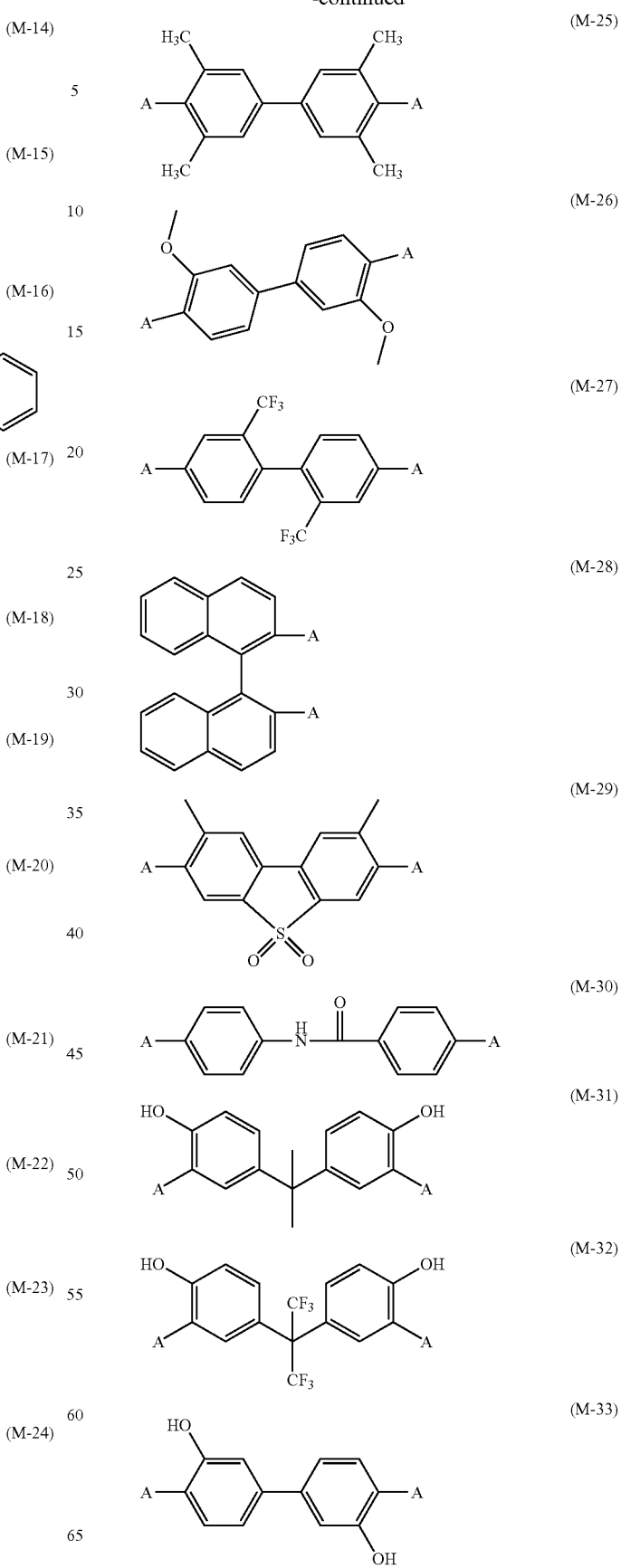

(M-34)
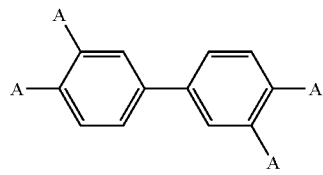
(M-35)
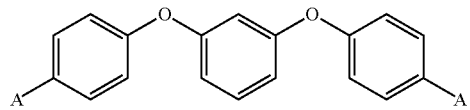
(M-36)
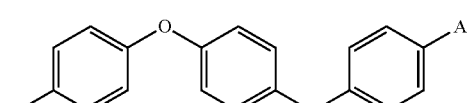
(M-37)
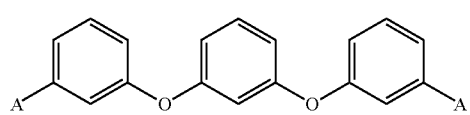
(M-38)
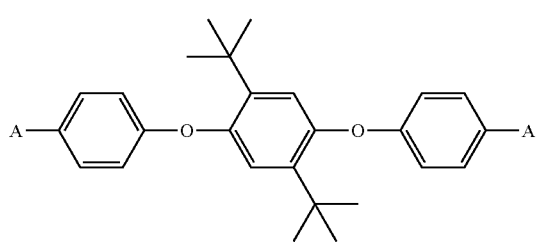
(M-39)
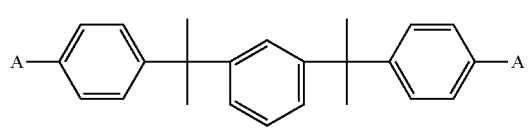
(M-40)
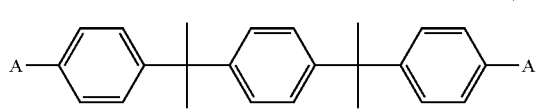
(M-41)
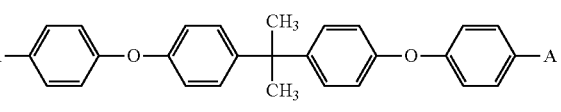
(M-42)
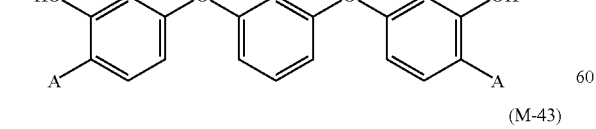
(M-43)
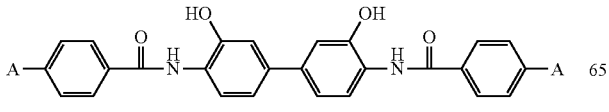
(M-44)
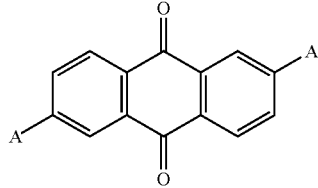
(M-45)
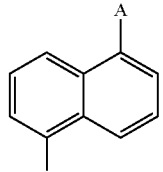
(M-46)
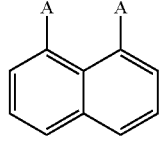
(M-47)
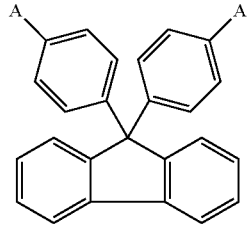
(M-48)
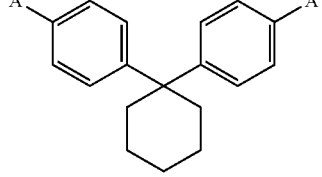
(M-49)
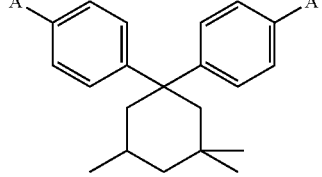
(M-50)
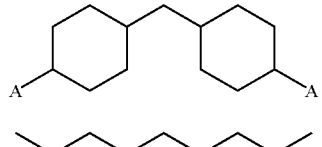
(M-51)
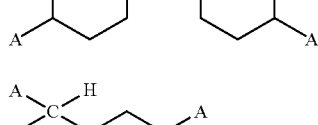
(M-52)
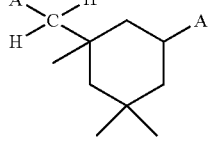

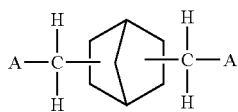 (M-53)

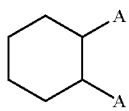 (M-54)

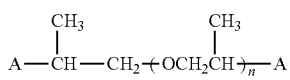 (M-55)

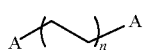 (M-56)

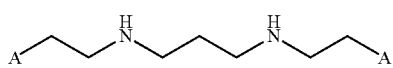 (M-57)

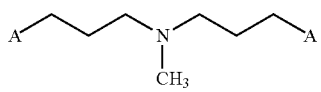 (M-58)

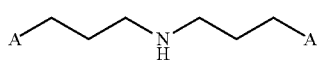 (M-59)

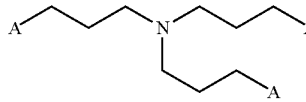 (M-60)

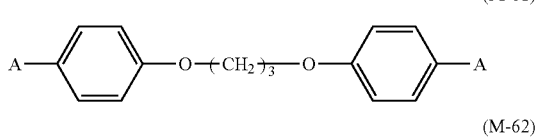 (M-61)

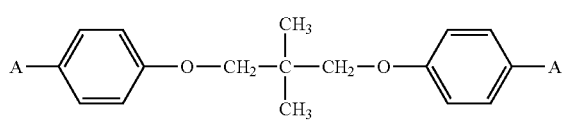 (M-62)

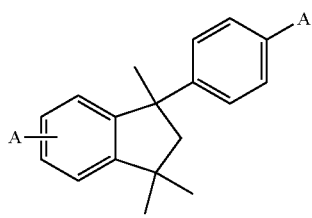 (M-63)

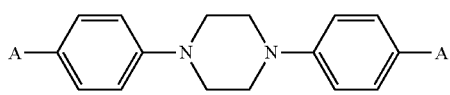 (M-64)

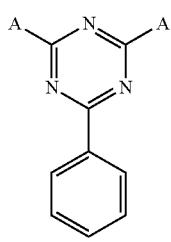 (M-65)

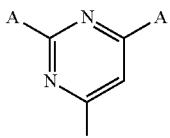 (M-66)

Among the compounds represented by formulae (M-1) to (M-66) above, compounds wherein A is —NH$_2$ are preferred and examples thereof include:

mononuclear aromatic diamine compounds such as compounds (M-1) to (M-17) above;

binuclear aromatic diamine compounds such as compounds (M-18) to (M-34) above;

trinuclear or above aromatic diamine compounds such as compounds (M-35) to (M-43) above;

condensed ring-containing diamine compounds such as compounds (M-44) to (M-46) above;

cardo structure-containing diamine compounds such as compounds (M-47) to (M-49) above;

alicyclic diamine compounds such as compounds (M-50) to (M-54) above;

aliphatic diamine compounds such as compounds (M-55) to (M-60) above;

other diamine compounds such as compounds (M-61) to (M-66) above and the like.

When the polymer [A] contains the first and second structural units, the respective structural units may be one type alone or two or more types. As described hereinafter, the polymer [A] may have a repeating unit (a), (b) or (c) containing the first and second structural units and may further have another repeating unit.

The lower limit of the content of the first structural unit in the polymer [A] is, relative to the sum of all structural units in the polymer [A] which is regarded as 100% by mole, preferably 5% by mole, more preferably 10% by mole, still more preferably 20% by mole and particularly preferably 33% by mole. The upper limit of the content is preferably 95% by mole, more preferably 67% by mole, still more preferably 60% by mole and particularly preferably 50% by mole. By configuring the content to be in the above range, the toughness, heat resistance and chemical resistance of cured products may be further improved.

When the polymer [A] has a second structural unit, the lower limit of the content of the second structural unit is, relative to the sum of all structural units in the polymer [A] which is regarded as 100% by mole, preferably 5% by mole, more preferably 10% by mole, still more preferably 20% by mole and particularly preferably 33% by mole. The upper limit of the content is preferably 95% by mole, more preferably 67% by mole, still more preferably 60% by mole and particularly preferably 50% by mole. By configuring the content to be in the above range, the toughness, heat resistance and chemical resistance of cured products may be further improved.

When A$^1$ and A$^2$ in the second structural unit are both —N(R$^2$)—, the lower limit of the content of the second structural unit in the polymer [A] is, relative to the sum of all structural units in the polymer [A] which is regarded as 100% by mole, preferably 5% by mole, more preferably 10% by mole, still more preferably 20% by mole and particularly preferably 33% by mole. The upper limit of the content is preferably 95% by mole, more preferably 67% by mole, still more preferably 60% by mole and particularly preferably 50% by mole. By configuring the content to be in the above range, the heat resistance, high refractive index and mechanical properties may be further improved.

[Third Structural Unit]

The polymer [A] may have, in addition to the first structural unit, a structural unit (hereinafter also referred to as "third structural unit") represented by at least one of formulae (3-1) and (3-2) below:

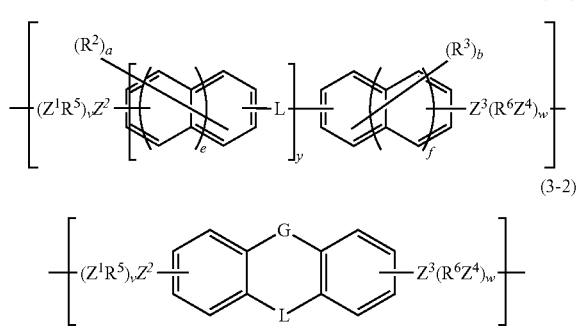

(3-1)

(3-2)

In formulae (3-1) and (3-2), $R^2$ and $R^3$ are respectively and independently a halogen atom, a monovalent hydrocarbon group having 1 to 20 carbon atoms, a monovalent halogenated hydrocarbon group having 1 to 20 carbon atoms, a nitro group or a cyano group; e and f are respectively and independently an integer of 0 to 2; a and b are respectively and independently an integer of 0 to 8; when a is 2 or more, two or more $R^2$ may be the same or different and may be joined together in any combination to form a part of a cyclic structure; when b is 2 or more, two or more $R^3$ may be the same or different and may be joined together in any combination to form a part of a cyclic structure; $Z^1$ to $Z^4$ are respectively and independently —O— or —S—: $R^5$ and $R^6$ are respectively and independently a methylene group or an alkylene group having 2 to 4 carbon atoms; v is an integer of 0 to 2; when v is 2, two $R^5$ may be the same or different, and two $Z^1$ may be the same or different; w is an integer of 0 to 2; when w is 2, two $R^6$ may be the same or different and two $Z^4$ may be the same or different; G is —O—, —S—, —C=O—, —SO— or —SO$_2$—; L is a bivalent group represented by formula (L-1) or (L-2) below; y is an integer of 1 to 3; when y is 2 or more, two or more L may be the same or different; when y is 2 or more and a is 1 or more, two or more $R^2$ may be the same or different:

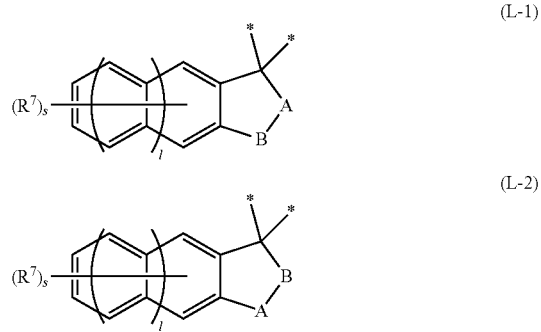

(L-1)

(L-2)

in formulae (L-1) and (L-2), A is each independently —C(O)—, —SO— or —SO$_2$—; B is each independently —O—, —S— or —N($R^8$)—; $R^8$ is a hydrogen atom, a halogen atom, a monovalent hydrocarbon group having 1 to 20 carbon atoms or a monovalent halogenated hydrocarbon group having 1 to 20 carbon atoms; $R^7$ is each independently a halogen atom, a monovalent hydrocarbon group having 1 to 20 carbon atoms, a monovalent halogenated hydrocarbon group having 1 to 20 carbon atoms, a nitro group or a cyano group; l is each independently an integer of 0 to 2; s is each independently an integer of 0 to 8; when s is 2 or more, two or more $R^7$ may be the same or different and may be joined together in any combination to form a part of a cyclic structure; and "*" indicates a bond.

Examples of the halogen atom represented by $R^2$ and $R^3$ include the halogen atoms exemplified as the halogen atom represented by $R^1$ in formula (1) above.

Examples of the monovalent hydrocarbon group having 1 to 20 carbon atoms represented by $R^2$ and $R^3$ include the monovalent hydrocarbon groups having 1 to 20 carbon atoms represented by $R^1$ in formula (1) above.

Examples of the monovalent halogenated hydrocarbon group having 1 to 20 carbon atoms represented by $R^2$ and $R^3$ include the monovalent halogenated hydrocarbon groups having 1 to 20 carbon atoms represented by $R^1$ in formula (1) above.

In view of improving the polymerization reactivity of monomers that provide the third structural unit, $R^2$ and $R^3$ are respectively preferably a halogen atom, a monovalent hydrocarbon group having 1 to 6 carbon atoms, a monovalent halogenated hydrocarbon group having 1 to 6 carbon atoms, a nitro group or a cyano group, more preferably a fluorine atom, a chlorine atom, a methyl group, a t-butyl group, a phenyl group, a nitro group or a cyano group and still more preferably a fluorine atom, a methyl group, a t-butyl group or a phenyl group.

In view of improving the polymerization reactivity of monomers that provide the third structural unit, a and b are respectively preferably 0 or 1 and more preferably 0. In the same point of view, e and f are preferably 0 or 1 and more preferably 0.

In view of the structural stability and polymerization activity of the polymer [A], $Z^1$ to $Z^4$ are respectively preferably —O—.

Examples of the alkylene group having 2 to 4 carbon atoms represented by $R^5$ and $R^6$ include an ethylene group, a n-propylene group, an isopropylene group, a n-butylene group, a sec-butylene group, a t-butylene and the like.

In view of improving the polymerization reactivity of monomers that provide the third structural unit, $R^5$ and $R^6$ are respectively preferably a methylene group or an ethylene group.

In view of improving the polymerization reactivity of monomers that provide the third structural unit, v and w are respectively preferably 0 or 1 and more preferably 0.

In view of improving the polymerization reactivity of monomers that provide the third structural unit, y is preferably 1 or 2 and more preferably 1.

In view of polymerization activity and heat resistance, G is preferably —O—.

L is a bivalent group represented by formula (L-1) or (L-2) above. Examples of the halogen atom represented by $R^7$ in formulae (L-1) and (L-2) above include the halogen atoms exemplified as the halogen atom represented by $R^1$ in formula (1) above.

Examples of the monovalent hydrocarbon group having 1 to 20 carbon atoms represented by $R^7$ include the monovalent hydrocarbon groups having 1 to 20 carbon atoms represented by $R^1$ in formula (1) above.

Examples of the monovalent halogenated hydrocarbon group having 1 to 20 carbon atoms represented by $R^7$ include the monovalent halogenated hydrocarbon groups having 1 to 20 carbon atoms represented by $R^1$ in formula (1) above.

In view of improving the polymerization reactivity of monomers that provide the third structural unit, $R^7$ is preferably a halogen atom, a monovalent hydrocarbon group having 1 to 3 carbon atoms, a monovalent halogenated hydrocarbon group having 1 to 3 carbon atoms, a nitro group or a cyano group, more preferably a fluorine atom, a chlorine atom, a methyl group, a nitro group or a cyano group and still more preferably a methyl group.

In view of improving the polymerization reactivity of monomers that provide the third structural unit, s is each independently preferably 0 or 1 and more preferably 0. In the same point of view, 1 is each independently preferably 0 or 1 and more preferably 0.

Examples of the halogen atom represented by $R^8$ include the halogen atoms exemplified as the halogen atom represented by $R^1$ in formula (1) above.

Examples of the monovalent hydrocarbon group having 1 to 20 carbon atoms represented by $R^8$ include the monovalent hydrocarbon groups having 1 to 20 carbon atoms represented by $R^1$ in formula (1) above.

Examples of the monovalent halogenated hydrocarbon group having 1 to 20 carbon atoms represented by $R^8$ include the monovalent halogenated hydrocarbon groups having 1 to 20 carbon atoms represented by $R^1$ in formula (1) above.

In view of improving the mechanical properties and reducing the coefficient of linear expansion, A in formulae (L-1) and (L-2) is preferably —O—. In view of improving the mechanical properties and reducing the coefficient of linear expansion, B in formulae (L-1) and (L-2) is preferably —C(O)—.

In view of maintaining high heat resistance and further improving mechanical properties and the solubility in various organic solvents, the third structural unit is preferably a structural unit represented by formula (3-1) above.

Examples of the monomers that provide the third structural unit in the polymer [A] include phenolphthalein, o-cresolphthalein, p-xylenolphthalein, thymolphthalein, 3',3'',5',5''-tetraiodophenolphthalein, 4,5,6,7-tetrabromophenolphthalein, α-naphtholphthalein, phenolsulfonphthalein, o-cresolsulfonphthalein, bromophenol red, bromophenol blue, m-cresol purple, chlorophenol red, bromochlorophenol blue, 2-phenyl-3,3'-bis(4-hydroxyphenyl)phthalimidine, 2,3-dihydroxy-3,3-bis(4-hydroxyphenyl)-1H-isoindol-1-one, 3,3-bis(4-hydroxyphenyl)oxindole, fluorescein, 5-carboxyfluorescein, 6-carboxyfluorescein, 5-aminofluorescein, 6-aminofluorescein and the like. The monomers may be used respectively alone or may be used in a combination of two or more.

The lower limit of the content of the third structural unit in the polymer [A] is, relative to the sum of all structural units in the polymer [A] which is regarded as 100% by mole, preferably 5% by mole, more preferably 10% by mole, still more preferably 20% by mole and particularly preferably 33% by mole. The upper limit of the content is preferably 95% by mole, more preferably 67% by mole, still more preferably 60% by mole and particularly preferably 50% by mole. By configuring the content to be in the above range, mechanical properties and the solubility in various organic solvents may be further improved while maintaining high heat resistance.

[Additional Structural Units]

The polymer [A] may have, in a range that does not deteriorate the above effects, a structural unit other than the first, second and third structural units in order to, for example, adjusting the molecular weight, improving the solubility in solvents and the like.

Examples of the additional structural unit include a fourth structural unit that has formula (3-1) above wherein L is a single bond, —O—, —S—, —C(O)—, —SO—, —SO$_2$—, —C(O)—NH—, —C(O)—O—, a bivalent linear hydrocarbon group having 1 to 20 carbon atoms, a bivalent fluorinated linear hydrocarbon group having 1 to 20 carbon atoms, a bivalent aromatic hydrocarbon group having 6 to 20 carbon atoms or a bivalent fluorinated aromatic hydrocarbon group having 6 to 20 carbon atoms.

Examples of the bivalent linear hydrocarbon group having 1 to 20 carbon atoms in the fourth structural unit include straight chain or branched alkylene groups such as a methylene group, an ethylene group, a 1,2-propylene group, a 1,3-propylene group, a tetramethylene group, a pentamethylene group, a hexamethylene group, a 1-methyl-1,3-propylene group, a 2-methyl-1,3-propylene group, a 2-methyl-1,2-propylene group, a 1-methyl-1,4-butylene group and a 2-methyl-1,4-butylene group. Examples of the bivalent fluorinated linear hydrocarbon group having 1 to 20 carbon atoms in the fourth structural unit include the groups in which some or all hydrogen atoms in the groups exemplified as the bivalent linear hydrocarbon group having 1 to 20 carbon atoms are substituted with a fluorine atom.

Examples of the bivalent aromatic hydrocarbon group having 6 to 20 carbon atoms in the fourth structural unit include arylene groups such as a phenylene group, a tolylene group, a naphthylene group and an anthrylene group. Examples of the bivalent fluorinated aromatic hydrocarbon group having 6 to 20 carbon atoms in the fourth structural unit include the groups in which some or all hydrogen atoms in the groups exemplified as the bivalent aromatic hydrocarbon group having 6 to 20 carbon atoms are substituted with a fluorine atom.

Examples of additional structural unit described above include a fifth structural unit represented by formula (4) below:

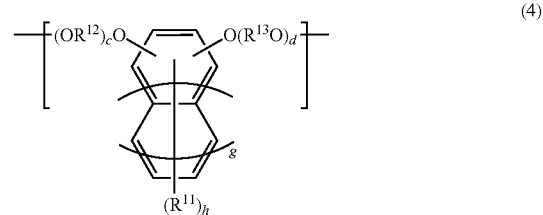

(4)

in formula (4), $R^{11}$ is a halogen atom, a monovalent hydrocarbon group having 1 to 20 carbon atoms, a monovalent halogenated hydrocarbon group having 1 to 20 carbon atoms, a nitro group or a cyano group; g is an integer of 0 to 2; h is an integer of 0 to 8; when h is 2 or more, two or more $R^1$ may be the same or different and may be joined together in any combination to form a part of a cyclic structure; $R^{12}$ is a methylene group or an alkylene group having 2 to 4 carbon atoms; c is an integer of 0 to 2; when c is 2, two $R^{12}$ may be the same or different; $R^{13}$ is a methylene group or an alkylene group having 2 to 4 carbon atoms; d is an integer of 0 to 2; when d is 2, two $R^{13}$ may be the same or different.

Examples of the halogen atom represented by $R^{11}$ include the halogen atoms exemplified as the halogen atom represented by $R^1$ in formula (1) above.

Examples of the monovalent hydrocarbon group having 1 to 20 carbon atoms represented by $R^{11}$ include the monovalent hydrocarbon groups having 1 to 20 carbon atoms represented by $R^1$ in formula (1) above.

Examples of the monovalent halogenated hydrocarbon group having 1 to 20 carbon atoms represented by $R^{11}$ include the monovalent halogenated hydrocarbon groups having 1 to 20 carbon atoms represented by $R^1$ in formula (1) above.

$R^{11}$ is preferably a monovalent hydrocarbon group having 1 to 10 carbon atoms, more preferably a monovalent linear hydrocarbon group having 1 to 10 carbon atoms, still more preferably a monovalent branched hydrocarbon group having 1 to 10 carbon atoms and particularly preferably an i-butyl group, a sec-butyl group or a t-butyl group. By configuring $R^{11}$ to be the specific group, the solubility in various organic solvents may be further improved.

In view of improving the polymerization reactivity of monomers that provide the fifth structural unit, g is preferably 0 or 1 and more preferably 0.

In view of further improving the solubility in various organic solvents, h is preferably 1 to 8, more preferably 1 to 4 and particularly preferably 1 to 2.

Examples of the alkylene group having 2 to 4 carbon atoms represented by $R^{12}$ and $R^{13}$ include an ethylene group, a n-propylene group, an isopropylene group, a n-butylene group, a sec-butylene group, a t-butylene group and the like.

In view of improving the polymerization reactivity of monomers that provide the fifth structural unit, $R^{12}$ is preferably a methylene group or an ethylene group. In the same point of view, c is preferably 0 or 1 and more preferably 0.

In view of improving the polymerization reactivity of monomers that provide the fifth structural unit, $R^{13}$ is preferably a methylene group or an ethylene group. In the same point of view, d is preferably 0 or 1 and more preferably 0.

The additional structural unit is preferably the fifth structural unit in view of improving the solubility in various organic solvents. In the same point of view, the fifth structural unit is preferably the structural unit of formula (4) above, wherein —O($R^{13}$O)$_d$— is bound at ortho position to —(O$R^{12}$)$_c$O—.

When the polymer [A] has the additional structural unit, the lower limit of the sum of the content of the additional structural unit(s) is, relative to the sum of all structural units in the polymer [A] which is regarded as 100% by mole, preferably 1% by mole, more preferably 5% by mole and still more preferably 10% by mole. The upper limit of the content is preferably 40% by mole and more preferably 30% by mole. By configuring the content to be in the above range, the molecular weight may be easily adjusted without deteriorating the above effects.

When the polymer [A] contains the fourth structural unit, the lower limit of the content of the fourth structural unit is, relative to the sum of all structural units in the polymer [A] which is regarded as 100% by mole, preferably 1% by mole, more preferably 5% by mole and still more preferably 10% by mole. The upper limit of the content is preferably 60% by mole and more preferably 40% by mole. By configuring the content to be in the above range, the molecular weight may be easily adjusted without deteriorating the above effects.

When the polymer [A] contains the fifth structural unit, the lower limit of the content of the fifth structural unit is, relative to the sum of all structural units in the polymer [A] which is regarded as 100% by mole, preferably 1% by mole, more preferably 5% by mole and still more preferably 10% by mole. The upper limit of the content is preferably 60% by mole and more preferably 40% by mole. By configuring the content to be in the above range, the solubility in various organic solvents may be further improved.

[Sequence of Structural Units]

The sequence of structural units is not limited as far as the polymer [A] has the first structural unit. However, in view of further improving the toughness, heat resistance, high refractive index, mechanical properties and chemical resistance of cured products, it is preferable that the polymer [A] has the first and second structural units in a main chain. In view of maintaining high heat resistance and further improving the mechanical properties and solubility in various organic solvents, it is preferable that the polymer [A] has the first and third structural units in a main chain. The "main chain" as used herein refers to the relatively longest linked chain in the polymer.

When the polymer [A] has the first and second structural units in the main chain, the polymer has excellent heat resistance and mechanical properties, and thus the thermal deterioration of resin molded articles obtained from the polymer [A] may be controlled and high dimensional stability may be imparted, for example.

Meanwhile, when the polymer [A] has the first and third structural units in the main chain, the polymer has excellent heat resistance, mechanical properties and solubility in an organic solvent, and thus the thermal deterioration of molded articles obtained from the polymer [A] may be controlled and high dimensional stability may be imparted, for example.

[Repeating Unit]

Examples of the polymer [A] having the first and second structural units in the main chain include polymers having, in the main chain, the repeating unit (a) represented by formula (a) below, the repeating unit (b) represented by formula (b) below, the repeating unit (c) represented by formula (c) below, a combination of the repeating units and the like.

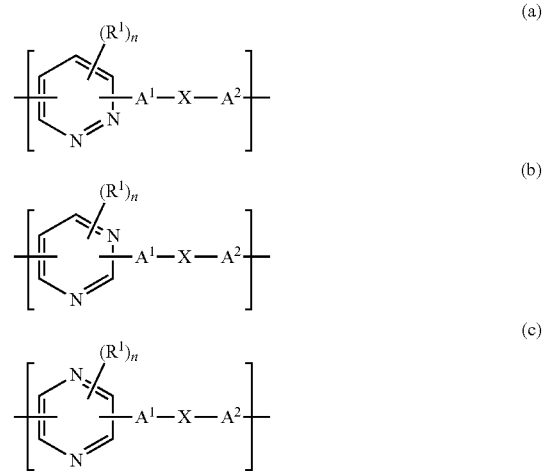

In formulae (a) to (c) above, $R^1$ and n respectively have the same meanings as $R^1$ and n in formulae (1-1) to (1-3) above; and $A^1$ and $A^2$ respectively have the same meanings as $A^1$ and $A^2$ in formula (2) above.

Examples of the polymer [A] having the first and third structural units in the main chain include polymers having, in the main chain, the repeating unit (d) represented by formula (d) below, the repeating unit (e) represented by formula (e) below, the repeating unit (f) represented by formula (f) below, the repeating unit (g) represented by formula (g) below, the repeating unit (h) represented by formula (h) below, the repeating unit (i) represented by formula (i) below and a combination of the repeating units.

Examples of the additional compound include an alkali metal compound, a terminating agent such as monofunctional phenols, a monomer that provides an additional structural unit and the like.

Examples of the alkali metal compound include alkali metal hydrides such as lithium hydride, sodium hydride and

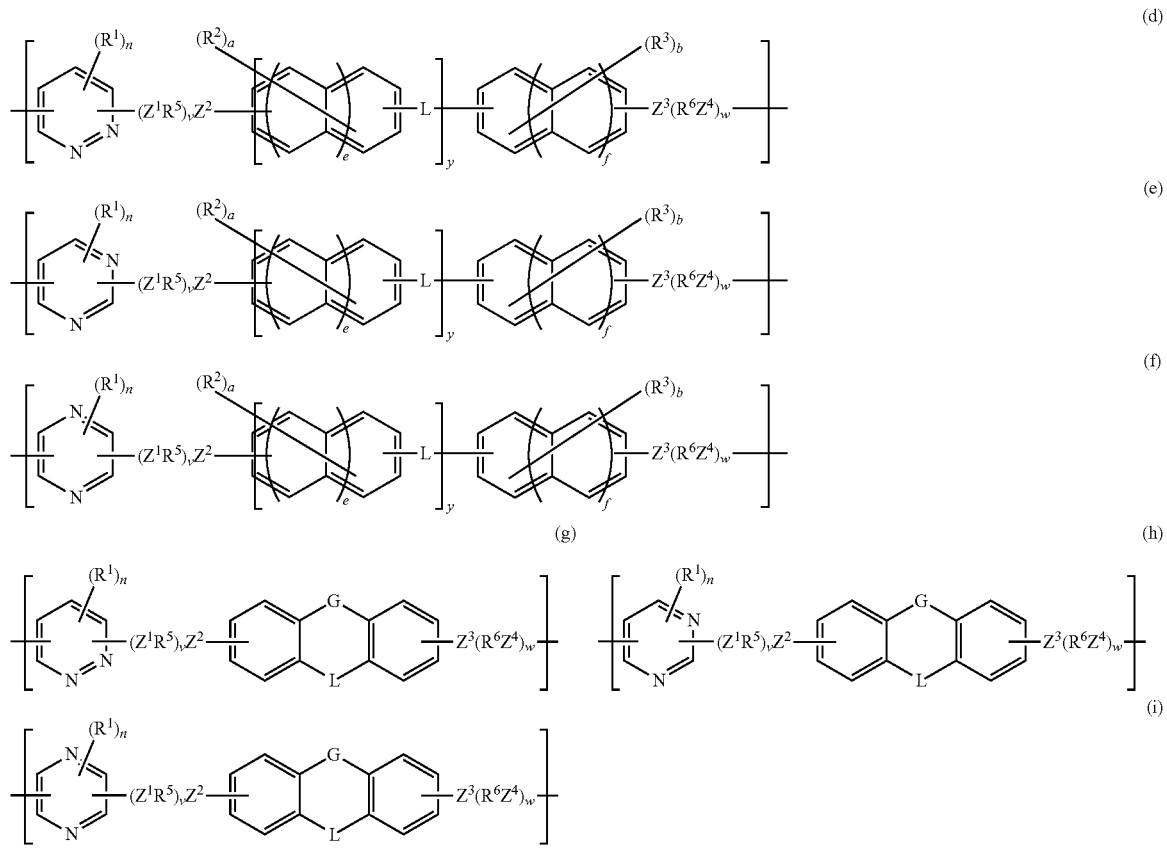

In formulae (d) to (i) above, $R^1$ and n respectively have the same meanings as $R^1$ and n in formulae (1-1) to (1-3) above; $R^2$, $R^3$, $R^5$, $R^6$, G, L, $Z^1$ to $Z^4$, a, b, e, f, v and w respectively have the same meanings as $R^2$, $R^3$, $R^5$, $R^6$, G, L, $Z^1$ to $Z^4$, a, b, e, f, v and w in formulae (3-1) and (3-2).

(Content of the Polymer [A])

In the composition according to the invention, the content of the polymer [A] is, for example, relative to the curable compound and the polymer [A] which are regarded as 100% by mass, preferably 1% by mass to 99% by mass inclusive, more preferably 5% by mass to 95% by mass inclusive and still more preferably 10% by mass to 90% by mass inclusive. The content within the above range is preferable in view of further improving the toughness, heat resistance and chemical resistance of cured products.

(Synthesis Method of Polymer [A])

The synthesis method of the polymer [A] according to the invention is not particularly limited. For example, the polymer [A] may be synthesized by reacting monomers that provide the first structural unit and monomers that provide the second structural unit or monomers that provide the third structural unit and optionally additional compound(s) in an organic solvent under predetermined conditions.

potassium hydride; alkali metal hydroxides such as lithium hydroxide, sodium hydroxide and potassium hydroxide; alkali metal carbonate salts such as lithium carbonate, sodium carbonate and potassium carbonate; alkali metal hydrogen carbonate salts such as lithium hydrogen carbonate, sodium hydrogen carbonate and potassium hydrogen carbonate; and the like. Among these, alkali metal hydroxides and alkali metal carbonate salts are preferred and sodium hydroxide and potassium carbonate are more preferred.

When the alkali metal compound is used, the lower limit of the amount used is, as the amount of metal atoms in the alkali metal compound relative to hydroxy groups of all monomers used for synthesis of the polymer [A], preferably 1 equivalent, more preferably 1.1 equivalents, still more preferably 1.2 equivalents and particularly preferably 1.5 equivalents. The upper limit of the amount used is preferably 3 equivalents and more preferably 2 equivalent.

Examples of the organic solvent include N,N-dimethylacetamide, N,N-dimethylformamide, N-methyl-2-pyrrolidone, 1,3-dimethyl-2-imidazolidinone, γ-butyrolactone, sulfolane, dimethyl sulfoxide, diethylsulfoxide, dimethyl sulfone, diethyl sulfone, diisopropyl sulfone, diphenyl sulfone, diphenyl ether, benzophenone, methylene chloride, benzene, toluene, xylene, benzonitrile, dialkoxybenzene (the number of carbon atoms of the alkoxy group: 1 to 4), trialkoxybenzene (the number of carbon atoms of the alkoxy group: 1 to 4) and the like. The organic solvents may be used respectively alone or may be used in a combination of two or more.

In addition to the organic solvents described above, a solvent that forms an azeotrope with water such as hexane, cyclohexane, octane, chlorobenzene, dioxane, tetrahydrofuran, anisole and fenetol may be used in combination. The solvents may be used respectively alone or may be used in a combination of two or more.

The reaction temperature during synthesis of the polymer [A] is, for example, 20° C. to 250° C. inclusive. The reaction time is, for example, 15 minutes to 100 hours inclusive. The polymer [A] may be obtained as solution, powder or pellets. When obtained as powder, the powder is obtained by coagulation in a poor solvent and filtration followed by washing and drying. In this case, coagulation may be performed after pre-treatment in an aqueous solution or solvent containing an alkali metal compound or ammonia. Alternatively, the polymer may be obtained by direct coagulation in an aqueous solution or poor solvent containing an alkali metal compound or ammonia.

(Weight Average Molecular Weight (Mw) of Polymer [A])

The lower limit of the weight average molecular weight (Mw) of the polymer [A] is preferably 500, more preferably 1,000, still more preferably 5,000, further more preferably 10,000 and the most preferably 30,000. The upper limit of Mw is preferably 600,000, more preferably 400,000, still more preferably 300,000 and the most preferably 200,000. By configuring Mw to be at or higher than the above lower limit, the heat resistance may be further improved. Meanwhile, when Mw is above the above upper limit, the viscosity may be excessively high, resulting in deteriorated applicability and operability.

(Glass Transition Temperature (Tg) of Polymer [A])

The lower limit of the glass transition temperature (Tg) of the polymer [A] is preferably 150° C. and more preferably 180° C. The upper limit of the glass transition temperature is not particularly limited, and is preferably, for example, 320° C. and more preferably 300° C. By configuring the glass transition temperature to be at or higher than the above lower limit, the heat resistance may be further improved. The glass transition temperature may be a value measured on, for example, a differential scanning calorimeter in a nitrogen atmosphere with a heating rate of 20° C./min.

<Curable Compound>

The curable compound according to the invention is a compound that cures by irradiation with heat or light (such as visible light, ultraviolet rays, near infrared rays, far infrared rays and electron beams), and may require a curing auxiliary agent described hereinafter. Examples of the curable compound include an epoxy compound, a cyanate ester compound, a vinyl compound, a silicone compound, an oxazine compound, a maleimide compound, an allyl compound, an acryl compound, a methacryl compound, a urethane compound and the like. The compounds may be used respectively alone or may be used in a combination or two or more. Among these, in view of the compatibility with the polymer [A] and properties such as heat resistance, the compound is preferably at least one of an epoxy compound, a cyanate ester compound, a vinyl compound, a silicone compound, an oxazine compound, a maleimide compound and an allyl compound and particularly preferably at least one of an epoxy compound, a cyanate ester compound, a vinyl compound, an allyl compound and a silicone compound.

Examples of the epoxy compound include compounds represented by formulae (c1-1) to (c1-6) below [the compound represented by (c1-6) is "XER-81" (which is epoxy-containing NBR particles manufactured by JSR Corporation)]. Further examples include polyglycidyl ethers of dicyclopentadiene-phenol polymerization products, phenol novolac liquid epoxy, epoxydized styrene-butadiene block copolymers, 3',4'-epoxycyclohexylmethyl-3,4-epoxycyclohexane carboxylate and the like.

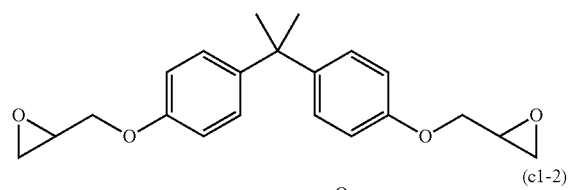

(c1-1)

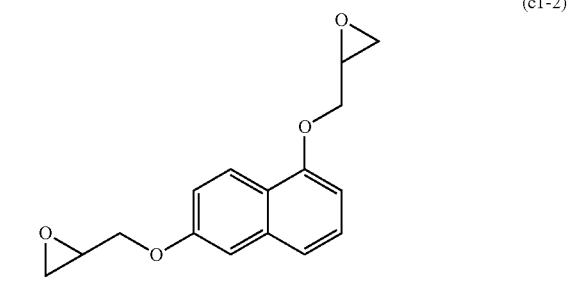

(c1-2)

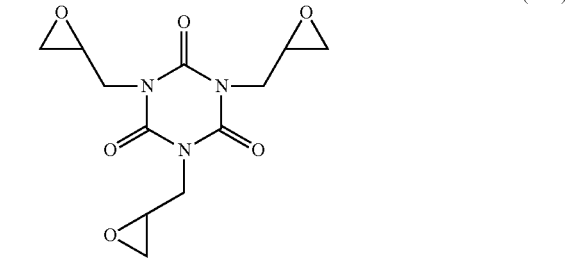

(c1-3)

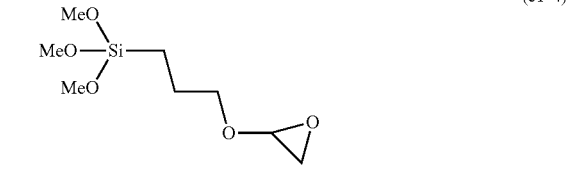

(c1-4)

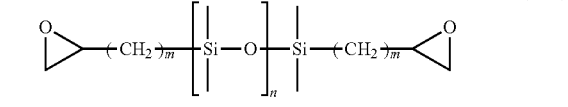

(c1-5)

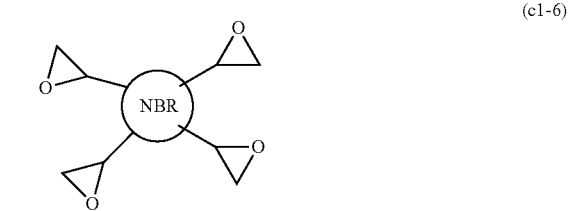

(c1-6)

Examples of the cyanate ester compound include compounds represented by formulae (c2-1) to (c2-7) below.

(c2-1)

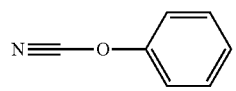 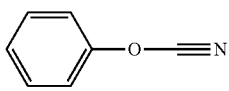

(c2-2)

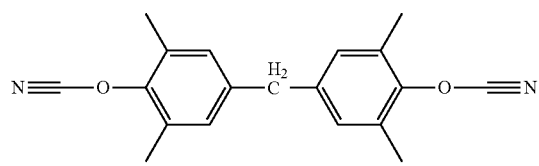

(c2-3)

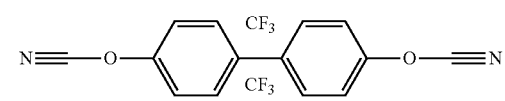

(c2-4)

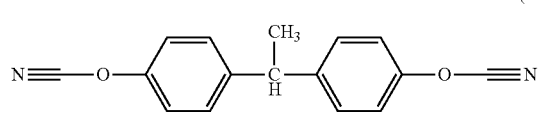

(c2-5)

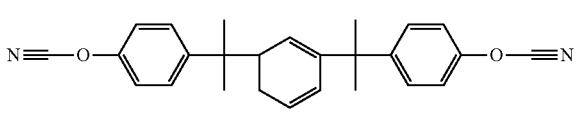

(c2-6)

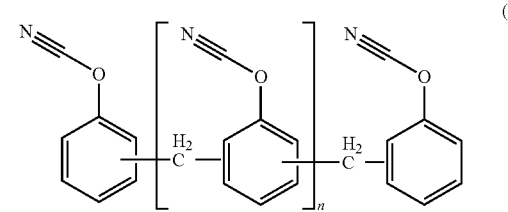

(c2-7)

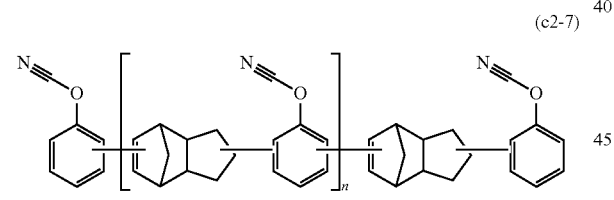

Examples of the vinyl compound include compounds represented by formulae (c3-1) to (c3-5) below.

(c3-1)

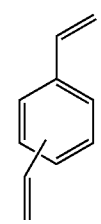

(c3-2)

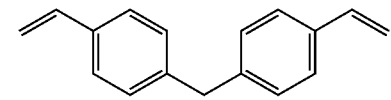

(c3-3)

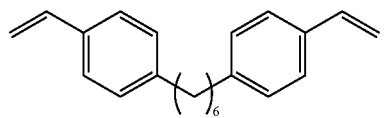

(c3-4)

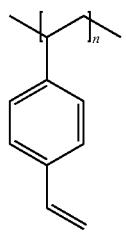

(c3-5)

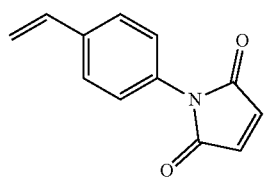

Examples of the silicone compound include compounds represented by formulae (c4-1) to (c4-16) below. R in formula (c4-1) is one selected from those indicated below, and when R selected has a vinyl group, the compound may also be regarded as the vinyl compound. In formulae (c4-2) to (c4-16), R is each independently an organic group selected from an alkyl group, a cycloalkyl group, an aryl group and an alkenyl group; and n is an integer of 0 to 1000 (preferably an integer of 0 to 100). Examples of the alkyl group, the cycloalkyl group, the aryl group and the alkenyl group may include those exemplified in the descriptions for $R^1$ in formula (1-1) above.

(c4-1)

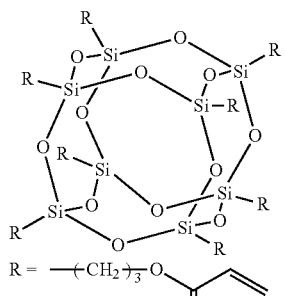

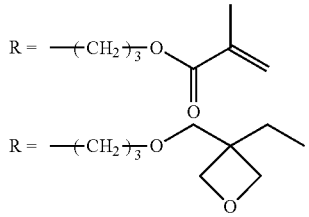

(c4-2)

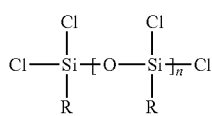

(c4-3) 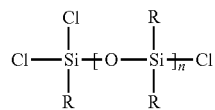
(c4-4) 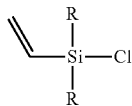
(c4-5) 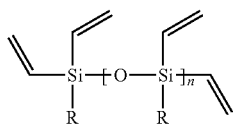
(c4-6) 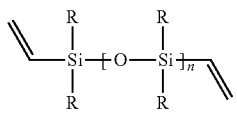
(c4-7) 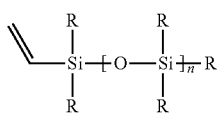
(c4-8) 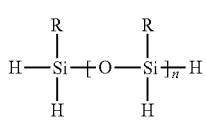
(c4-9) 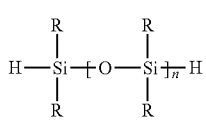
(c4-10) 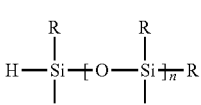
(c4-11) 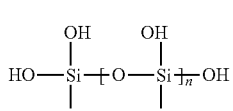
(c4-12) 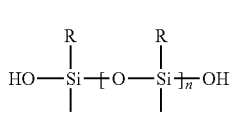
(c4-13) 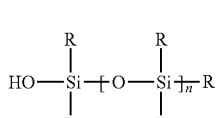
(c4-14) 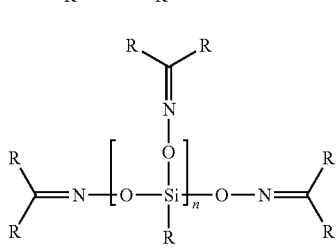
(c4-15) 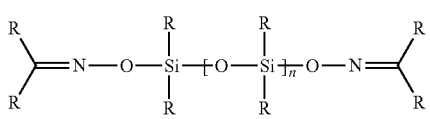
(c4-16) 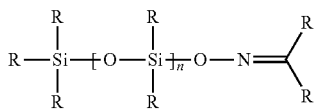
Examples of the oxazine compound include compounds represented by formulae (c5-1) to (c5-5) below.
(c5-1) 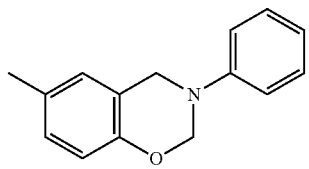
(c5-2) 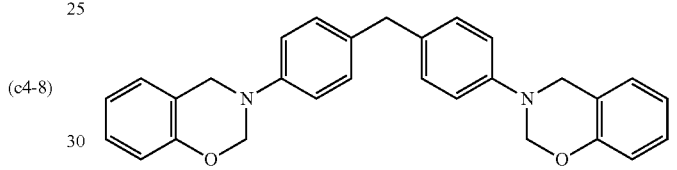
(c5-3) 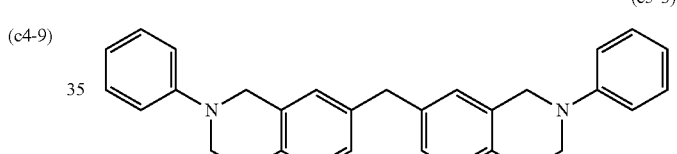
(c5-4) 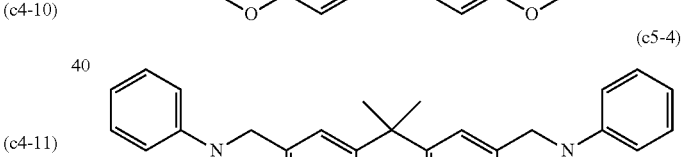
(c5-5) 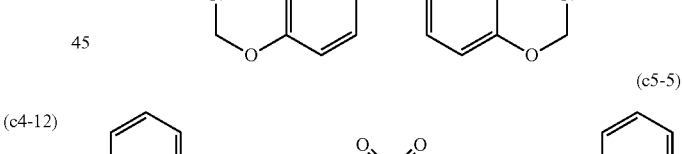
Examples of the maleimide compound include compounds represented by formulae (c6-1) to (c6-5) below.
(c6-1) 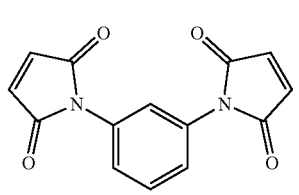

(c6-2) 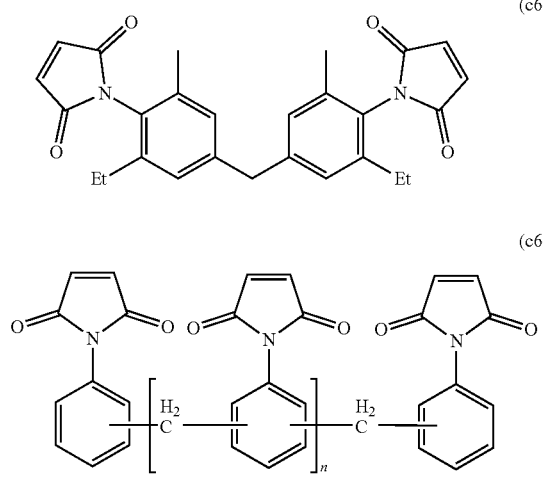
(c6-3)
(c6-4) 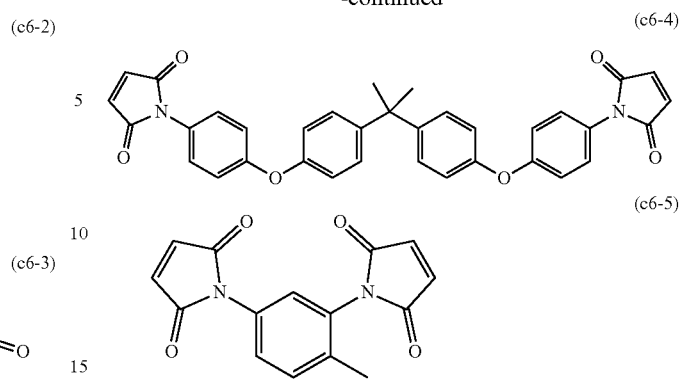
(c6-5)
Examples of the allyl compound include compounds represented by formulae (c7-1) to (c7-6) below. In particular the allyl compound is preferably a compound having two or more (particularly 2 to 6, further 2 to 3) allyl groups.
(c7-1) 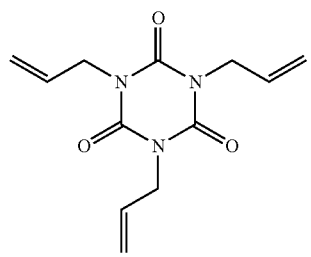
(c7-2) 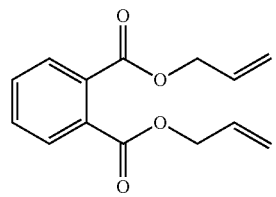
(c7-3) 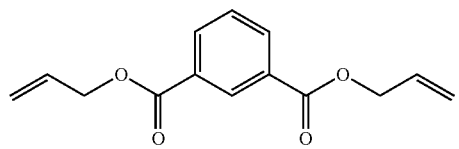
(c7-4) 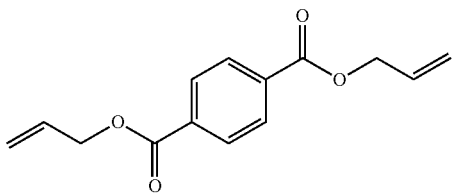
(c7-5) 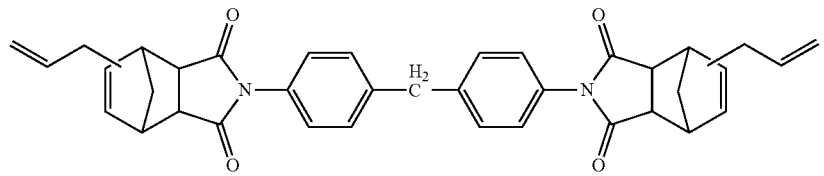
(c7-6) 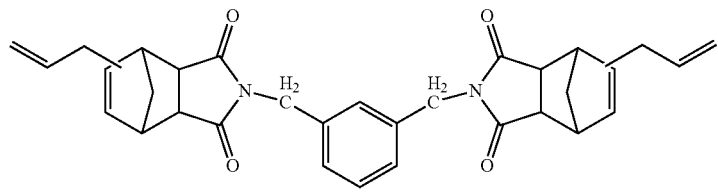

(Content of the Curable Compound)

In the composition according to the invention, the content of the curable compound is, for example, relative to the whole composition which is regarded as 100 by mass, preferably 1% by mass to by mass, preferably 0.055% by mass to 999595% by mass inclusive, more preferably 10% by mass to 90% by mass inclusive and still more preferably 20% by mass to 80% by mass inclusive. The content is within the above range is preferable in view of further improving the toughness, heat resistance and chemical resistance of cured products. The content of the curable compound is, relative to the sum of the curable compound and the polymer [A] which is regarded as 100% by mass, preferably 1% by mass to 99% by mass inclusive, more preferably 5% by mass to 95% by mass inclusive and still more preferably 10% by mass to 90% by mass inclusive. The content within the above range is preferable in view of further improving the toughness, heat resistance and chemical resistance of cured products.

[Curing Auxiliary Agent]

The composition according to the invention may optionally contain a curing auxiliary agent. Examples of the curing auxiliary agent include a curing agent, and a polymerization initiator such as a photoreaction initiator (a photo-radical generator, a photo-acid generator, a photo-base generator). The curing auxiliary agent may be not limited by the type and may be used respectively alone or may be used in a combination or two or more.

Examples of the curing auxiliary agent when the curable compound used is an epoxy compound include curing agents such as amine curing agents, acid or acid anhydride curing agents, basic active hydrogen compounds, imidazoles, polymercaptan curing agents, phenol resins, urea resins, melamine resins, isocyanate curing agents and Lewis acids.

Examples of the amine curing agent include polyamines such as ethylenediamine, diethylenetriamine, triethylenetetramine, tetraethylenepentamine, hexamethylenediamine, iminobispropylamine, bis(hexamethylene)triamine and 1,3,6-trisaminomethylhexane; polymethylenediamines such as trimethylhexamethylenediamine, polyetherdiamine and diethylaminopropylamine; cyclic aliphatic polyamines such as menthene diamine (MDA), isophorone diamine (IPDA), bis(4-amino-3-methylcyclohexyl)methane, diaminodicyclohexylmethane, bisaminomethyl cyclohexane, 3,9-bis(3-aminopropyl)-2,4,8,10-tetraoxaspiro[5.5]undecane, diamines with norbornane skeletons typically including NBDA manufactured by Mitsui Chemicals Inc.; aliphatic polyamines containing aromatic rings such as meta-xylylenediamine (MXDA); aromatic polyamines such as meta-phenylenediamine, diaminodiphenylmethane, diaminodiphenylsulfone and diaminodiethyldiphenylmethane; and derivatives thereof.

Examples of other amine curing agents include Mannich-modified diamines obtained by reaction of a polyamine and an aldehyde and/or phenol; ketimines which are reaction products of a ketone with an amine adduct (polyamine epoxy resin adduct), a polyamine-ethylene oxide adduct, a polyamine-propylene oxide adduct, a cyanoethylated polyamine or an aliphatic polyamine; secondary amines or tertiary amines such as tetramethylguanidine, triethanolamine, piperidine, pyridine, benzyldimethylamine, picoline, 2-(dimethylaminomethyl)phenol, dimethylcyclohexylamine, dimethylbenzylamine, dimethylhexylamine, dimethylaminophenol, dimethylamino-p-cresol, N,N'-dimethylpiperazine, 1,4-diazadicyclo[2.2.2]octane, 2,4,6-tris(dimethylaminomethyl)phenol and 1,8-diazabicyclo[5.4.0]-7-undecene; liquid polyamides obtained by reaction of a dimeric acid and a polyamine such as diethylenetriamine and triethylenetetramine; and the like.

Examples of the acid or acid anhydride curing agent include polycarboxylic acids such as adipic acid, azelaic acid, decanedicarboxylic acid; aromatic acid anhydrides such as phthalic anhydride, trimellitic anhydride, ethylene glycol bis(anhydro trimellitate), glycerol tris(anhydro trimellitate), pyromellitic anhydride and 3,3',4,4'-benzophenone tetracarboxylic anhydride; cyclic aliphatic acid anhydrides such as maleic anhydride, succinic anhydride, tetrahydrophthalic anhydride, methyltetrahydrophthalic anhydride, methylnadic anhydride, alkenylsuccinic anhydride, hexahydrophthalic anhydride, methylhexahydrophthalic anhydride, methylcyclohexenetetracarboxylic anhydride, methylhimic anhydride, trialkyltetrahydrophthalic anhydride and poly(phenylhexadecanedioic)anhydride; aliphatic acid anhydrides such as polyadipic anhydride, polyazelaic anhydride, polysebacic anhydride, dodecenylsuccinic anhydride and poly(ethyloctadecanedioic)anhydride; halogenated acid anhydrides such as chlorendic anhydride, tetrabromophthalic anhydride and HET anhydride; and the like.

Examples of the basic active hydrogen compound include organic acid dicyandiamides and dihydrides.

Examples of the imidazole include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 2-methylimidazolium isocyanurate, 2,4-diamino-6-[2-methylimidazoline-(1)]-ethyl-S-triazine, 2,4-diamino-6-[2-ethyl-4-methylimidazoline-(1)]-ethyl-S-triazine and the like.

Examples of the polymercaptan curing agent include partial epoxy adducts of 2,2'-bismercaptoethyl ether; esters of thioglycolic acid such as pentaerythritol tetrathioglycolate, dipentaerythritol hexathioglycolate and trimethylolpropane tristhioglycolate; compounds containing a mercapto group such as polysulfide rubbers having a terminal mercapto group and the like.

Examples of the isocyanate curing agent include isocyanate compounds such as toluene diisocyanate, hexamethylene diisocyanate and xylene diisocyanate; block isocyanate compounds obtained by reacting an isocyanato group with a blocking agent such as phenol, an alcohol or caprolactam to mask the same, and the like.

Examples of the Lewis acid include diallyl iodonium salts, triallyl sulfonium salts and the like.

The curing auxiliary agent on this occasion that may be used is a photo-acid generator such as onium salt compounds, sulfone compounds, sulfonate ester compounds, sulfonimide compounds, disulfonyl diazomethane compounds, disulfonylmethane compounds, oxime sulfonate compounds, hydrazine sulfonate compounds, triazine compounds, nitrobenzyl compounds as well as organic halogenates and disulfones.

The curing auxiliary agent on this occasion that may be used is a photo-base generator such as (Z)-{[bis(dimethylamino)methylidene]amino}-N-cyclohexyl(cyclohexylamino)methaniminium tetrakis(3-fluorophenyl)borate, 1,2-dicyclohexyl-4,4,5,5-tetramethylbiguanidium n-butyltriphenylborate, 9-anthrylmethyl N,N-diethylcarbamate, (E)-1-[3-(2-hydroxyphenyl)-2-propenoyl]piperidine, 1-(anthraquinon-2-yl)ethyl imidazolecarboxylate, 2-nitrophenylmethyl 4-methacryloyloxypiperidine-1-carboxylate and 1,2-diisopropyl-3-[bis(dimethylamino)methylene]guanidium 2-(3-benzoylphenyl)propionate.

Examples of the curing auxiliary agent when the curable compound used is a cyanate ester compound include curing agents such as tertiary amines of octanoic acid, stearic acid, acetyl acetonate, naphthenic acid, salicylic acid and the like and imidazoles including 2-ethyl-4-imidazole, 4-methylimidazole and the like. Further, the photo-acid generator and photo-base generator that are described above as the curing auxiliary agent when the epoxy compound is used may be used.

Examples of the curing auxiliary agent when the curable compound used is a vinyl compound include compounds that generate cations or radical active species by heat or light. Examples of the cationic polymerization agent include diallyl iodonium salts, triallyl sulfonium salts and the like. Examples of the radical polymerization agent include benzoin compounds such as benzoin acetophenone, acetophenone compounds such as 2,2-dimethoxy-2-phenylacetophenone, sulfur compounds such as 2,4-diethyl thioxanthone, azo compounds such as azobisisobutylnitrile, and organic peroxides such as 2,5-dimethyl-2,5-di(t-butylperoxy)hexane and dicumyl peroxide. A photo-radical generator such as acetophenone, propiophenone, benzophenone, xanthol, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal and 2-chlorothioxanthone may also be used.

Examples of the curing auxiliary agent when the curable compound used is a silicone compound include zinc benzoate, zinc octylate, platinum group metal catalysts including platinum catalysts such as platinum black, platinic chloride, chloroplatinic acid, reaction products of chloroplatinic acid and monohydric alcohols, complexes of chloroplatinic acid and olefins and platinum bisacetoacetate; palladium catalysts; rhodium catalysts and the like. A photoreaction initiator such as acetophenone, propiophenone, benzophenone, xanthol, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 2,2'-diethoxyacetophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, diethylacetophenone, 1-hydroxycyclohexyl phenyl ketone, 2-methyl-1{4-(methylthio)phenyl}-2-morpholin-1-one, 2-benzyl-2-dimethylamino-1-(4-morpholinophenyl)-butanon-1-one, 1-{4-(2-hydroxyethoxy)-phenyl}-2-methyl-1-propan-1-one, 2,2-dimethoxy-2-phenylacetophenone, 2-hydroxy-2-methyl-1-phenyl-propan-1-one and cyclohexyl phenyl ketone may also be used.

Examples of the curing auxiliary agent when the curable compound used is an oxazine compound include curing agents such as phenol and derivatives thereof, cyanate esters, Brønsted acids such as p-toluenesulfonic acid, adipic acid, p-toluenesulfonate esters, aromatic amine compounds such as 4,4'-diaminodiphenylsulfone and melamine, bases such as 2-ethyl-4-methylimidazole, boron trifluoride and Lewis acids. Further, the photo-acid generator and photo-base generator that are described above as the curing auxiliary agent when the epoxy compound is used may be used.

Examples of the curing auxiliary agent when the curable compound used is a maleimide compound include curing agents such as bases including imidazole, 1-methylimidazole, 1-benzyl-2-methylimidazole, 2-methylimidazoline, N,N-diisopropylethylamine, 1,4-dimethylpiperazine, quinoline, triazole, benzotriazole and DBU, phosphorus compounds such as triphenylphosphine and azobisisobutylnitrile. Further, the photo-acid generator and photo-base generator that are described above as the curing auxiliary agent when the epoxy compound is used may be used.

Examples of the curing auxiliary agent when the curable compound used is an allyl compound include azo initiators such as azobisisobutyronitrile and dimethyl 2,2'-azobisisobutyrate, peroxides such as ketone peroxides, peroxy ketals, hydroperoxide, dialkyl peroxides, diacyl peroxides, peroxydicarbonates and peroxyesters, acetophenone curing agents such as 2-methyl-1-[4-(methylthio)phenyl]-2-morpholinopropane-1,1'-hydroxycyclohexyl phenyl ketone, benzoin curing agents such as benzoin and benzoin ethyl ether, benzophenone curing agents such as benzophenone, phosphorus curing agents such as acylphosphine oxides, sulfur curing agents such as thioxanthone, benzyl curing agents such as benzyl, 9,10-phenanthrenequinone and peroxycarbonate curing agents. Further, the photo-acid generator and photo-base generator that are described above as the curing auxiliary agent when the epoxy compound is used may be used.

(Content of the Curing Auxiliary Agent)

When the composition according to the invention contains the curing auxiliary agent, the content of the curing auxiliary agent may be in the range in which the composition successfully cures to provide a cured product. The content is, for example, relative to 100 parts by mass of the sum of the polymer [A] and the curable compound, preferably 5 parts by mass to 20 parts by mass inclusive and more preferably 5 parts by mass to 10 parts by mass inclusive.

[Solvent]

The composition according to the invention may optionally contain a solvent. Examples of the solvent include amide solvents such as N,N-dimethylacetamide, N,N-dimethylformamide, 1,3-dimethyl-2-imidazolidinone, N-methyl-2-pyrrolidone and N-ethyl-2-pyrrolidone, ester solvents such as γ-butyrolactone and butyl acetate, ketone solvents such as cyclopentanone, cyclohexanone, methyl ethyl ketone and benzophenone, ether solvents such as 1,2-methoxyethane and diphenyl ether, polyfunctional solvents such as 1-methoxy-2-propanol and propylene glycol methyl ether acetate, sulfone solvents such as sulfolane, dimethyl sulfoxide, diethyl sulfoxide, dimethyl sulfone, diethyl sulfone, diisopropyl sulfone and diphenyl sulfone as well as methylene chloride, benzene, toluene, xylene, dialkoxybenzene (the number of carbon atoms of the alkoxy group; 1 to 4) and trialkoxybenzene (the number of carbon atoms of the alkoxy group; 1 to 4). The solvents may be used respectively alone or may be used in a combination of two or more.

(Content of the Solvent)

The content of the solvent is not particularly limited, and may be, for example, relative to 100 parts by mass of the sum of the polymer [A] and the curable compound, 0 parts by mass to 2000 parts by mass inclusive (particularly, 0 parts by mass to 200 parts by mass inclusive). When the solubility in an organic solvent is high, the content may be 50 parts by mass to 100,000 parts by mass inclusive.

[Additional Component]

The composition according to the invention may further contain an additional component in the range that does not deteriorate the effects of the invention. Examples of the additional component include an antioxidant, a reinforcing agent, a lubricant, a flame retardant, an antibacterial agent, a colorant, a release agent, a blowing agent, a polymer other than the polymer [A] and the like. The additional agents may be used respectively alone or may be used in a combination of two or more.

Examples of the antioxidant include hindered phenol compounds, phosphorus compounds, sulfur compounds, metal compounds, hindered amine compounds and the like. Among these, a hindered phenol compound is preferred.

The hindered phenol compound preferably has a molecular weight of 500 or more. Examples of the hindered phenol compound having a molecular weight of 500 or more include triethylene glycol-bis[3-(3-t-butyl-5-methyl-4-hydroxyphenyl)propionate], 1,6-hexanediol-bis [3-(3,5-di-t-butyl-4-hydroxyphenyl)propionate], 2,4-bis-(n-octylthio)-6-(4-hydroxy-3,5-di-t-butylanilino)-3,5-triazine, pentaerythritol tetrakis[3-(3,5-t-butyl-4-hydroxyphenyl)propionate], 1,1,3-tris[2-methyl-4-[3-(3,5-di-t-butyl-4-hydroxyphenyl)propionyloxy]-5-t-butylphenyl]butane, 2,2-thio-diethylenebis[3-(3,5-di-t-butyl-4-hydroxyphenyl) propionate], octadecyl-3-(3,5-di-t-butyl-4-hydroxyphenyl) propionate, N,N-hexamethylenebis(3,5-di-t-butyl-4-hydroxy-hydrocinnamamide), 1,3,5-trimethyl-2,4,6-tris(3,5-di-t-butyl-4-hydroxybenzyl)benzene, tris-(3,5-di-t-butyl-4-hydroxybenzyl)-isocyanurate, 3,9-bis[2-[3-(3-t-butyl-4-hydroxy-5-methylphenyl)propionyloxy]-1,1-dimethylethyl]-2,4,8,10-tetraoxaspiro[5.5]undecane and the like.

When the composition according to the invention contains an antioxidant, the content of the antioxidant may be, for example, relative to 100 parts by mass of the sum of the polymer [A] and the curable compound, 0.01 parts by mass to 10 parts by mass inclusive.

[Preparation Method of the Composition]

The preparation method of the composition according to the invention is not particularly limited. However, the composition may be prepared by, for example, uniformly mixing the polymer [A], the curable compound and an additional additive (for example, an additional component such as a curing auxiliary agent, a solvent and an antioxidant), if necessary. The composition may be in the form of liquid, paste or the like. In particular, the polymer [A] according to the invention has excellent solubility, and thus the polymer may be dissolved in a liquid curable compound to obtain a non-solvent composition.

<Cured Product>

The cured product according to the invention may be obtained by curing the composition according to the invention. The shape of the cured product is not particularly limited and may be an appropriate shape according to the application or purpose to provide a molded article. The method for curing the composition is not particularly limited. Generally used methods include thermosetting by heating and photosetting by irradiation with light. The methods may be used in combination.

When thermosetting is performed, the temperature is preferably 50° C. to 200° C., more preferably 100° C. to 200° C. and still more preferably 100° C. to 180° C. The heating time is preferably 0.5 to 36 hours and more preferably 0.5 to 24 hours. When photosetting is performed, examples of light to be irradiated include visible light, ultraviolet rays, near infrared rays, far infrared rays, electron beams and the like.

Since the cured product according to the invention contains the polymer [A] having excellent heat resistance and mechanical properties, thermal deterioration may be controlled and high mechanical properties and high dimensional stability may be imparted. The cured product may be manufactured by, for example, metal molding, extrusion molding, solvent casting and the like. When the cured product is a lens, the lens may be suitably manufactured by metal molding. When the cured product is an optical film or an insulating film for printed circuit boards, the cured product is suitably manufactured by extrusion molding or solvent casting and more preferably extrusion molding.

The lower limit of the average thickness of the optical film is preferably 10 μm. The upper limit of the average thickness is preferably 1,000 μm and more preferably 500 μm.

<Laminate>

The laminate according to the invention contains a substrate and a cured product layer formed with the composition according to the invention on the substrate. Examples of the substrate include, in view of the adhesiveness and practicality, inorganic substrates, metal substrates, resin substrates and the like. Examples of the inorganic substrate include inorganic substrates containing silicon, silicon carbide, silicon nitride, alumina, glass, gallium nitride and the like as a component. Examples of the metal substrate include metal substrates containing copper, aluminum, gold, silver, nickel, palladium and the like as a component. Examples of the resin substrate includes substrates of liquid crystal polymers, polyimide, polyphenylene sulfide, polyamide (nylon), polyethylene terephthalate, polyethylene naphthalate, polyolefin and the like.

The resin cured product layer may be obtained by applying the composition on the substrate followed by thermosetting or photosetting. The thickness of the cured product layer is not particularly limited, and may be, for example, 10 μm to 3 mm.

The composition according to the invention, and the cured product and laminate thereof may be suitably used in the field of structural materials for vehicle industries such as the aircraft industry and the automobile industry, the field of electric and electron materials for electric and electron industries and the like. Specifically, the composition according to the invention, and the cured product and laminate thereof may be suitably used for, for example, sealing materials, interlayer insulating films and stress relaxation primers of electric and electronic components; laminate sheets (printed circuit board substrates, interlayer adhesives, solder resists, solder pastes); adhesives (conductive adhesives, thermal conductive adhesives/adhesive sheets); structural adhesives and prepregs for various structural materials; various coatings, optical components (optical films such as wave plates and retarders, various special lenses such as conic lenses, spherical lenses and cylindrical lenses, lens arrays and the like), insulating films for printed circuit boards and the like. In particular, the composition, and the cured product and laminate thereof may be suitably used for packaging structure materials disclosed in, for example, "Demonstration of 20 μm Pitch Micro-vias by Excimer Laser Ablation in Ultra-thin Dry-film Polymer Dielectrics for Multi-layer RDL on Glass Interposers", "2015 IEEE Electronic Components & Technology Conference, 922-927", "Demonstration of enhanced system-level reliability of ultra-thin BGA packages with circumferential polymer collars and doped solder alloys", "2016 IEEE 66th Electronic Components and Technology Conference, 1377-1385", "Modeling, Design, Fabrication and Demonstration of RF Front-End 3D IPAC Module with Ultra-thin Glass Substrates for LTE Applications", "2016 IEEE 66th Electronic Components and Technology Conference, 1297-1302", "Design, Demonstration and Characterization of Ultra-thin Low-warpage Glass BGA Packages for Smart Mobile Application Processor", "2016 IEEE 66th Electronic Components and Technology Conference, 1465-1470", "Design and Demonstration of Ultra-thin Glass 3D IPD Diplexers", "2016 IEEE 66th Electronic Components and Technology Conference, 2348-2352" and the like.

EXAMPLES

The invention is more specifically described hereinafter by way of Examples. However, the invention is not limited to Examples. In the following descriptions, "part(s)" and "%" are based on the mass unless otherwise stated.

1. Synthesis of Polymer and Preparation of Composition (I)

Example 1

In a four-neck separable flask equipped with a stirrer, 1,1-bis(4-hydroxyphenyl)-3,3,5-trimethylcyclohexane (BisTMC) (18.6 g, 60.0 mmol), 4,6-dichloropyrimidine (Pym) (8.9 g, 60.0 mmol) and potassium carbonate (11.1 g, 81.0 mmol) were weighed and placed to which N-methyl-2-pyrrolidone (64 g) was added, and the mixture was allowed to react in a nitrogen atmosphere at 130° C. for 6 hours. After the completion of the reaction, N-methyl-2-pyrrolidone (368 g) was added, salts were removed by filtration and the solution was then added to methanol (9.1 kg). Deposited solids were separated by filtration, washed with a small amount of methanol, recovered by another filtration, and dried in a vacuum dryer under reduced pressure at 120° C. for 12 hours to obtain polymer P-1 having the structural unit represented by formula (P-1) below (product weight; 20.5 g, yield; 90%, weight average molecular weight (Mw); 32,000, glass transition temperature (Tg); 206° C.).

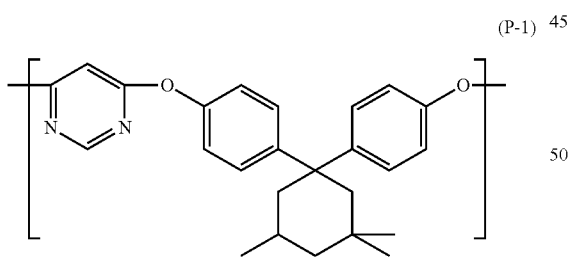

(P-1)

The glass transition temperature (Tg) was a temperature at a maximum loss tangent that was measured on a dynamic viscoelasticity measurement device (manufactured by Seiko Instruments Inc., "DMS7100") at a frequency of 1 Hz and a heating rate of 10° C./min. The loss tangent was obtained by dividing the storage elastic modulus by the loss elastic modulus.

The weight average molecular weight (Mw) was measured on a GPC device ("HLC-8320 type" by Tosoh Corporation) under the conditions below:

Column: "TSKgel α-M" by Tosoh Corporation connected to "TSKgel guard column α" by Tosoh Corporation Development solvent: N-methyl-2-pyrrolidone Column temperature: 40° C.

Flow rate: 1.0 mL/min

Sample concentration: 0.75% by mass

Sample injection: 50 μL

Detector: differential refractometer

Standard substance: monodisperse polystyrene

Using a stirrer, 10 parts of polymer P-1 and 90 parts of curable compound [liquid epoxy compound (bisphenol A-based epoxy, "JER828", manufactured by Mitsubishi Chemical Corporation, epoxy equivalent; 190 meq/g)] were stirred at 130° C. for 30 minutes. Thereafter, 5 parts of curing auxiliary agent [thermosetting agent (1-benzyl-2-methylimidazole, "BMI 12", manufactured by Mitsubishi Chemical Corporation)] was mixed to prepare a composition.

Example 2

A composition was prepared in the same manner as in Example 1 except that the amounts of polymer P-1 obtained in Example 1 and the curable compound [liquid epoxy compound (bisphenol A-based epoxy, "JER828", manufactured by Mitsubishi Chemical Corporation, epoxy equivalent; 190 meq/g)] were changed to 20 parts and 80 parts, respectively.

Example 3

A composition was prepared in the same manner as in Example 1 except that the amounts of polymer P-1 obtained in Example 1 and the curable compound [liquid epoxy compound (bisphenol A-based epoxy, "JER828", manufactured by Mitsubishi Chemical Corporation, epoxy equivalent; 190 meq/g)] were changed to 40 parts and 60 parts, respectively.

Example 4

In a four-neck separable flask equipped with a stirrer, 1,1-bis(4-hydroxyphenyl)-3,3,5-trimethylcyclohexane (BisTMC) (10.7 g, 34.5 mmol), 3,6-dichloropyridazine (Pyd) (5.1 g, 34.2 mmol) and potassium carbonate (6.5 g, 47.0 mmol) were weighed and placed to which N-methyl-2-pyrrolidone (36 g) was added, and the mixture was allowed to react in a nitrogen atmosphere at 145° C. for 9 hours. After the completion of the reaction, N-methyl-2-pyrrolidone (150 g) was added for dilution, salts were removed by filtration and the solution was then added to methanol (3 kg). Deposited solids were separated by filtration, washed with a small amount of methanol, recovered by another filtration, and dried under the same conditions as in Example 1 to obtain polymer P-2 having the structural unit structural unit represented by formula (P-2) below (product weight; 7.6 g, yield; 48%, weight average molecular weight (Mw); 30,000, glass transition temperature (Tg); 232° C.). The weight average molecular weight and the glass transition temperature were measured in the same manner as in Example 1.

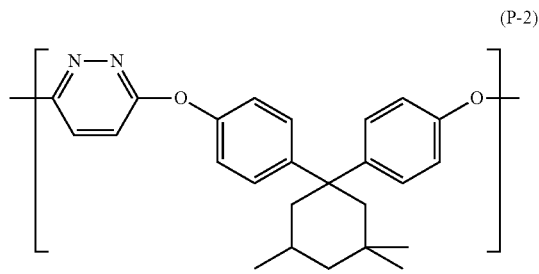

(P-2)

A composition was prepared in the same manner as in Example 1 except that the amounts of polymer P-2 and the curable compound [liquid epoxy compound (bisphenol A-based epoxy, "JER828", manufactured by Mitsubishi Chemical Corporation, epoxy equivalent; 190 meq/g)] were changed to 10 parts and 90 parts, respectively.

Example 5

In a four-neck separable flask equipped with a stirrer, 1,1-bis(4-hydroxyphenyl)-3,3,5-trimethylcyclohexane (BisTMC) (18.6 g, 60.0 mmol), 4,6-dichloro-2-phenylpyrimidine (PhPym) (13.7 g, 61.1 mmol) and potassium carbonate (11.4 g, 82.5 mmol) were weighed and placed to which N-methyl-2-pyrrolidone (75 g) was added, and the mixture was allowed to react in a nitrogen atmosphere at 130° C. for 6 hours. After the completion of the reaction, N-methyl-2-pyrrolidone (368 g) was added for dilution, salts were removed by filtration and the solution was then added to methanol (9.1 kg). Deposited solids were separated by filtration, washed with a small amount of methanol, recovered by another filtration, and dried under the same conditions as in Example 1 to obtain polymer P-3 having the structural unit represented by formula (P-3) below (product weight; 20.5 g, yield; 90%, weight average molecular weight (Mw); 187,000, glass transition temperature (Tg); 223° C.). The weight average molecular weight and the glass transition temperature were measured in the same manner as in Example 1.

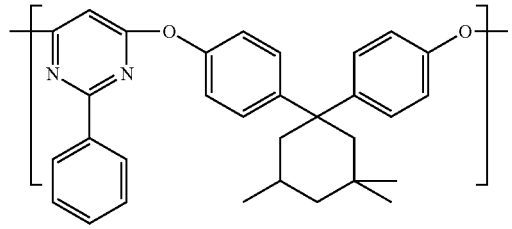

(P-3)

A composition was prepared in the same manner as in Example 1 except that the amounts of polymer P-3 and the curable compound [liquid epoxy compound (bisphenol A-based epoxy, "JER828", manufactured by Mitsubishi Chemical Corporation, epoxy equivalent; 190 meq/g)] were changed to 10 parts and 90 parts, respectively.

Example 6

A composition was prepared by mixing 80 parts of polymer P-1 obtained in Example 1, 20 parts of curable compound [liquid epoxy compound (naphthalene-based epoxy, "HP-4032D", manufactured by DIC Corporation, epoxy equivalent; 141 meq/g)], 5 parts of curing auxiliary agent [thermosetting agent (1-benzyl-2-methylimidazole, "BMI 12", manufactured by Mitsubishi Chemical Corporation)] and 160 parts of solvent (cyclopentanone).

Example 7

A composition was prepared by mixing 50 parts of polymer P-1 obtained in Example 1, 50 parts of curable compound [liquid cyanate ester compound (2,2'-bis(4-cyanatophenyl)propane, manufactured by Tokyo Chemical Industry Co., Ltd.)], 5 parts of curing auxiliary agent [thermosetting agent (1-benzyl-2-methylimidazole, "BMI 12", manufactured by Mitsubishi Chemical Corporation)] and 160 parts of solvent (cyclopentanone).

Comparative Example 1

Using a stirrer, 10 parts of polyphenylene ether (PPE) (glass transition temperature (Tg); 215° C.) and 90 parts of curable compound [liquid epoxy compound (bisphenol A-based epoxy, "JER828", manufactured by Mitsubishi Chemical Corporation, epoxy equivalent; 190 meq/g)] were stirred at 130° C. for 30 minutes. Thereafter, 5 parts of curing auxiliary agent [thermosetting agent (1-benzyl-2-methylimidazole, "BMI 12", manufactured by Mitsubishi Chemical Corporation)] was mixed to prepare a composition.

Comparative Example 2

A curable compound [100 parts, liquid epoxy compound (bisphenol A-based epoxy, "JER828", manufactured by Mitsubishi Chemical Corporation, epoxy equivalent; 190 meq/g)] and 5 parts of curing auxiliary agent [thermosetting agent (1-benzyl-2-methylimidazole, "BMI 12", manufactured by Mitsubishi Chemical Corporation)] were mixed to prepare a composition.

Comparative Example 3

To the composition prepared in Comparative Example 2, 160 parts of solvent (cyclopentanone) was further mixed to prepare a composition.

Comparative Example 4

A curable compound [100 parts, liquid cyanate ester compound (2,2'-bis(4-cyanatophenyl)propane, manufactured by Tokyo Chemical Industry Co., Ltd.)], 5 parts of curing auxiliary agent [thermosetting agent (1-benzyl-2-methylimidazole, "BMI 12", manufactured by Mitsubishi Chemical Corporation)] and 160 parts of solvent (cyclopentanone) were mixed to prepare a composition.

Comparative Example 5

A composition used was prepared by mixing 100 parts of polymer P-1 and 160 parts of solvent (cyclopentanone).

2. Evaluation of Compositions and Cured Products Obtained Therefrom and Results Thereof 2-1. Properties (Solubility and Solubility Change) of Compositions <Solubility>

For each of the compositions of Examples 1 to 5 and Comparative Examples 1 and 2, the solubility of the polymer to the curable compound during stirring of the polymer and the liquid curable compound at 130° C. for 30 minutes during preparation of each composition was visually evaluated. The scores of "Good", "Fair" and "Poor" were given when the solution was uniform without visible aggregates, the solution contained aggregates and the polymer was insoluble, respectively. The results are indicated in Table 1.

<Solubility Change>

For each of the compositions of Examples 6 and 7 and Comparative Examples 3 to 5, the change of solubility in an organic solvent before and after curing was evaluated as indicated below.

(Pre-Curing Solubility)

Each composition (1 part) and 100 parts of organic solvent [N-methyl-2-pyrrolidone (NMP)] were mixed to evaluate the solubility in NMP. The evaluations of "Soluble" and "Insoluble" were given when the solution was uniform without visible aggregates and when the solution contained residual aggregates.

(Post-Curing Solubility)

Each composition was applied on a release film with a bar coater and heated at 70° C. for 15 minutes. By heating at 120° C. for 15 minutes followed by further heating at 180° C. for 2 hours, a cured product for evaluation (2 cm×3 cm×thickness 50 μm) was prepared. The obtained cured product was then immersed in NMP (50 mL) at room temperature for 24 hours and then dried. According to formula [(Weight of the cured product after immersion and drying)/(Weight of the cured product before immersion)×100], the residual ratio (%) was calculated. The evaluations of "Insoluble" and "Soluble" were given when the residual ratio was 90% or more and less than 90%, respectively.

(Evaluation Criteria)

When the composition had pre-curing solubility in NMP of "Soluble" and the solubility of the post-curing cured product in NMP of "Insoluble", the evaluation of "Good" was given. Meanwhile, the composition had pre-curing solubility in NMP of "Soluble" and the solubility of the post-curing cured product in NMP of "Soluble", the evaluation of "Poor" was given. The results are shown in Table 2.

2-2. Properties [Chemical Resistance, Toughness (Tensile Strength, Tensile Elongation, Shear Strength), Heat Resistance (Glass Transition Temperature)] of Cured Products For cured products obtained with the compositions of Examples 1 to 7 and Comparative Examples 1 to 5, properties were evaluated or analyzed as indicated below.

<Chemical Resistance>

Each composition was sandwiched with wafers that had been subjected to release treatment and heated at 180° C. for 2 hours to prepare a cured product for evaluation (2 cm×3 cm×thickness 50 μm). The obtained cured product was immersed in 50 mL of N-methyl-2-pyrrolidone (NMP) at room temperature for 24 hours followed by drying. According to formula [(Weight of the cured product after immersion and drying)/(Weight of the cured product before immersion)×100], the residual ratio (%) was calculated. The evaluations of "Good" and "Poor" were given when the residual ratio was 90% or more and less than 90%, respectively. The results are shown in Table 1 and Table 2.

<Tensile Strength and Tensile Elongation>

Each composition was sandwiched with wafers that had been subjected to release treatment and heated at 180° C. for 2 hours to prepare a cured product for evaluation (5 mm×1 cm×thickness 50 μm). The prepared cured product was pulled at 5 mm/min on "Instron 5567" manufactured by Instron, and the maximum stress and maximum elongation at fracture were regarded as tensile strength and tensile elongation, respectively. The results are shown in Table 1 and Table 2.

<Shear Strength>

Each composition was sandwiched with aluminum plates (25 mm×100 mm×thickness 2 mm) that had been anodized with phosphoric acid and heated at 180° C. for 2 hours to prepare a test specimen for shear strength evaluation. The prepared test specimen was pulled at a rate of 1 mm/min on "Instron 5567" manufactured by Instron according to JIS K6850, and the maximum load was regarded as shear strength. The results are shown in Table 1 and Table 2. In Examples 1 to 5 and Comparative Examples 1 and 2, the evaluation was performed by changing the curing auxiliary agent in the composition from 5 parts of 1-benzyl-2-methylimidazole to 5 parts of dicyandiamide [thermosetting agent, "DICY 7" (fine particles having a 50% particle diameter of 3 μm), manufactured by Mitsubishi Chemical Corporation].

<Glass Transition Temperature>

Each composition was sandwiched with wafers that had been subjected to release treatment and heated at 180° C. for 2 hours to prepare a cured product for evaluation (3 mm×1 cm×thickness 50 μm). The obtained cured product was subjected to measurement on a DMS tester (type "EXSTAR 4000", manufactured by Seiko Instruments Inc.) in a temperature range of 23° C. to 350° C. under the measurement condition of 1 Hz. The Tan δ was regarded as glass transition temperature. The results are shown in Table 1 and Table 2.

TABLE 1

| | | Example | | | | | Comparative Example | |
|---|---|---|---|---|---|---|---|---|
| | | 1 | 2 | 3 | 4 | 5 | 1 | 2 |
| Polymer [A] | Type | P-1 | P-1 | P-1 | P-2 | P-3 | — | — |
| | parts by mass | 10 | 20 | 40 | 10 | 10 | | |
| Comparative polymer | Type | — | — | — | — | — | PPE | — |
| | parts by mass | | | | | | 10 | |
| Curable compound | Type | Epoxy compound | Epoxy compound | Epoxy compound | Epoxy compound | Epoxy compound | Epoxy compound | Epoxy compound |
| | parts by mass | 90 | 80 | 60 | 90 | 90 | 90 | 100 |
| Curing auxiliary agent | parts by mass | 5 | 5 | 5 | 5 | 5 | 5 | 5 |
| Properties of polymer | Tg (° C.) | 206 | 206 | 206 | 232 | 223 | 215 | — |
| Properties of composition | Solubility | Good | Good | Good | Good | Good | Fair | — |
| Properties of cured product | Chemical resistance | Good | Good | Good | Good | Good | Good | Good |
| | Tensile strength (MPa) | 70 | — | — | — | 56 | 44 | 46 |
| | Tensile elongation (%) | 11 | — | — | — | 10 | 6 | 4 |
| | Shear strength (MPa) | 24 | 32 | 31 | 32 | 20 | 15 | 18 |
| | Tg (° C.) | 168 | 177 | 177 | 173 | 162 | 150 | 157 |

TABLE 2

|  |  | Example | | Comparative Example | | |
|---|---|---|---|---|---|---|
|  |  | 6 | 7 | 3 | 4 | 5 |
| Polymer [A] | Type | P-1 | P-1 | — | — | P-1 |
|  | parts by mass | 80 | 50 |  |  | 100 |
| Comparative polymer | Type | — | — | — | — | — |
|  | parts by mass |  |  |  |  |  |
| Curable compound | Type | Epoxy compound | Cyanate ester compound | Epoxy compound | Cyanate ester compound | — |
|  | parts by mass | 20 | 50 | 100 | 100 | — |
| Curing auxiliary agent | parts by mass | 5 | 5 | 5 | 5 | — |
| Properties of polymer | Tg (° C.) | 206 | 206 | — | — | 206 |
| Properties of composition | Solubility change | Good | Good | Good | Good | Poor |
| Property of cured product | Chemical resistance | Good | Good | Good | Good | Poor |
|  | Tensile strength (MPa) | 89 | 100 | 46 | 93 | 65 |
|  | Tensile elongation (%) | 3 | 4 | 4 | 10 | 11 |
|  | Shear strength (MPa) | — | — | — | — | — |
|  | Tg (° C.) | 220 | 230 | 157 | 173 | 220 |

2-3. Evaluation Results

According to the results of evaluation of solubility in Table 1, compositions of Examples 1 to 5 containing polymer [A] (any of polymers P-1, P-2 and P-3 obtained in [1] above) were uniform solutions and evaluated as "Good". Meanwhile, the composition of Comparative Example 1 containing a known resin (polyphenylene ether) instead of polymer [A] was not a uniform solution, contained residual aggregates, and thus was evaluated as "Fair". From this, it was found that polymer [A] included in Examples 1 to 5 had better solubility in thermosetting compounds such as epoxy compounds than the known resin (polyphenylene ether). In addition, as described above, compositions of Examples 1 to 5 have excellent solubility to curable compounds, and thus may be used as non-solvent system compositions.

According to the results of evaluation of solubility change in Table 2, the cured product of Comparative Example 5 which contained polymer [A] P-1 without a curable compound dissolved in solvents including N-methylpyrrolidone, and thus were evaluated as "Poor". Meanwhile, respective cured products of Examples 6 and 7 containing polymer [A] P-1 and a curable compound (epoxy compound or cyanate ester compound) sparingly dissolved in solvents including N-methyl-2-pyrrolidone, and thus were evaluated as "Good". From this, it was found that by adding the curable compound, the composition had shifted post-curing solubility and improved chemical resistance.

Further, according to the results of evaluation of tensile strength, tensile elongation and shear strength in Table 1 and Table 2, it was found that cured products of Examples 1 to 7 containing polymer [A] had further improved strength compared to the cured product of Comparative Example 1 containing a known resin (polyphenylene ether). It was further found that, according to the results of glass transition temperature of cured products, the cured products of the compositions of Examples 1 to 7 had improved heat resistance compared to the cured product of the composition of Comparative Example 1.

3. Synthesis of Polymer (II)

Example 8

In a four-neck separable flask equipped with a stirrer, bis(4-aminophenyl)methane (19.8 g, 100.0 mmol) and 4,6-dichloropyrimidine (14.9 g, 100.0 mmol) were weighed and placed to which N-methyl-2-pyrrolidone (81 g) was added, and the mixture was allowed to react in a nitrogen atmosphere at 145° C. for 8 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 15 hours to obtain polymer P-4 having the structural unit represented by formula (P-4) below (product weight: 26.3 g, yield; 96%).

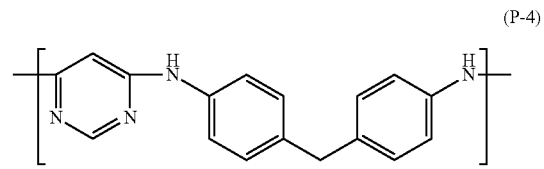

(P-4)

Example 9

In a four-neck separable flask equipped with a stirrer, bis(4-aminocyclohexyl)methane (15.8 g, 75.0 mmol) and 4,6-dichloropyrimidine (11.2 g, 75.0 mmol) which were weighed were place to which N-methyl-2-pyrrolidone (63 g) was added, and the mixture was allowed to react in a nitrogen atmosphere at 145° C. for 7 hours. After the completion of the reaction, the mixture was added to methanol (2.0 kg). Deposited solids were separated by filtration, washed with a small amount of methanol, recovered by another filtration and then dried under the same conditions as in Example 1 to obtain polymer P-5 having the structural unit represented by formula (P-5) below (product weight; 10.1 g, yield; 47%).

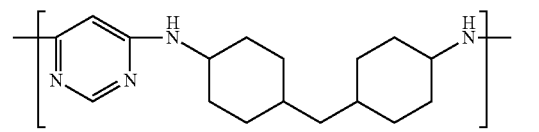

(P-5)

Example 10

In a four-neck separable flask equipped with a stirrer, α,α'-bis(4-aminophenyl)-1,4-diisopropylbenzene (17.2 g, 50.0 mmol) and 4,6-dichloropyrimidine (7.4 g, 50.0 mmol) were weighed and placed to which N-methyl-2-pyrrolidone (58 g) was added and the mixture was allowed to react in a nitrogen atmosphere at 145° C. for 12 hours. After the completion of the reaction, N-methyl-2-pyrrolidone (80 g) was added and the mixture was added to methanol (3.0 kg). Deposited solids were separated by filtration, washed with a small amount of methanol, recovered by another filtration and then dried under the same conditions as in Example 1 to obtain polymer P-6 having the structural unit represented by formula (P-6) below (product weight; 20.2 g, yield; 96%).

Example 11

In a four-neck separable flask equipped with a stirrer, 2,2-bis[4-(4-aminophenoxy)phenyl]propane (24.6 g, 60.0 mmol) and 4,6-dichloropyrimidine (8.9 g, 60.0 mmol) were weighed and placed to which N-methyl-2-pyrrolidone (78 g) was added, and the mixture was allowed to react in a nitrogen atmosphere at 145° C. for 8 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-7 having the structural unit represented by formula (P-7) below (product weight; 20.7 g, yield; 71%).

The structure of polymer P-7 was identified by $^1$H-NMR using deuterodimethyl sulfoxide as a measurement solvent on a nuclear magnetic resonator ("ECX400P" by JEOL Ltd.). Chemical shifts are indicated below:

$^1$H-NMR (DMSO-d6, 400 MHz) δ (ppm): 1.60 (s, 6H), 6.07 (s, 1H), 6.88 (d, 4H), 7.00 (d, 4H), 7.20 (d, 4H), 7.46 (d, 4H), 8.31 (s, 1H), 9.81 (s, 2H)

Example 12

In a four-neck separable flask equipped with a stirrer, bis(4-aminophenyl)sulfone (24.8 g, 100.0 mmol) and 4,6-dichloropyrimidine (14.9 g, 100.0 mmol) were weighed and placed to which N-methyl-2-pyrrolidone (93 g) was added, and the mixture was allowed to react in a nitrogen atmosphere at 160° C. for 14 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 14 hours to obtain polymer P-8 having the structural unit represented by formula (P-8) below (product weight; 30.8 g, yield; 95%).

Example 13

In a four-neck separable flask equipped with a stirrer, 2,2-bis[4-(4-aminophenoxy)phenyl]propane (16.4 g, 40.0 mmol), bis(4-aminophenyl)sulfone (9.9 g, 40.0 mmol) and 4,6-dichloropyrimidine (11.9 g, 80.0 mmol) were weighed and placed to which N-methyl-2-pyrrolidone (89 g) was added, and the mixture was allowed to react in a nitrogen atmosphere at 145° C. for 8 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 16 hours to obtain polymer P-9 having the structural unit represented by formula (P-9) below (product weight; 12.5 g, yield; 39%). The ratio (a:b) between the constituent units in the polymer is 50:50 (mol %).

The structure of polymer P-9 was identified by $^1$H-NMR as in Example 11. Chemical shifts are indicated below.

$^1$H-NMR (DMSO-d6, 400 MHz) δ (ppm): 1.59 (s, 6H), 6.07-6.30 (m, 2H), 6.84-6.87 (m, 4H), 6.95-6.98 (m, 4H), 7.17-7.19 (m, 4H), 7.51-7.53 (m, 4H), 7.77-7.83 (m, 8H), 8.21-8.40 (m, 2H), 9.10-9.25 (m, 2H), 9.66-9.81 (m, 2H)

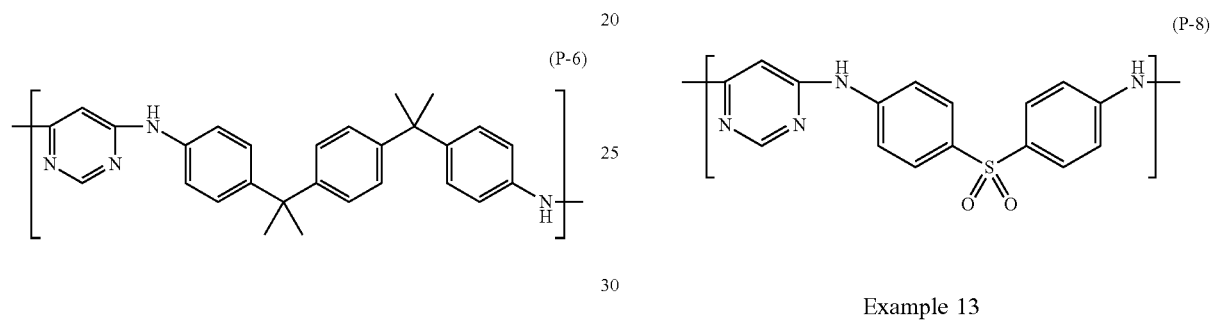

(P-6)

(P-8)

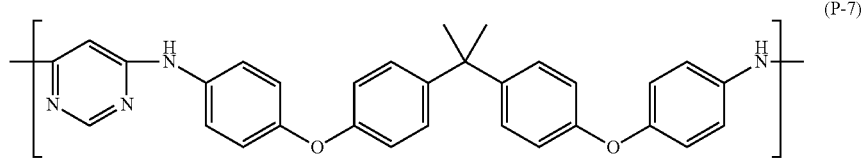

(P-7)

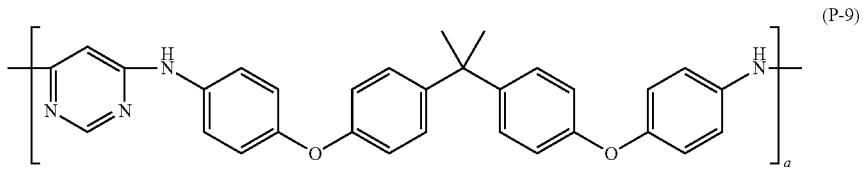

(P-9)

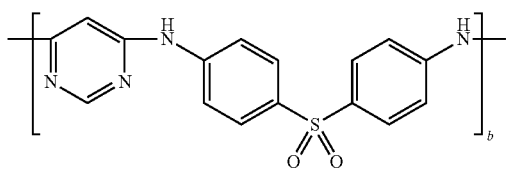

Example 14

In a four-neck separable flask equipped with a stirrer, bis(3-aminophenyl)sulfone (12.4 g, 50.0 mmol) and 4,6-dichloropyrimidine (7.4 g, 50.0 mmol) were weighed and placed to which N-methyl-2-pyrrolidone (46 g) was added, and the mixture was allowed to react in a nitrogen atmosphere at 145° C. for 15 hours. After the completion of the reaction, N-methyl-2-pyrrolidone (50 g) was added and the mixture was added to methanol (3.0 kg). Deposited solids were separated by filtration, washed with a small amount of methanol, recovered by another filtration and then dried in a vacuum dryer under reduced pressure at 120° C. for 13 hours to obtain polymer P-10 having the structural unit represented by formula (P-10) below (product weight; 14.9 g, yield; 92%).

Example 15

In a four-neck separable flask equipped with a stirrer, 2,2-bis[4-(4-aminophenoxy)phenyl]propane (16.4 g, 40.0 mmol), bis(3-aminophenyl)sulfone (9.9 g, 40.0 mmol) and 4,6-dichloropyrimidine (11.9 g, 80.0 mmol) were weighed and placed to which N-methyl-2-pyrrolidone (89 g) was added, and the mixture was allowed to react in a nitrogen atmosphere at 145° C. for 7 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 13 hours to obtain polymer P-11 having the structural unit represented by formula (P-11) below (product weight; 30.3 g, yield; 93%). The ratio (a:b) between the constituent units in the polymer is 50:50 (mol %).

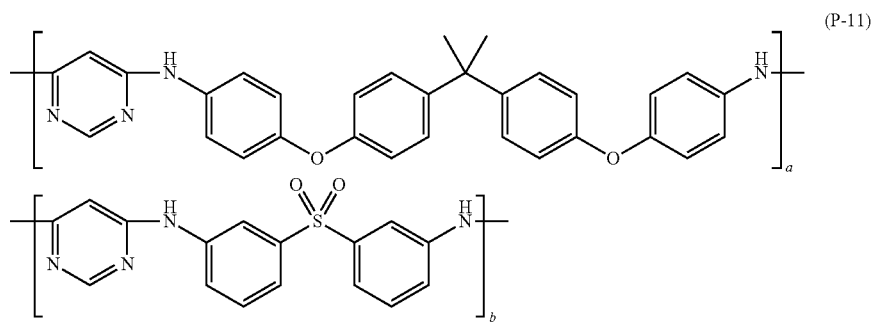

(P-11)

(P-10)

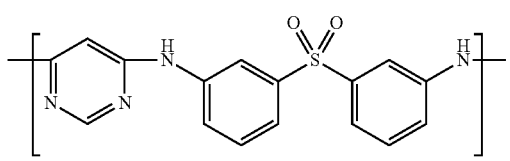

Example 16

In a four-neck separable flask equipped with a stirrer, 4,4'-diaminobenzanilide (18.2 g, 80.0 mmol) and 4,6-dichloropyrimidine (11.9 g, 80.0 mmol) were weighed and placed to which N-methyl-2-pyrrolidone (70 g) was added, and the mixture was allowed to react in a nitrogen atmosphere at 145° C. for 9 hours. After the completion of the reaction, N-methyl-2-pyrrolidone (80 g) was added and the mixture was added to methanol (3.0 kg). Deposited solids were separated by filtration, washed with a small amount of methanol, recovered by another filtration and then dried under the same conditions as in Example 1 to obtain polymer P-12 having the structural unit represented by formula (P-12) below (product weight; 8.7 g, yield; 36%).

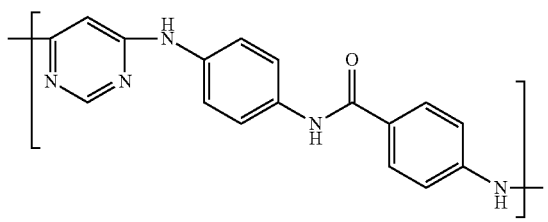

(P-12)

Example 17

In a four-neck separable flask equipped with a stirrer, 2,2-bis[4-(4-aminophenoxy)phenyl]propane (20.5 g, 50.0 mmol), 2,2-bis(3-amino-4-hydroxyphenyl)propane (3.2 g, 12.5 mmol) and 4,6-dichloropyrimidine (9.3 g, 62.5 mmol) were weighed and placed to which N-methyl-2-pyrrolidone (77 g) was added, and the mixture was allowed to react in a nitrogen atmosphere at 145° C. for 8 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 16 hours to obtain polymer P-13 having the structural unit represented by formula (P-13) below (product weight; 26.7 g, yield; 94%). The ratio (a:b) between the constituent units in the polymer is 80:20 (mol %).

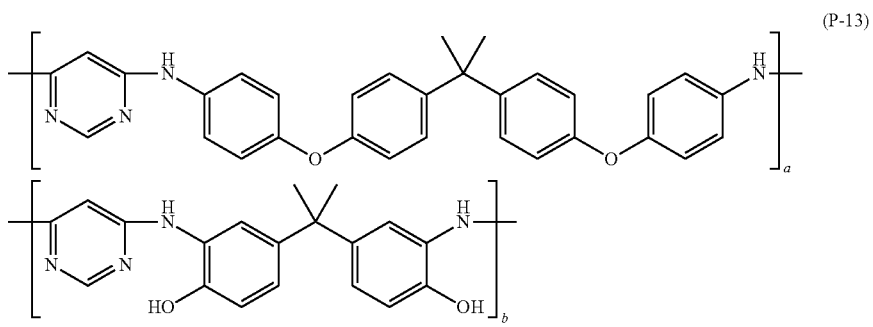

(P-13)

Example 18

In a four-neck separable flask equipped with a stirrer, 2,2-bis[4-(4-aminophenoxy)phenyl]propane (20.5 g, 50.0 mmol), 1,4-phenylenediamine (5.4 g, 50.0 mmol) and 4,6-dichloropyrimidine (14.9 g, 100.0 mmol) were weighed and placed to which N-methyl-2-pyrrolidone (95 g) was added and the mixture was allowed to react in a nitrogen atmosphere at 145° C. for 5.5 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 13 hours to obtain polymer P-14 having the structural unit represented by formula (P-14) below (product weight; 32.6 g, yield; 97%). The ratio (a:b) between the constituent units in the polymer is 50:50 (mol %).

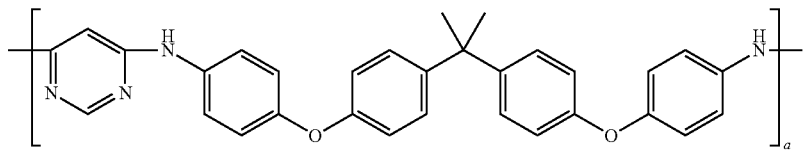

(P-14)

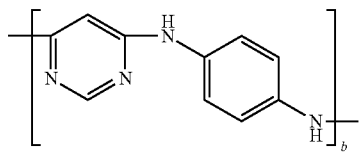

Example 19

In a four-neck separable flask equipped with a stirrer, 2,2-bis[4-(4-aminophenoxy)phenyl]propane (16.8 g, 40.9 mmol), N,N'-di-sec-butyl-1,4-phenylenediamine (9.0 g, 40.9 mmol) and 4,6-dichloropyrimidine (12.2 g, 81.9 mmol) were weighed and placed to which N-methyl-2-pyrrolidone (87 g) was added, and the mixture was allowed to react in a nitrogen atmosphere at 145° C. for 7.5 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-15 having the structural unit represented by formula (P-15) below (product weight; 9.9 g, yield; 31%). The ratio (a:b) between the constituent units in the polymer is 50:50 (mol %).

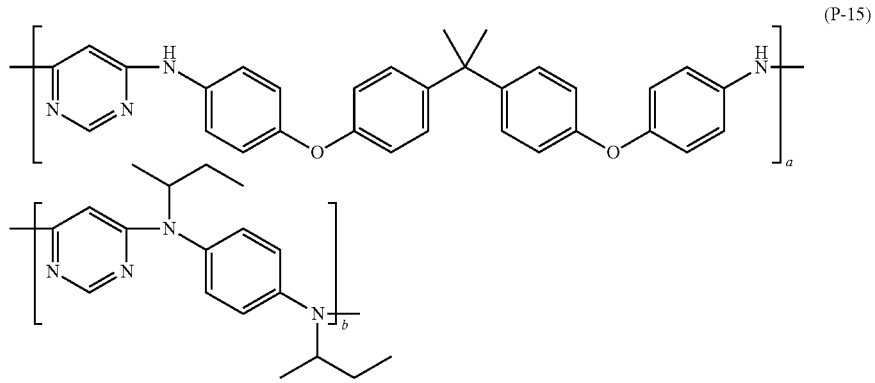

Example 20

In a four-neck separable flask equipped with a stirrer, 2,2-bis[4-(4-aminophenoxy)phenyl]propane (12.3 g, 30.0 mmol), N,N'-di-beta-naphthyl-1,4-phenylenediamine (10.8 g, 30.0 mmol) and 4,6-dichloropyrimidine (8.9 g, 60.0 mmol) were weighed and placed to which N-methyl-2-pyrrolidone (75 g) was added, and the mixture was allowed to react in a nitrogen atmosphere at 145° C. for 7 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-16 having the structural unit represented by formula (P-16) below (product weight; 18.6 g, yield; 67%). The ratio (a:b) between the constituent units in the polymer is 50:50 (mol %).

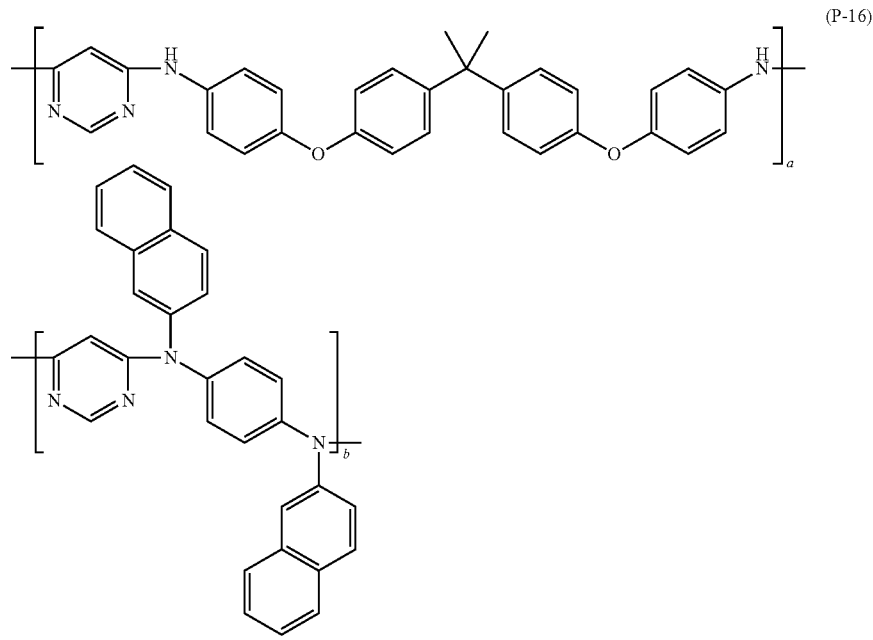

Example 21

In a four-neck separable flask equipped with a stirrer, 2,2-bis[4-(4-aminophenoxy)phenyl]propane (14.4 g, 35.0 mmol), 2,4-diethyl-6-methyl-1,3-phenylenediamine (6.2 g, 35.0 mmol) and 4,6-dichloropyrimidine (10.4 g, 70.0 mmol) were weighed and placed to which N-methyl-2-pyrrolidone (72 g) was added, and the mixture was allowed to react in a nitrogen atmosphere at 145° C. for 13 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-17 having the structural unit represented by formula (P-17) below (product weight; 12.2 g, yield; 47%). The ratio (a:b) between the constituent units in the polymer is 50:50 (mol %).

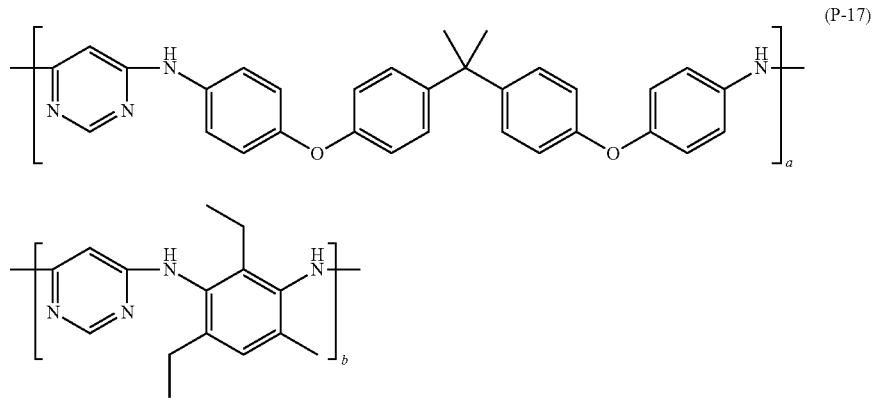

Example 22

In a four-neck separable flask equipped with a stirrer, 2,2-bis[4-(4-aminophenoxy)phenyl]propane (20.5 g, 50.0 mmol), benzoguanamine (2.3 g, 12.5 mmol) and 4,6-dichloropyrimidine (9.3 g, 62.5 mmol) were weighed and placed to which N-methyl-2-pyrrolidone (75 g) was added, and the mixture was allowed to react in a nitrogen atmosphere at 145° C. for 15.5 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-18 having the structural unit represented by formula (P-18) below (product weight; 11.6 g, yield; 42%). The ratio (a:b) between the constituent units in the polymer is 80:20 (mol %).

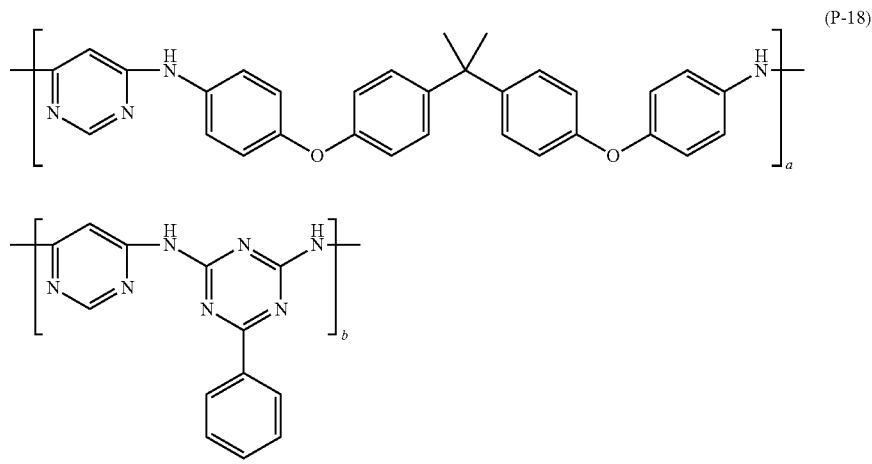

Example 23

In a four-neck separable flask equipped with a stirrer, 2,2-bis[4-(4-aminophenoxy)phenyl]propane (20.5 g, 50.0 mmol), 2,4-diamino-6-hydroxypyrimidine (1.6 g, 12.5 mmol) and 4,6-dichloropyrimidine (9.3 g, 62.5 mmol) were weighed and placed to which N-methyl-2-pyrrolidone (73 g) was added, and the mixture was allowed to react in a nitrogen atmosphere at 145° C. for 8 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-19 having the structural unit represented by formula (P-19) below (product weight; 16.5 g, yield; 62%). The ratio (a:b) between the constituent units in the polymer is 80:20 (mol %).

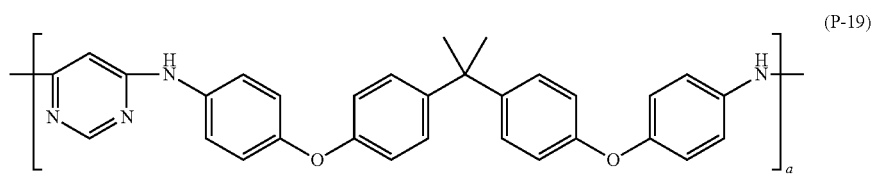
(P-19)

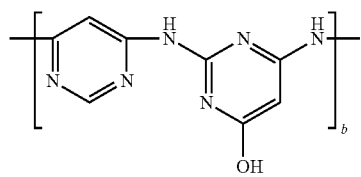

Example 24

In a four-neck separable flask equipped with a stirrer, 2,2-bis[4-(4-aminophenoxy)phenyl]propane (8.2 g, 20.0 mmol) and 4,6-dichloro-2-phenylpyrimidine (4.5 g, 20.0 mmol) were weighed and placed to which N-methyl-2-pyrrolidone (30 g) was added, and the mixture was allowed to react in a nitrogen atmosphere at 145° C. for 9.5 hours. After the completion of the reaction, N-methyl-2-pyrrolidone (50 g) was added and the mixture was added to methanol (2.0 kg). Deposited solids were separated by filtration, washed with a small amount of methanol, recovered by another filtration and then dried under the same conditions as in Example 1 to obtain polymer P-20 having the structural unit represented by formula (P-20) below (product weight; 10.7 g, yield; 95%).

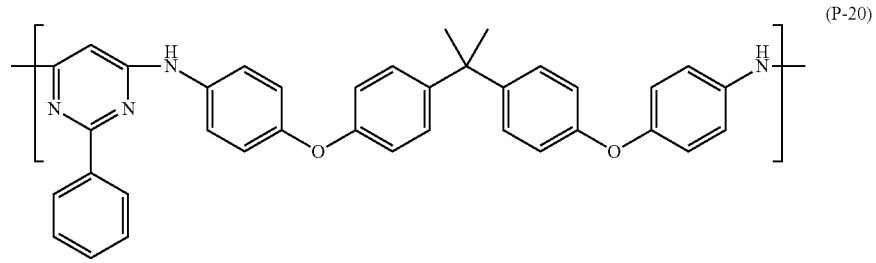
(P-20)

Example 25

In a four-neck separable flask equipped with a stirrer, 2,2-bis[4-(4-aminophenoxy)phenyl]propane (24.6 g, 60.0 mmol) and 3,6-dichloropyridazine (8.9 g, 60.0 mmol) were weighed and placed to which N-methyl-2-pyrrolidone (78 g) was added, and the mixture was allowed to react in a nitrogen atmosphere at 145° C. for 7 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-21 having the structural unit represented by formula (P-21) below (product weight; 15.1 g, yield; 52%).

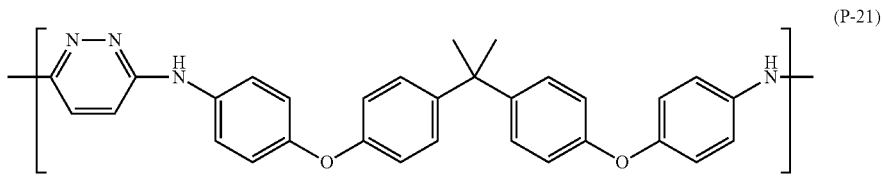

(P-21)

Example 26

In a four-neck separable flask equipped with a stirrer, 2,2-bis[4-(4-aminophenoxy)phenyl]propane (20.5 g, 50.0 mmol) and 2,6-dichloropyrazine (7.4 g, 50.0 mmol) were weighed and placed to which N-methyl-2-pyrrolidone (65 g) was added, and the mixture was allowed to react in a nitrogen atmosphere at 145° C. for 10 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried under the same conditions as in Example 1 to obtain polymer P-22 having the structural unit represented by formula (P-22) below (product weight; 6.8 g, yield; 28%).

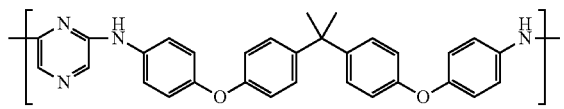

(P-22)

Example 27

In a four-neck separable flask equipped with a stirrer, 2,2-bis[4-(4-aminophenoxy)phenyl]propane (28.7 g, 70.0 mmol), 4,6-dichloropyrimidine (5.2 g, 35.0 mmol) and 3,6-dichloropyridazine (5.2 g, 35.0 mmol) were weighed and placed to which N-methyl-2-pyrrolidone (91 g) was added, and the mixture was allowed to react in a nitrogen atmosphere at 145° C. for 8.5 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 17 hours to obtain polymer P-23 having the structural unit represented by formula (P-23) below (product weight; 30.8 g, yield; 90%). The ratio (a:b) between the constituent units in the polymer is 50:50 (mol %).

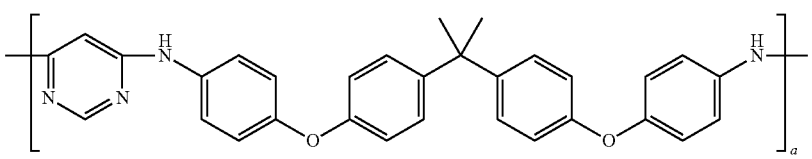

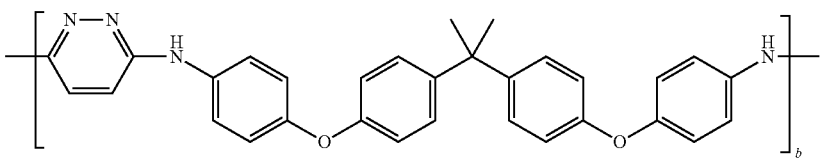

(P-23)

Example 28

In a four-neck separable flask equipped with a stirrer, 2,2-bis[4-(4-aminophenoxy)phenyl]propane (16.4 g, 40.0 mmol), bis(4-aminophenyl)sulfone (9.9 g, 40.0 mmol) and 3,6-dichloropyridazine (11.9 g, 80.0 mmol) were weighed and placed to which N-methyl-2-pyrrolidone (89 g) was added, and the mixture was allowed to react in a nitrogen atmosphere at 145° C. for 18 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 17 hours to obtain polymer P-24 having the structural unit represented by formula (P-24) below (product weight; 28.6 g, yield; 88%). The ratio (a:b) between the constituent units in the polymer is 50:50 (mol %).

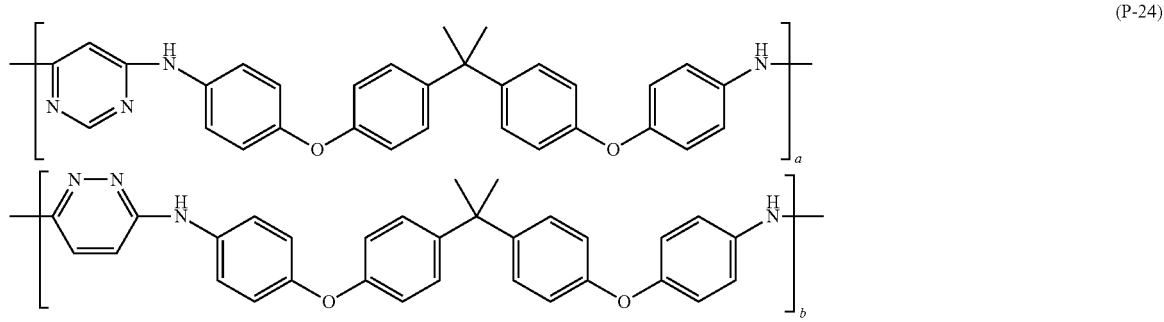

(P-24)

Example 29

In a four-neck separable flask equipped with a stirrer, 2,2-bis[4-(4-aminophenoxy)phenyl]propane (16.4 g, 40.0 mmol), bis(4-aminophenyl)sulfone (9.9 g, 40.0 mmol), 4,6-dichloropyrimidine (6.0 g, 40.0 mmol) and 3,6-dichloropyridazine (6.0 g, 40.0 mmol) were weighed and placed to which N-methyl-2-pyrrolidone (89 g) was added, and the mixture was allowed to react in a nitrogen atmosphere at 145° C. for 14 hours. After the completion of the reaction, N-methyl-2-pyrrolidone (100 g) was added and the mixture was added to methanol (3.0 kg). Deposited solids were separated by filtration, washed with a small amount of methanol, recovered by another filtration and then dried in a vacuum dryer under reduced pressure at 120° C. for 14 hours to obtain polymer P-25 having the structural unit represented by formula (P-25) below (product weight; 25.8 g, yield; 80%). The ratio (a:b:c:d) between the constituent units in the polymer is 25:25:25:25 (mol %).

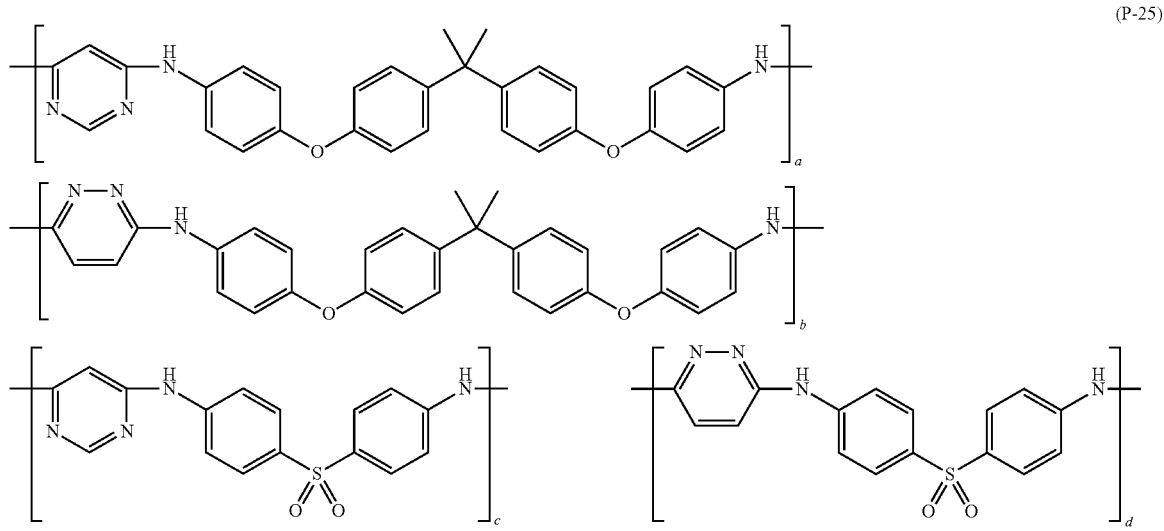

(P-25)

Example 30

In a four-neck separable flask equipped with a stirrer, bis(4-aminophenyl)methane (19.8 g, 100.0 mmol), 4,6-dichloropyrimidine (14.9 g, 100.0 mmol) and potassium carbonate (18.7 g, 135 mmol) were weighed and placed to which N-methyl-2-pyrrolidone (81 g) was added, and the mixture was allowed to react in a nitrogen atmosphere at 130° C. for 8 hours. After the completion of the reaction, N-methyl-2-pyrrolidone (100 g) was added for dilution and the precipitate was removed by filtration. The filtrate was added to methanol (3.0 kg). Deposited solids were separated by filtration, washed with a small amount of methanol, recovered by another filtration and then dried in a vacuum dryer under reduced pressure at 120° C. for 15 hours to obtain polymer P-26 having the structural unit represented by formula (P-26) below (product weight; 10.4 g, yield; 38%).

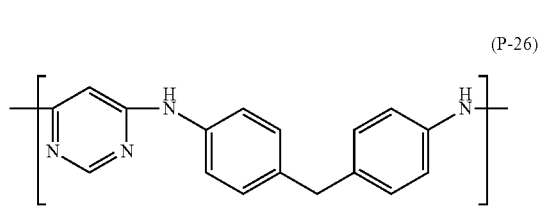

(P-26)

Example 31

In a four-neck separable flask equipped with a stirrer, bis(4-aminophenyl)methane (19.8 g, 100.0 mmol), 4,6-dichloropyrimidine (14.9 g, 100.0 mmol) and potassium carbonate (18.7 g, 135 mmol) were weighed and placed to which N-methyl-2-pyrrolidone (81 g) was added, and the mixture was allowed to react in a nitrogen atmosphere at 145° C. for 8 hours. After the completion of the reaction, N-methyl-2-pyrrolidone (100 g) was added for dilution and the precipitate was removed by filtration. The filtrate was added to methanol (3.0 kg). Deposited solids were separated by filtration, washed with a small amount of methanol, recovered by another filtration and then dried in a vacuum dryer under reduced pressure at 120° C. for 15 hours to obtain polymer P-27 having the structural unit represented by formula (P-27) below (product weight; 17.0 g, yield; 62%).

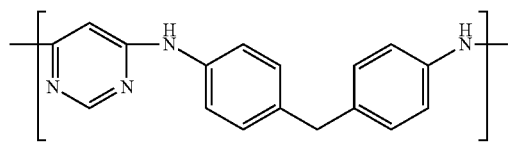

(P-27)

Comparative Example 6

In a two-neck round bottom flask containing a stir bar, α,α'-bis(4-aminophenyl)-1,4-diisopropylbenzene (12.1 g, 35.0 mmol) and triethylamine (7.4 g, 72.8 mmol) were weighed and placed to which N-methyl-2-pyrrolidone (67 g) was added, thereby preparing a diamine solution. Separately, terephthaloyl chloride (3.5 g, 17.3 mmol) and isophthaloyl chloride (3.5 g, 17.3 mmol) were dissolved in N-methyl-2-pyrrolidone (9 g) to prepare a carbonyl dihalide solution. The carbonyl dihalide solution was added to the diamine solution under stirring to allow reaction under room temperature for 1 hour. After the completion of the reaction, the polymer solution was added to an excess amount of methanol under vigorous stirring and deposited solids were separated and recovered by filtration. The recovered solid was washed three times with an excess amount of ion exchange water and then dried in a vacuum dryer under reduced pressure at 120° C. for 13 hours to obtain polymer R-1 having the structural unit represented by formula (R-1) below (product weight; 14.8 g, yield; 89%). The ratio (a:b) between the constituent units in the polymer is 50:50 (mol %).

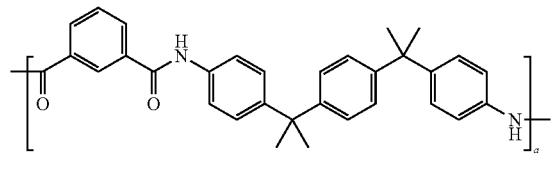

(R-1)

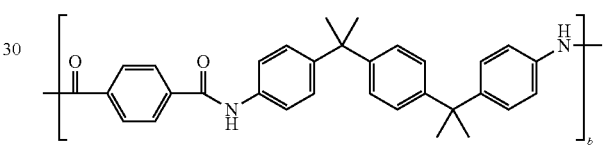

Comparative Example 7

In a four-neck separable flask equipped with a stirrer, α,α'-bis(4-hydroxyphenyl)-1,4-diisopropylbenzene (17.3 g, 50.0 mmol), p-t-butylphenol (0.105 g, 0.7 mmol), sodium hydroxide (4.2 g, 105.7 mmol) and tri-n-butylbenzylammonium chloride (0.109 g, 0.35 mmol) were weighed and placed to which ion exchange water (133 g) was added to prepare a diol aqueous solution. Separately, terephthaloyl chloride (5.1 g, 25.2 mmol) and isophthaloyl chloride (5.1 g, 25.2 mmol) were dissolved in dichloromethane (96 mL) to prepare a dicarbonyl dihalide organic solution. The dicarbonyl dihalide organic solution was added to the diol aqueous solution under vigorous stirring and interfacial polycondensation reaction was carried out in room temperature over 2 hours. After the completion of the reaction, acetic acid was added to neutralize the residual alkali metal compound. After allowing separation of an aqueous phase from an organic phase, the aqueous phase was removed by decantation. An operation of washing the residual organic phase with an equal amount of ion exchange water was repeated three times. The washed organic phase was added to an excess amount of methanol under vigorous stirring, deposited solids were separated and recovered by filtration and dried under the same conditions as in Example 1 to obtain polymer R-2 having the structural unit represented by formula (R-2) below (product weight; 21.6 g, yield; 90%). The ratio (a:b) between the constituent units in the polymer is 50:50 (mol %).

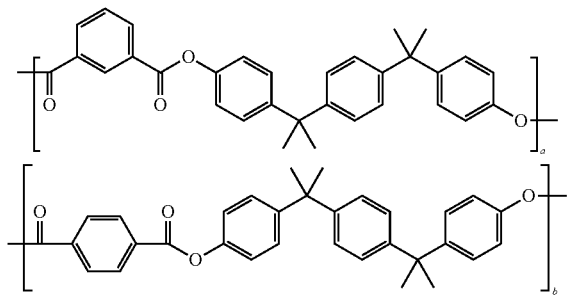

Comparative Example 8

In a screw vial containing a stir bar, α,α'-bis(4-aminophenyl)-1,4-diisopropylbenzene (2.4 g, 7.0 mmol) was weighed and placed to which N-methyl-2-pyrrolidone (24 g) was added to prepare a diamine solution. To the diamine solution, pyromellitic anhydride (1.5 g, 6.9 mmol) was added under stirring and allowed to react under room temperature for 5 hours to obtain a solution containing polymer R-3 having the structural unit represented by formula (R-3) below. The obtained solution was applied on a glass substrate with a spin coater, dried at 70° C. for 15 minutes and then dried at 120° C. for 15 minutes to obtain a film which was then peeled from the glass substrate. The film was fixed to a metal frame and further baked in nitrogen at 350° C. for 1 hour to obtain a film (thickness: 30 μm).

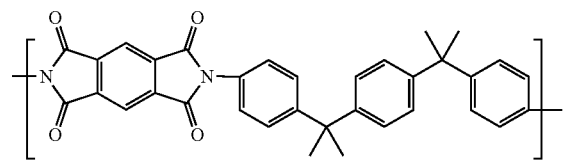

Comparative Example 9

The polymer with the product name "ULTRASON S 3010" manufactured by BASF having the structural unit represented by formula (R-4) below was used as polymer R-4.

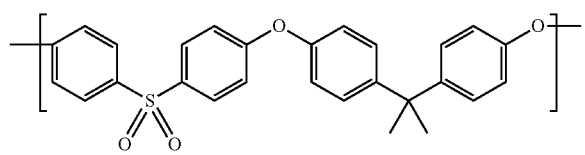

4. Evaluation of Physical Properties of Polymers

For each polymer obtained as above, "weight average molecular weight (Mw)", "glass transition temperature (Tg)", "refractive index", "mechanical properties (coefficient of thermal expansion, elastic modulus and tensile strength)" were evaluated according to the methods indicated below. The evaluation results are shown in Table 3 and Table 4. In the Tables, "-" means that the corresponding item was not measured.

<Weight Average Molecular Weight (Mw)>

The weight average molecular weight (Mw) of each polymer was measured under the same conditions as in Example 1.

<Glass Transition Temperature (Tg)>

The glass transition temperature (Tg) of each polymer was obtained as a temperature corresponding to the point of intersection between the base line and the tangent line at the inflection point in the DSC heating curve of the thermogram obtained in a nitrogen atmosphere with a heating rate 20° C./min using a differential scanning calorimeter (DSC device "Thermo Plus DSC8230" by Rigaku Corporation). The inflection point was a temperature corresponding to the peak in the DDSC curve which was a derivative curve of the DSC heating curve. In order to verify the baseline of DSC, DDSC curves were appropriately referred to.

<Refractive Index (nD)>

Each polymer was first dissolved in N-methyl-2-pyrrolidone to obtain a composition having a polymer concentration of 20% by mass. The composition was applied on a glass substrate with a spin coater, dried at 70° C. for 15 minutes and then dried at 120° C. for 15 minutes to obtain a film which was then peeled from the glass substrate. The film was fixed to a metal frame and further dried at 150° C. for 12 hours to obtain a film for evaluation having a thickness of 30 μm. The film of Comparative Example 8 was used for evaluation as it was (the same applies the following). The refractive index of the film for evaluation of each polymer was then measured on a prism coupler (model PC-2010) manufactured by Metricon Corporation. At this time, the refractive index was measured with light at three different wavelengths, 408, 633 and 828 nm, and the refractive index (nD) relative to the D line (589 nm) was determined by using the Cauchy's formula.

<Mechanical Properties>

(Coefficient of Linear Expansion (CTE))

The same film as the film for evaluation used for the measurement of the refractive index above was prepared, and the coefficient of linear expansion of the obtained film for evaluation was measured on type SSC-5200 TMA analyzer manufactured by Seiko Instruments Inc. At this time, the coefficient of linear expansion was calculated from the gradient of the TMA curve between 100° C. and 150° C. during heating of the film for evaluation at 5° C./min to a temperature that was 20° C. lower than the glass transition temperature.

(Elastic Modulus and Tensile Strength)

The same film as the film for evaluation used for the measurement of the refractive index above was prepared, and elastic modulus and tensile strength at room temperature of the obtained film for evaluation were measured by performing a tensile test on a tensile tester "EZ-LX" manufactured by Shimadzu Corporation using Type 7 dumbbell at a rate of 5 mm/min.

TABLE 3

|  | Polymer | Mw | Tg (° C.) | nD | CTE (ppm/K) 100° C.-150° C. | Elastic modulus (GPa) | Tensile strength (MPa) |
| --- | --- | --- | --- | --- | --- | --- | --- |
| Example 8 | P-4 | 65,400 | 258.8 | — | — | — | — |
| Example 9 | P-5 | 700 | — | — | — | — | — |
| Example 10 | P-6 | 59,800 | 219.0 | 1.6638 | 41 | 4.4 | 122.6 |
| Example 11 | P-7 | 89,600 | 201.6 | 1.6763 | 46 | 4.0 | 103.1 |
| Example 12 | P-8 | 26,400 | 300.5 | — | 21 | 4.6 | 133.2 |
| Example 13 | P-9 | 51,100 | 239.3 | 1.7014 | 39 | 4.4 | 114.2 |
| Example 14 | P-10 | 29,700 | 235.9 | — | — | — | — |
| Example 15 | P-11 | 49,600 | 222.2 | 1.6951 | 33 | 4.6 | 114.5 |
| Example 16 | P-12 | 9,500 | — | — | — | — | — |
| Example 17 | P-13 | 69,500 | 208.5 | — | — | — | — |
| Example 18 | P-14 | 70,300 | 222.9 | — | 32 | 4.4 | 123.5 |
| Example 19 | P-15 | 2,600 | — | — | — | — | — |
| Example 20 | P-16 | 2,200 | — | — | — | — | — |
| Example 21 | P-17 | 6,600 | — | — | — | — | — |
| Example 22 | P-18 | 12,400 | — | — | — | — | — |

TABLE 4

|  | Polymer | Mw | Tg (° C.) | nD | CTE (ppm/K) 100-150° C. | Elastic modulus (GPa) | Tensile strength (MPa) |
| --- | --- | --- | --- | --- | --- | --- | --- |
| Example 23 | P-19 | 15,700 | 222.6 | — | — | — | — |
| Example 24 | P-20 | 56,400 | 208.5 | 1.6882 | 46 | 3.4 | 107.2 |
| Example 25 | P-21 | 105,800 | 240.3 | — | 42 | 4.0 | 106.6 |
| Example 26 | P-22 | 1,200 | — | — | — | — | — |
| Example 27 | P-23 | 106,200 | 229.1 | — | 32 | 3.5 | 104.9 |
| Example 28 | P-24 | 143,700 | 272.8 | — | 35 | 4.1 | 106.7 |
| Example 29 | P-25 | 46,700 | 254.8 | — | 33 | 4.3 | 132.9 |
| Example 30 | P-26 | 10,700 | — | — | — | — | — |
| Example 31 | P-27 | 93,300 | — | — | — | — | — |
| Comparative Example 6 | R-1 | 112,800 | 263.6 | 1.6451 | 45 | 3.8 | 95.8 |
| Comparative Example 7 | R-2 | 69,700 | 187.6 | 1.6093 | 83 | 2.1 | 65.0 |
| Comparative Example 8 | R-3 | — | No Tg | 1.6440 | 55 | 2.2 | 77.6 |
| Comparative Example 9 | R-4 | — | 189.2 | 1.6333 | 55 | 2.4 | 70.7 |

As apparent from Table 3 and Table 4, it was found that the polymers of Examples respectively had high glass transition temperature and high refractive index and had excellent mechanical properties (CTE, elastic modulus and tensile strength). For example, the polymers of Examples 10, 11, 13, 15 and 24 had glass transition temperatures as high as 200° C. or higher, refractive index as high as 1.66 or more and excellent mechanical properties (CTE is as low as 46 or less and tensile strength is as high as 100 MPa or more). Meanwhile, Comparative Examples 6 to 9 had a refractive index as low as less than 1.65 and tensile strength as low as less than 100 MPa.

5. Synthesis of Polymers (III)

Example 32

In a four-neck separable flask equipped with a stirrer, phenolphthalein (31.8 g, 100.0 mmol), 4,6-dichloropyrimidine (14.9 g, 100.0 mmol) and potassium carbonate (18.7 g, 135.0 mmol) were weighed and placed to which N-methyl-2-pyrrolidone (109 g) was added, and the mixture was allowed to react in a nitrogen atmosphere at 110° C. for 6 hours. After the completion of the reaction, N-methyl-2-pyrrolidone (400 g) was added for dilution and salts were removed by filtration, and then the solution was added to methanol (5.0 kg). Deposited solids were separated by filtration, washed with a small amount of methanol, recovered by another filtration and then dried under the same conditions as in Example 1 to obtain polymer P-28 having the structural unit represented by formula (P-28) below (product weight; 34.4 g, yield; 87.2%).

The structure of polymer P-28 was identified by $^1$H-NMR using deuterochloroform as a measurement solvent on a nuclear magnetic resonator ("ECX400P" by JEOL Ltd.). Chemical shifts are indicated below.

$^1$H-NMR (CDCl$_3$, 400 MHz) δ (ppm): 6.37 (s, 1H), 7.27 (d, 4H), 7.45 (d, 4H), 7.59 (m, 2H), 7.74 (m, 1H), 7.95 (d, 1H), 8.39 (s, 1H)

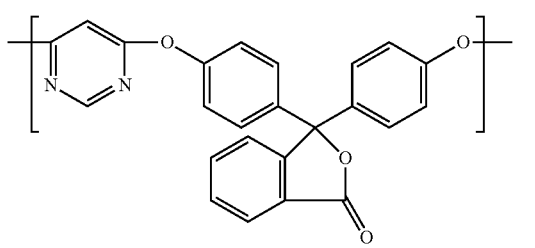

(P-28)

Example 33

In a four-neck separable flask equipped with a stirrer, phenolphthalein (25.5 g, 80.0 mmol), 4,6-dichloro-2-phenylpyrimidine (18.0 g, 80.0 mmol) and potassium carbonate (14.9 g, 108.0 mmol) were weighed and placed to which N-methyl-2-pyrrolidone (101 g) was added, and the mixture was allowed to react in a nitrogen atmosphere at 110° C. for 6 hours. After the completion of the reaction, N-methyl-2-pyrrolidone (300 g) was added for dilution, salts were removed by filtration and the solution was then added to methanol (5.0 kg). Deposited solids were separated by filtration, washed with a small amount of methanol, recovered by another filtration and then dried under the same conditions as in Example 1 to obtain polymer P-29 having the structural unit represented by formula (P-29) below (product weight; 34.6 g, yield; 92.1%).

The structure of polymer P-29 was identified by $^1$H-NMR as in Example 10. Chemical shifts are indicated below.

$^1$H-NMR (CDCl$_3$, 400 MHz) δ (ppm): 6.12 (s, 1H), 7.26 (m, 7H), 7.46 (d, 4H), 7.62 (m, 2H), 7.77 (m, 1H), 7.99 (d, 1H), 8.07 (d, 2H)

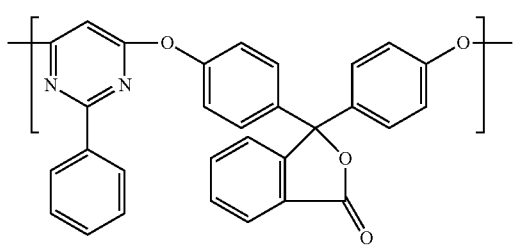

(P-29)

Example 34

In a four-neck separable flask equipped with a stirrer, 2-phenyl-3,3'-bis(4-hydroxyphenyl)phthalimidine (13.8 g, 35.0 mmol), 4,6-dichloropyrimidine (5.2 g, 35.0 mmol) and potassium carbonate (6.5 g, 47.3 mmol) were weighed and placed to which N-methyl-2-pyrrolidone (44 g) was added, and the mixture was allowed to react in a nitrogen atmosphere at 110° C. for 19 hours. After the completion of the reaction, N-methyl-2-pyrrolidone (200 g) was added for dilution, salts were removed by filtration and then the solution was added to methanol (2.0 kg). Deposited solids were separated by filtration, washed with a small amount of methanol, recovered by another filtration and then dried in a vacuum dryer under reduced pressure at 120° C. for 15 hours to obtain polymer P-30 having the structural unit represented by formula (P-30) below (product weight; 12.5 g, yield: 76.3%).

The structure of polymer P-30 was identified by $^1$H-NMR as in Example 10. Chemical shifts are indicated below.

$^1$H-NMR (CDCl$_3$, 400 MHz) δ (ppm): 6.25 (s, 1H), 6.96 (d, 2H), 7.06 (d, 4H), 7.19-7.24 (m, 4H), 7.32 (d, 4H), 7.50-7.59 (m, 2H), 8.01 (d, 1H), 8.43 (s, 1H)

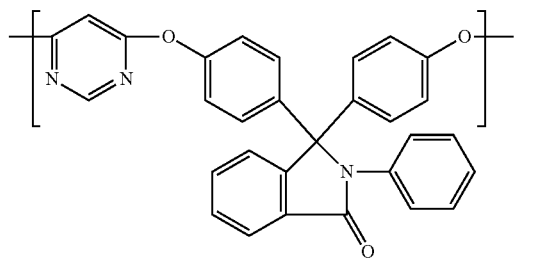

(P-30)

Example 35

In a four-neck separable flask equipped with a stirrer, fluorescein (33.2 g, 100.0 mmol), 4,6-dichloropyrimidine (14.9 g, 100.0 mmol) and potassium carbonate (18.7 g, 135.0 mmol) were weighed and placed to which N-methyl-2-pyrrolidone (109 g) was added, and the mixture was allowed to react in a nitrogen atmosphere at 110° C. for 6 hours. After the completion of the reaction, N-methyl-2-pyrrolidone (400 g) was added for dilution, salts were removed by filtration and the solution was then added to methanol (5.0 kg). Deposited solids were separated by filtration, washed with a small amount of methanol, recovered by another filtration and then dried under the same conditions as in Example 1 to obtain polymer P-31 having the structural unit represented by formula (P-31) below (product weight; 34.8 g, yield; 85.3%).

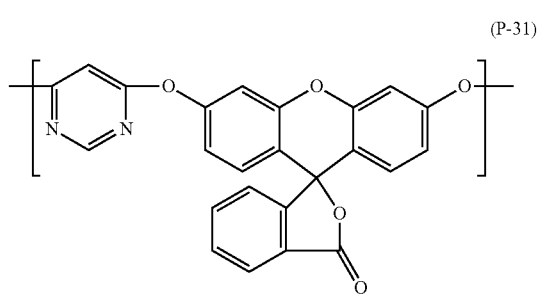

(P-31)

Comparative Example 10

In a four-neck separable flask equipped with a stirrer, 9,9-bis(4-hydroxy-3-methylphenyl)fluorene (18.9 g, 50.0 mmol), 4,6-dichloropyrimidine (7.4 g, 50.0 mmol) and potassium carbonate (9.3 g, 67.5 mmol) were weighed and placed to which N-methyl-2-pyrrolidone (103 g) was added, and the mixture was allowed to react in a nitrogen atmosphere at 110° C. for 6 hours. After the completion of the reaction, N-methyl-2-pyrrolidone (329 g) was added for dilution, salts were removed by filtration, and the solution was added to methanol (9.1 kg). Deposited solids were separated by filtration, washed with a small amount of methanol, recovered by another filtration and then dried under the same conditions as in Example 1 to obtain polymer R-5 having the structural unit represented by formula (R-5) below (product weight; 11.5 g, yield 61.8%).

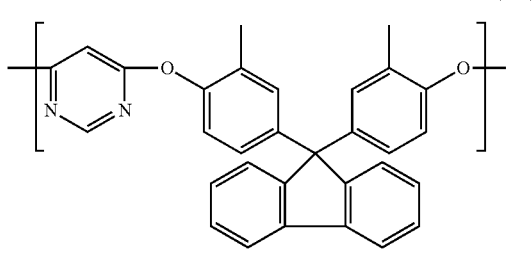

(R-5)

Comparative Example 11

In a four-neck separable flask equipped with a stirrer, 2,2-bis(4-hydroxyphenyl)propane (11.4 g, 50.0 mmol), 4,6-dichloropyrimidine (7.4 g, 50.0 mmol) and potassium carbonate (9.3 g, 67.5 mmol) were weighed and placed to which N-methyl-2-pyrrolidone (90 g) was added, and the mixture was allowed to react in a nitrogen atmosphere at 110° C. for 6 hours. After the completion of the reaction, N-methyl-2-pyrrolidone (200 g) was added for dilution, salts were removed by filtration, and the solution was added to methanol (6.1 kg). Deposited solids were separated by filtration, washed with a small amount of methanol, recovered by another filtration and then dried under the same conditions as in Example 1 to obtain polymer R-6 having the structural unit represented by formula (R-6) below (product weight: 12.1 g, yield; 80%).

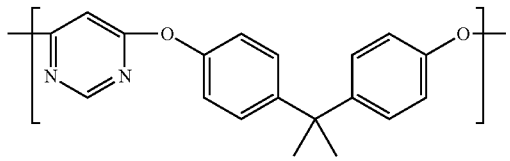

(R-6)

6. Evaluation of Physical Properties of Polymers

For each polymer obtained as above, weight average molecular weight (Mw), glass transition temperature (Tg), 1% mass reduction temperature (Td1), solubility in various organic solvents and mechanical properties (tensile elongation, tensile strength, CTE) were evaluated according to the methods indicated below. The evaluation results are shown in Table 5. In the Table, "-" means that the corresponding item was not measured.

<Weight Average Molecular Weight (Mw)>

The weight average molecular weight (Mw) of each polymer was measured under the same conditions as in Example 1.

<Glass Transition Temperature (Tg)>

The glass transition temperature (Tg) of each polymer was measured in the same manner as that described in "[4] Evaluation of physical properties of polymers" above.

<1% Mass Reduction Temperature>

The 1% mass reduction temperature (Td1) of each polymer was obtained as a temperature at which the accumulated mass of the polymer reduced by 1% by mass determined from the thermal mass curve obtained with a differential thermobalance ("TG/DTA6200" from SII Nanotechnology Inc.) in a nitrogen atmosphere under the condition of a heating rate of 10° C./min. Td1 is one of the indices of heat resistance and the larger the value is, the better the evaluated heat resistance is.

<Solubility in Various Organic Solvents>

The solubility in various organic solvents of each polymer was evaluated as follows: each polymer was added to various organic solvents indicated below so as to be a concentration of 10% by mass, the mixture was stirred, and when a precipitate was not visually observed, the evaluation of "A" was given and when a precipitate was visually observed, the evaluation of "B" was given.

(Type of Organic Solvents)

CPN; cyclopentanone

GBL; γ-butyrolactone

EDM; diethylene glycol ethyl methyl ether

MMP; methyl 3-methoxypropionate

<Mechanical Properties>

Films for evaluation were prepared as indicated below and used for measurements of coefficient of linear expansion (CTE), tensile elongation and tensile strength as follows. Each polymer (12.5 g) was dissolved in 250 mL of methylene chloride and cast on a glass substrate, the solvent was evaporated at room temperature in a nitrogen atmosphere over 12 hours followed by vacuum drying the obtained films at 150° C. for 12 hours to obtain films for evaluation.

(Coefficient of Linear Expansion (CTE))

The coefficient of linear expansion of the film for evaluation obtained was measured on type SSC-5200 TMA analyzer manufactured by Seiko Instruments Inc. At this time, the coefficient of linear expansion was calculated from the gradient of the TMA curve between 50° C. and 150° C. during heating of the film for evaluation at 5° C./min to a temperature that was 20° C. lower than the glass transition temperature.

(Tensile Elongation and Tensile Strength)

The obtained film for evaluation was sectioned into strips having the shape of Type 7 dumbbell according to JIS K6251, and a tensile test was performed on a small desk-top tester ("EZ-LX", manufactured by Shimadzu Corporation) under conditions of room temperature and 5.000 mm/min, thereby measuring the tensile elongation and tensile strength.

TABLE 5

| | Polymer | Mw | Tg (° C.) | Td1 (° C.) | CTE (ppm/K) 50-150 (° C.) | Tensile test Tensile elongation (%) | Tensile strength (MPa) | Solubility in organic solvents CPN | GBL | EDM | MMP |
|---|---|---|---|---|---|---|---|---|---|---|---|
| Example 32 | P-28 | 96,100 | 246 | 425 | 36 | 70 | 105 | A | A | B | B |
| Example 33 | P-29 | 189,200 | 238 | 416 | 43 | 37 | 108 | A | A | B | B |
| Example 34 | P-30 | 63,900 | 257 | 408 | 33 | — | — | A | A | B | B |
| Example 35 | P-31 | 21,000 | 251 | 401 | — | — | — | — | — | — | — |
| Comparative Example 10 | R-5 | 20,000 | 240 | 383 | 50 | 6 | 122 | A | A | B | B |
| Comparative Example 11 | R-6 | 36,000 | 153 | 430 | 57 | 102 | 61 | A | A | B | B |

As apparent from Table 5, the polymers of Examples 32 to 35 had excellent heat resistance and mechanical properties, low CTE and improved solubility in various organic solvents. In particular, Examples 32 and 33 had glass transition temperature of 238° C. to 246° C., Td1 of 416° C. to 425° C., elongation (tensile elongation) of 37% to 70%, high toughness (tensile strength) of 105 to 108 MPa or more and CTE of 36 to 43 ppm/K, and were soluble (evaluation: A) in two or more organic solvents. Meanwhile, Comparative Example 10 had a glass transition temperature of 240° C. and tensile strength of 122 MPa and was soluble in two or more organic solvents; however it had Td1 as low as 383° C., CTE as high as 50 ppm/K and tensile elongation as low as 6%. Comparative Example 11 had Td1 of 430° C., tensile elongation of 102% and tensile strength of 61 MPa and was soluble in two or more organic solvents; however, it had a glass transition temperature as low as 153° C. and CTE as high as 57 ppm/K. From these results, it is found that according to the polymer of the invention, mechanical properties (CTE, tensile elongation and tensile strength) and solubility in various organic solvents can be improved while exhibiting high Tg and Td1.

INDUSTRIAL APPLICABILITY

According to the composition of the invention, a cured product having an excellent balance between toughness, heat resistance and chemical resistance and a laminate having the cured product layer may be obtained. In particular, a cured product having both excellent toughness and excellent heat resistance as well as excellent chemical resistance and a laminate having the cured product layer may be obtained. Thus, the invention may be suitably used in a wide range of fields such as vehicle industries (such as aircraft industry and automobile industry) and electric and electronic industries.

The novel polymer according to the invention has high glass transition temperature, excellent heat resistance and high refractive index as well as has excellent solubility in various organic solvents, high glass transition temperature and 1% mass reduction temperature (Td1), excellent heat resistance and excellent mechanical properties (CTE, tensile elongation, elastic modulus, tensile strength, etc.). Therefore, the polymer of the invention, the composition and molded article containing the same may be suitably used in electric and electronic material fields and optical material fields for electric and electronic industries and optical industries. In particular, the invention may be suitably used for sealing materials, interlayer insulating films and heat resistant protecting films of electric and electronic components; laminate sheets (such as printed circuit board substrates, interlayer adhesives, solder resists and solder pastes); adhesives (such as conductive adhesives and thermal conductive adhesives/adhesive sheets); various coatings, optical components (optical films such as wave plates and retarders, various special lenses such as conic lenses, spherical lenses and cylindrical lenses, lens arrays and the like), insulating films for printed circuit boards and the like.

The invention claimed is:

1. A polymer comprising:
a structural unit represented by at least one of formulae (d), (e) and (f) below

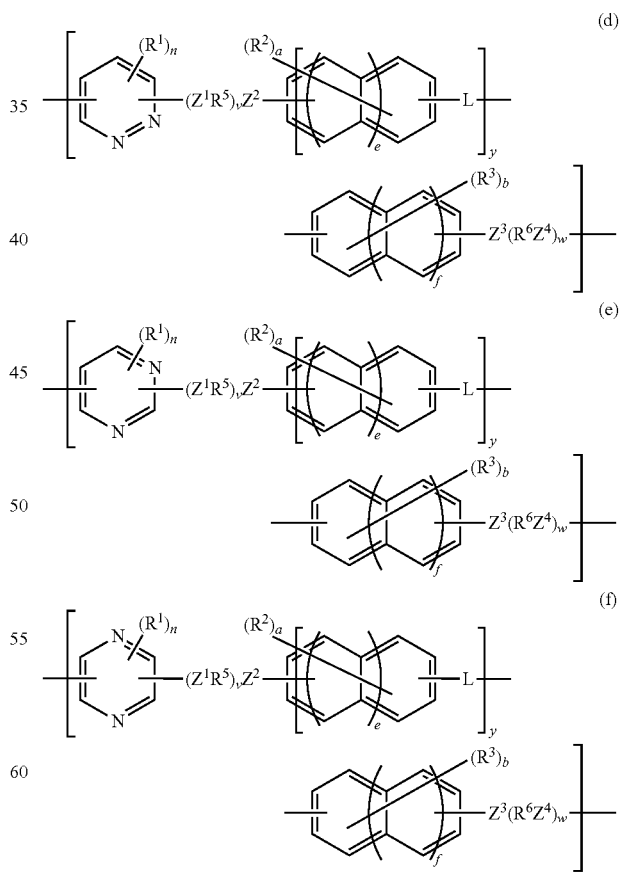

wherein in formulae (d) to (f), $R^1$ is each independently a halogen atom, a monovalent hydrocarbon group having 1 to 20 carbon atoms, a monovalent halogenated hydrocarbon group having 1 to 20 carbon atoms, a nitro group, a cyano group, any of primary to tertiary amino groups or a salt of any of primary to tertiary amino groups; n is each independently an integer of 0 to 2; when n is 2, two or more $R^1$ may be the same or different and may be joined together in any combination to form a part of a cyclic structure;

wherein $R^2$ and $R^3$ are respectively and independently a halogen atom, a monovalent hydrocarbon group having 1 to 20 carbon atoms, a monovalent halogenated hydrocarbon group having 1 to 20 carbon atoms, a nitro group or a cyano group; e and f are respectively and independently an integer of 0 to 2; a and b are respectively and independently an integer of 0 to 8; when a is 2 or more, two or more $R^2$ may be the same or different and may be joined together in any combination to form a part of a cyclic structure; when b is 2 or more, two or more $R^3$ may be the same or different and may be joined together in any combination to form a part of a cyclic structure; $Z^1$ to $Z^4$ are respectively and independently —O— or —S—; $R^5$ and $R^6$ are respectively and independently a methylene group or an alkylene group having 2 to 4 carbon atoms; v is 0; w is 0; L is a bivalent group represented by formula (L-1) or (L-2) below; y is 1;

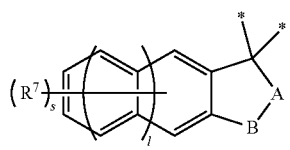

(L-1)

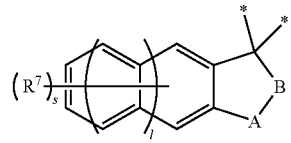

(L-2)

wherein in formulae (L-1) and (L-2), A is each independently —C(O)—, —SO— or —$SO_2$—; B is each independently —O—, —S— or —N($R^8$)—; $R^8$ is a hydrogen atom, a halogen atom, a monovalent hydrocarbon group having 1 to 20 carbon atoms or a monovalent halogenated hydrocarbon group having 1 to 20 carbon atoms; $R^7$ is each independently a halogen atom, a monovalent hydrocarbon group having 1 to 20 carbon atoms, a monovalent halogenated hydrocarbon group having 1 to 20 carbon atoms, a nitro group or a cyano group, l is each independently an integer of 0 to 2; s is each independently an integer of 0 to 8; when s is 2 or more, two or more $R^7$ may be the same or different and may be joined together in any combination to form a part of a cyclic structure; and "*" indicates a bond.

2. A composition, comprising the polymer according to claim 1 and an organic solvent.

3. A molded article, comprising the polymer according to claim 1.

* * * * *